(12) United States Patent
Maeda et al.

(10) Patent No.: US 8,827,600 B2
(45) Date of Patent: Sep. 9, 2014

(54) CARBIDE END MILL AND CUTTING METHOD USING THE END MILL

(75) Inventors: Katsutoshi Maeda, Kusatsu (JP); Gang Han, Dusseldorf (DE)

(73) Assignee: Hitachi Tool Engineering, Ltd., Tokyo (JP)

( * ) Notice: Subject to any disclaimer, the term of this patent is extended or adjusted under 35 U.S.C. 154(b) by 450 days.

(21) Appl. No.: 13/258,282

(22) PCT Filed: Apr. 21, 2010

(86) PCT No.: PCT/JP2010/057067
§ 371 (c)(1),
(2), (4) Date: Sep. 21, 2011

(87) PCT Pub. No.: WO2010/137429
PCT Pub. Date: Dec. 2, 2010

(65) Prior Publication Data
US 2012/0020749 A1   Jan. 26, 2012

(30) Foreign Application Priority Data

| May 25, 2009 | (JP) | 2009-141629 |
| Jun. 3, 2009 | (JP) | 2009-149128 |
| Jun. 15, 2009 | (JP) | 2009-159273 |
| Jun. 17, 2009 | (JP) | 2009-161187 |

(51) Int. Cl.
*B23C 5/10* (2006.01)
*B23C 5/00* (2006.01)

(52) U.S. Cl.
CPC ............. *B23C 5/10* (2013.01); *B23C 2210/086* (2013.01); *B23C 2210/088* (2013.01); *B23C 5/003* (2013.01); *B23C 2210/287* (2013.01); *B23C 2250/16* (2013.01)
USPC ................................. 407/53; 407/61; 407/63

(58) Field of Classification Search
USPC ................... 407/53, 54, 61, 58, 59, 60, 63
See application file for complete search history.

(56) References Cited

U.S. PATENT DOCUMENTS 3,555,935 A * 1/1971 Dorrenberg ............... 76/108.6
4,212,568 A * 7/1980 Minicozzi ................. 407/53

(Continued)

FOREIGN PATENT DOCUMENTS

JP   A-01-127214      5/1989
JP   04159010 A  *   6/1992

(Continued)

OTHER PUBLICATIONS

Japanese Office Action in Japanese Patent Application No. 2009-141629; dated Dec. 6, 2011 (with English-language translation).

(Continued)

*Primary Examiner* — Daniel Howell
*Assistant Examiner* — Nicole N Ramos
(74) *Attorney, Agent, or Firm* — Oliff PLC

(57) ABSTRACT

Provided is a long life carbide end mill which can perform stable cutting in high-efficiency machining such as die machining and parts machining. A cutting method using such an end mill is also provided. When a certain wavy or nicked peripheral cutting edge is considered a reference peripheral cutting edge with reference phases in a pitch of the reference peripheral cutting edge, wherein the distance of each reference phase is an amount corresponding to a value obtained by dividing the pitch of the nicks or waveform of each peripheral cutting edge by the number of the cutting edges; and the phase of at least one of the remaining peripheral cutting edges is deviated in the direction of the tool axis from the corresponding reference phase by an amount corresponding to 5% or less (excluding 0%) of the pitch.

2 Claims, 16 Drawing Sheets

(56) References Cited

U.S. PATENT DOCUMENTS

| | | | |
|---|---|---|---|
| 5,226,760 A * | 7/1993 | Nishimura | 407/54 |
| 5,882,777 A | 3/1999 | Kukino et al. | |
| 6,435,780 B1 * | 8/2002 | Flynn | 407/53 |
| 7,563,059 B2 * | 7/2009 | Song | 407/53 |
| 8,047,747 B2 * | 11/2011 | Flynn | 407/53 |
| 2007/0098506 A1 * | 5/2007 | Flynn | 407/53 |
| 2007/0248421 A1 | 10/2007 | Kakai et al. | |
| 2010/0226726 A1 * | 9/2010 | Strasmann | 407/54 |

FOREIGN PATENT DOCUMENTS

| | | | |
|---|---|---|---|
| JP | A-06-335814 | | 12/1994 |
| JP | A-08-104583 | | 4/1996 |
| JP | A-2000-000714 | | 1/2000 |
| JP | A-2000-334606 | | 12/2000 |
| JP | A-2001-162411 | | 6/2001 |
| JP | A-2002-233910 | | 8/2002 |
| JP | 2005125433 A * | | 5/2005 |
| JP | A-2005-131728 | | 5/2005 |
| JP | A-2005-279886 | | 10/2005 |
| JP | 2006015418 A * | | 1/2006 |
| JP | A-2006-015418 | | 1/2006 |
| JP | 2006088232 A * | | 4/2006 |
| JP | A-2006-192567 | | 7/2006 |
| JP | A-2007-216378 | | 8/2007 |
| JP | 2007296588 A * | | 11/2007 |
| JP | A-2007-290120 | | 11/2007 |
| JP | A-2007-296588 | | 11/2007 |
| JP | 2008044038 A * | | 2/2008 |
| JP | A-2008-093760 | | 4/2008 |
| JP | A-2010-269437 | | 12/2010 |

OTHER PUBLICATIONS

Japanese Office Action in Japanese Patent Application No. 2009-149128; dated Dec. 6, 2011 (with partial English-language translation).

International Search Report in International Application No. PCT/JP2010/057067; dated Aug. 3, 2010 (with English-language translation).

International Preliminary Report on Patentability in International Application No. PCT/JP2010/057067; dated Nov. 29, 2011 (with English-language translation).

Chinese Office Action issued in Chinese Patent Application No. 201080012698.9 on Feb. 1, 2013 (with translation).

Feb. 21, 2012 Office Action issued in Japanese Patent Application No. 2009-149128 (with translation).

Feb. 21, 2012 Office Action issued in Japanese Patent Application No. 2009-141629 (with translation).

Nov. 19, 2012 Office Action issued in Korean Patent Application No. 10-2011-7021095 (with partial translation).

* cited by examiner (a) (b)

(a)                    (b)

CARBIDE END MILL AND CUTTING METHOD USING THE END MILL

TECHNICAL FIELD

The present invention relates to a carbide end mill used for cutting in a range from rough cutting to semi-finishing cutting, and to a cutting method performed by use of the end mill.

An object of the present invention is to provide a versatile carbide end mill which can solely and multifunctionally perform, longitudinal-feed machining, lateral-feed machining, and oblique machining which is combination of longitudinal-feed machining and lateral-feed machining, in machining steps from a rough cutting step to a semi-finishing cutting at high speed. These machinings described above are performed respectively by selecting different type of end mill on prior art. Another object of the present invention is to provide a cutting method which is performed by making use of such an end mill.

A conventional typical end mill for rough cutting, to which the present invention can be applied, is made of high-speed tool steel or carbide as the base material. Each of peripheral cutting edges of the end mill has a wavy shape or nicks. The phases of the wavy peripheral cutting edges or nicked peripheral cutting edges are shifted at equal intervals along the direction of the tool axis such that no uncut portions remain in each cutting edge. As compared with an end mill having ordinary peripheral cutting edges, without wavy or nicked cutting edges such a conventional end mill having wavy or nicked peripheral cutting edges can easily break chips, and can perform efficient cutting while reducing cutting resistance. Accordingly, when such a conventional end mill is used, the depth of cut in the tool diameter direction can be increased, thereby enabling high-efficiency machining. However, a machined surface becomes rougher than that attained by an end mill having ordinary peripheral cutting edges without wavy or nicked cutting edges is used. Therefore, in many cases, the end mill having wavy or nicked peripheral cutting edges is used in a rough machining step.

In a rough machining step, in order to increase machining efficiency, the depth of cut is increased for high-efficiency machining. However, in such a case, a problem of chattering vibration often arises. In particular, an equal separation end mill, that is defined as the end mill having same separation angle between lines extending from the axis of the end mill to the circumferentially adjacent all cutting edges, has an advantage in that it can be manufactured quite easily. However, when an equal separation end mill is used, resonance is apt to occur during machining, resulting in generation of chattering vibration. As measures for solving such a problem, there has been proposed an unequal separation end mill in which the separation angle of cutting edges is varied such that the period of cutting force does not become constant. But such an end mill involves increased production cost and time in the course of its production.

Patent Document 1 discloses an end mill having a wavy cutting edge shape in which the amount of shift in phase between adjacent peripheral cutting edges is rendered unequal, whereby the shape and area of a biting cross section becomes unequal among the peripheral cutting edges. Patent Document 1 describes that such an end mill suppresses chattering vibration as in the case of an unequal separation end mill, whereby tool life is extended, and high-efficiency machining becomes possible.

Patent Document 2 discloses an end mill in which the pitch of the waveform of each peripheral cutting edge constituted by a roughing cutting edge is increased and decreased sinusoidally in one cycle of an even number of period of troughs and crests of the waveform, and, in accordance with the increase and decrease of the number of the pitch, the depth and radius of curvature of each troughs and crests in the waveform are changed at each cycle of the waveform. Patent Document 2 describes that, in such an end mill, due to the increase and decrease in the pitch, the manner of cutting changes in the axial direction, and shift in resonance frequency occurs, whereby, when the tool is considered as a whole, resonance is mitigated, and chattering vibration is suppressed.

Some conventional typical end mills for rough cutting or semi-finishing cutting, to which the present inventions intend to apply, have nicked peripheral cutting edges. Such a conventional end mill having nicked peripheral cutting edges can easily break chips, and can perform cutting with reduced cutting resistance, as compared with an end mill having ordinary peripheral cutting edges. Accordingly, when such an end mill is used, the depth of cut in the tool diameter direction can be increased, and thereby it enables high-efficiency machining. However, when high-efficiency machining is performed by increasing the depth of cut, there often arises a problem in that chipping or fracture occurs, particularly, at nick portions due to chattering vibration.

Patent Documents 3 and 4 describe examples of end mills in which nicks have improved shapes for preventing chipping or fracture. In the end mill described in Patent Document 3, large flank angles are provided at opposite ends of each nick so as to secure the strength of portions which connect the nicks and peripheral cutting edge portions. Patent Document 4 describes an end mill in which connecting portions on opposite sides of each nick are rounded so as to improve resistance to chipping and improve the roughness of a machined surface.

Even in a rough machining step, in order to increase machining efficiency, in longitudinal-feed cutting, lateral-feed cutting and oblique cutting or the like, high-speed cutting is performed with an increased depth of cut. However, it is difficult to perform these cuttings by using a single end mill. In particular, in the longitudinal-feed cutting, oblique cutting, or the like, when the depth of cut is too large, cutting resistance increases unless chips are easily removed.

There have been made several proposals for the purpose of improving the chip removability of an end mill. Patent Document 5 proposes an end mill in which plural gash surfaces are formed such that the gash notch angle increases stepwise toward the rear-end side. The front-end side gash surface at the center of the end mill body on which a large load acts during longitudinal feed, secures strength to thereby prevent fracture, etc. The rear-end side gash surface secures a space for chip removed.

Patent Document 6 proposes an end mill in which a gash surface is provided on the side toward the rotational center of the end mill, another gash surface is provided on the peripheral side of the end mill, and the peripheral-side gash angle is larger than the rotational-center-side gash angle. This configuration improves the chip removability at the time of lateral-feed cutting of a hard material, and enables high efficient machining through high-speed cutting.

Various hard coats have been developed so as to enhance the performance of a carbide end mill and extend the service life thereof. Patent Document 7 disclosed a practically used carbide end mill which has such a hard coat and which was proposed by the applicant of the present application.

PRIOR ART DOCUMENT

Patent Documents (Prior Art Documents Regarding the Shape of Peripheral Cutting Edges)
Patent Document 1: Japanese Patent Application Laid-Open (kokai) No. H01-127214
Patent Document 2: Japanese Patent Application Laid-Open (kokai) No. 2002-233910
(Prior Art Documents Regarding the Shape of Nicks)
Patent Document 3: Japanese Patent Application Laid-Open (kokai) No. H06-335814
Patent Document 4; Japanese Patent Application Laid-Open (kokai) No. 2005-131728
(Prior Art Documents Regarding Gashes)
Patent Document 5: Japanese Patent Application Laid-Open (kokai) No. 2006-15418
Patent Document 6: Japanese Patent Application Laid-Open (kokai) No. 2007-296588
(Prior Art Document Regarding Hard Coat)
Patent Document 7: Japanese Patent Application Laid-Open (kokai) No. 2000-334606

SUMMARY OF THE INVENTION

Problems to be Solved by the Invention

In recent years, there has been an increasing demand for high-efficiency machining of workpieces, such as dies and parts, by use of an end mill, the workpieces being made of structural steel, structural alloy steel, die steel for cold or hot working, stainless steel, titanium alloy, or super-heat-resistant alloy. Therefore, there has been a demand for an end mill which enables unprecedented high-efficiency machining by performing, at high speed, for all types of cutting, such as longitudinal-feed cutting, lateral-feed cutting, and oblique cutting. Accordingly, on shop floors where die machining and part machining are performed, there has been a strong desire for end mill machining in which various types of machining are able to be performed at high speed by use of a single end mill without tool exchange.

As explained in the introduced prior art documents, conventionally different type of end mills specialized for each longitudinal-feed machining and lateral-feed machining respectively have been proposed. In the case of machining for concave shape which machining involves longitudinal-feed cutting and oblique cutting, an end mill, specialized for longitudinal-feed cutting or a drill is first used to form a hole, and the formed hole is then expanded by use of an end mill specialized for lateral-feed cutting. In the longitudinal-feed cutting or the oblique cutting, an end mill having a small number of cutting edges which can secure large chip pockets is often used to improve chip removal. When lateral-feed with high-speed cutting is performed, an end mill having a large core diameter and a large number of cutting edges is often used to secure tool rigidity. As described above, when conventional end mills are used, an end mill suitable for each type of machining must be used through exchange of suitable end mills. Therefore, conventional end mills are not suitable for increasing efficiency because of loss of setup time. In addition, since a conventional ordinary end mill has a plurality of cutting edges along the periphery thereof and cuts a workpiece while rotating (i.e., characteristics of a milling tool), the conventional end mill encounters difficulty in performing longitudinal-feed machining because of poor chip removability, even though there is little problem, when the end mill performs lateral-feed machining. When longitudinal-feed machining is performed by use of a conventional end mill, chips produced by end cutting edges in the vicinity of the center of the axis are not removed smoothly, whereby the end mill becomes likely to be broken due to jamming of chips. Furthermore, in the case where chip pockets of the end cutting edges are made larger in order to smoothly remove chips, although chips are removed satisfactorily, there arises a problem in that, when lateral-feed machining is performed, fracture becomes more likely to occur due to insufficient rigidity of the end cutting edges. In view of the above reason, in the case where longitudinal-feed machining and which is a combination of lateral-feed machining or oblique cutting, in which the longitudinal-feed machining and the lateral-feed machining, tailor-made tools have been used in order to perform high-efficiency machining. However, recently, there has been increasing desire for performing such machining more efficiently. In order to perform such machining more efficiently, all the machining operations may be performed by use of a single end mill, without exchanging it with a drill or other end mill to eliminate setup time. However, in such a case, since the same conventional end mill is used in machining in a unsuitable direction for that end mill, in many cases it makes whole machining time longer, against expectation to reduce machining time.

High-speed cutting is a method of performing high-efficiency machining by increasing cutting speed; i.e., increasing rotational speed. Theoretically, high-efficiency machining can be achieved by means of increasing both cutting speed and the depth of cut. However, in actuality, high-efficiency machining has not yet been achieved by use of a practical end mill in which carbide is used as a base material. The reasons are as follows. In particular, in rough machining, if an end mill having wavy peripheral cutting edges or nicked peripheral cutting edges is used, and the depth of cut and rotational speed are increased, chattering vibration occurs. In such a case, a carbide end mill which is lower in toughness than an end mill formed of high-speed tool steel suffers anomalous wear and chipping, to thereby shorten its service life. Also, such chattering vibration causes fracture or breakage of a carbide tool.

As having been described in the prior art section, in order to suppress chattering vibration which is generated when cutting operation is performed by use of an end mill, there has been proposed an end mill in which unequally separated cutting edges are provided in place of equally separated cutting edges. In the case of an end mill in which unequally separated cutting edges are provided, chattering vibration can be suppressed to a certain level through proper shape design. However, since the cutting edges are arranged unequally, grinding of the cutting edges is difficult, which increases manufacturing cost of end mill. Moreover, at the time of re-grinding of end mill, difficulty is encountered in positioning of cutting edge, because the separation angle differs among the cutting edges.

Further, in the case of the end mill in which unequal separation is employed, shape of flutes become nonuniform, and chip removability is apt to become nonuniform, resulting in bad chip ejection. Therefore, such an end mill has a problem of anomalous wear and chipping. This has been a serious problem associated with treatment of a large quantity of chip ejection as a result of recently spreaded high-speed cutting. A carbide end mill, which is expected to have a long service life unless anomalous wear or chipping occurs, has a risk of being damaged because of brittleness of the base material, which causes a delay in application of a carbide end mill to high-efficiency machining.

In Patent Document 1, an end mill is proposed in which the amount of shift in phase between adjacent wavy peripheral cutting edges is made unequal so as to suppress chattering vibration as a result of the same effect as in an unequal separation end mill. However, since the base material of the end mill of Patent Document 1 is high-speed tool steel, the phase deviation amount of each peripheral cutting edge is relatively large (about 6%). Since persons skilled in the art have had strong awareness that peripheral cutting edges of a carbide end mill easily suffer fracture or chipping as compared with those of an end mill formed of high-speed tool steel, it is no exaggeration to say that the persons skilled in the art have not been motivated to deviate the phases of peripheral cutting edges of an end mill formed of carbide.

Since an end mill formed of high-speed tool steel has a relatively high toughness, even when the phase deviation amount of each peripheral cutting edge is considerably large, chipping or the like does not occur. Therefore, the ratio of the phase deviation amount is not required to be taken into consideration. However, in the case where the base material of an end mill is carbide having relatively low toughness as in the present invention, the following problem remains. Specifically, in the case where the phase deviation amount is increased by merely making the phase deviation amount unequal, fracture or chipping is apt to occur at the peripheral cutting edge of a carbide end mill when the amount of cutting amount increases. Therefore, such a carbide end mill cannot provide stable operation in advanced high-speed cutting. That is, conventional carbide end mills have not been optimized in terms of phase deviation amount. Needless to say, a proper value of the phase deviation amount of nicks of a carbide end mill or the shape of nicks are completely unknown from Patent Document 1, and Patent Document 1 provides no hints for determining the proper value or the shape.

In Patent Document 2, there is proposed an end mill in which at least one of the pitch, depth, and radius of curvature of the waveform of each roughing cutting edge is increased and decreased at a period greater than the period of troughs and crests of the waveform so as to change the cutting amount of each cutting edge, whereby chattering vibration is suppressed. However, in the case where the cutting edges have different waveforms, a grinding stone for each waveform is required at the time of manufacture of the end mill, which results in a considerably high tool production cost, as in the case of an end mill in which unequal separation is employed.

In the end mill described in Patent Document 3, a portion which connects a nick and a peripheral cutting edge portion has a sharp edge shape as shown in FIG. 19. The purpose of this shape is to provide large flank angles at opposite ends of the nick to thereby ensure strength. However, in the case of a carbide end mill for high-efficiency machining, to which the present invention pertains, employment of such a shape raises a big problem from the viewpoint of chipping resistance. Therefore, Patent Document 3 does not even serve as a reference.

Patent Document 4 describes a tool in which rounded portions are provided on opposite sides of each nick so as to improve the accuracy of a machined surface. However, Patent Document 4 does not contain any description regarding the radius of curvature of the rounded portion on the tool end side of the nick and that of the rounded portion on the tool shank side of the nick. In the case where high-efficiency machining is performed through high-speed cutting, if the tool does not have a shape in which these radiuses of curvature are determined optimally, chipping occurs due to lack of the rigidity of the peripheral cutting edges. Moreover, wear occurs more easily due to deteriorated cutting performance.

As described above, each of the end mills described in Patent Documents 3 and 4 is a mere example in which the shape of nicks is improved so as to prevent occurrence of chipping or fracture. These end mills do not have cutting edges designed for high-efficiency machining by, for example, changing the phase deviation amount of each cutting edge. Although Patent Documents 3 and 4 teach end mills having nicks, they do not teach a desired shape of nicks which a carbide end mill must have so as to achieve high-efficiency machining.

In each of the end mills described in Patent Document 5 and Patent Document 6 characterized by the shape of gashes, the phases of peripheral cutting edges are shifted at equal intervals in the direction of the tool axis, and the phase deviation amount does not differ among the peripheral cutting edges. The effect of the gash shape for high-efficiency machining as in the present invention is attained as an effect of facilitating removal of a large amount of chips produced due to the shapes of peripheral cutting edges with different phase deviation amount. That is, the effect is a synergistic effect achieved by the gash shape and the shape of the peripheral cutting edges. As to such the synergistic effect attained by the gash shape and the action of the peripheral cutting edges, none of Patent Document 5 and Patent Document 6 serves as a reference for creating the present invention.

Patent Document 5 discloses an end mill for longitudinal-feed machining in which the front-end-side gash surface at the center of the end mill body on which a large load acts at the time of longitudinal feed secures strength, and the rear-end side gash surface secures a space for chip removal. Patent Document 6 discloses an end mill having a plurality of gash surfaces suitable for high-speed, lateral-feed machining of a hard material. However, it was found in the process of creating the present invention that, in the case where more complicated machining is performed more efficiently by use of a single end mill, the length of a transition portion between the front-end-side gash surface and the rear-end-side gash surface is important so as to provide satisfactory tool rigidity and satisfactory chip removability at the same time. Specifically, it was found that, in the end mills of Patent Document 5 and Patent Document 6, the distance between the rotational center and the position of the gash surface transition portion is greater than a proper value, the problem of fracture or the like caused by chip clogging occurs often.

As described above, when conventional end mills are used, an end mill suitable for each type of machining must be used through exchange of end mills. Therefore, conventional end mills are not suitable for increasing efficiency because of loss of time for setup. In addition, since a conventional ordinary end mill has a plurality of cutting edges along the periphery thereof and cuts a workpiece while rotating (i.e., characteristics of a milling tool), the conventional end mill encounters difficulty in performing longitudinal-feed machining because of poor chip removability, which does not pose a problem, when the end mill performs lateral-feed machining. Therefore, it is difficult to perform high-efficiency machining by the conventional end mill.

The problems of the prior art inventions have been pointed out in the above. The proposed improvements on end mills disclosed in the prior-art of the above documents are specialized only for longitudinal-feed machining or only for lateral-feed machining. Any of the prior-art documents does not propose an end mill for multi-functional machining in which one end mill can perform these types of machining. This multi-functional machining by one end mill is an important object of the present invention. The present invention has been accomplished under these circumstances and through recognition of the problem to solve. An object of the present invention is to provide a carbide end mill which enables a multi-functional machining efficiently by the single end mill from longitudinal-feed cutting, lateral-feed cutting, and to oblique cutting, etc. The present invention also intends to provide a carbide end mill, which can be easily manufactured at low cost, can be re-ground easily, can suppress chattering vibration by dispersing cutting resistance, and which has a long service life. Another object of the present invention is to provide a cutting method performed by use of such an end mill. Still another object of the present invention is to provide an end mill having the above-described shape and hard coat so as to maximize the advantages of stable high-speed cutting.

Moreover, the present invention has an object to provide an end mill which can perform combined machining, involving almost all types of cutting operations, and which copes with various workpieces. The object of the present invention is essential for cutting of super-heat-resistant alloy and titanium alloy, which demands have increased recently for an aircraft material or for atomic power generation plant.

In particular, the present invention provides a carbide end mill which is good in chip removability, can disperse cutting resistance sufficiently, and can suppress chattering vibration, even when longitudinal-feed cutting or oblique cutting is performed at high rotational speed with an increased depth of cut.

Meanwhile, even an end mill having excellent cutting performance is not accepted in the market if its manufacturing cost is high. Still another object of the present invention is to provide a carbide end mill which can be manufactured easily at low cost and can be easily re-ground.

Means for Solving the Problems

The present invention was accomplished with an aim of developing an end mill for high-efficiency cutting which can achieve a chip removal quantity per unit time greater than that achieved through use of a conventional end mill. The inventors of the present invention employ an equally-separated carbide end mill as a basic type. Because that type of end mill can smoothly remove chips while suppressing chattering vibration (an important performance parameter of a cutting tool), and is easy to form cutting edges during manufacture of the end mill. This is the big advantage from the viewpoint of productivity. The inventors conceived of the present invention as a result of studying other shape-related factors which can suppress chattering vibration to the maximum.

An end mill of the present invention can be put into practice adopting carbide as a base material and wavy peripheral cutting edges or nicked peripheral cutting edges as cutting edge.

The present inventors directed their attention to the fact that the above-described objects can be achieved by determining the optimal amount of mutual phase deviation in the axial direction of the wavy peripheral cutting edges or the nicked peripheral cutting edges under the condition of disposing cutting edges at equal intervals in the circumferential direction of the carbide end mill. The present inventors carried out various studies to find a phase deviation amount which minimize chattering vibration, enabling the end mill to endure high-speed cutting. As a result, the inventors devised a carbide end mill of the present invention, which is characterized in that, when crest portions of a certain wavy peripheral cutting edge or nicked peripheral cutting edge are used as a reference, crest portions of other wavy peripheral cutting edges or nicked peripheral cutting edges are disposed such that their phases are sifted in the axial direction of the end mill within a range in which fracture or chipping does not occur at the wavy peripheral cutting edges or the nicked peripheral cutting edges, which fracture or chipping would otherwise occur because the end mill is formed of carbide.

That is, the present invention provides an end mill which has either one of the shape selected from multiple wavy peripheral cutting edges each having alternate crest portions and trough portions, or a multiple peripheral cutting edges each having a plurality of nicks for breaking chips. The end mill is characterized in that, when a certain peripheral cutting edge is considered a reference peripheral cutting edge with reference phases in a pitch of the reference peripheral cutting edge, wherein the distance of the reference phase is an amount corresponding to a value obtained by dividing the pitch of the nicks or waveform of the reference peripheral cutting edge by the number of the cutting edges; and the phase of at least one of the remaining peripheral cutting edges other than the reference peripheral cutting edge is deviated in the direction of the tool axis from the corresponding reference phase by an amount of 5% or less (excluding 0%) of the pitch.

Desirably, the end mill of the present invention is configured such that above mentioned amount of each deviation is in a range of 1% to 3% of the pitch in the direction of the tool axis from the corresponding reference phase, wherein the distance of the each reference phase is an amount corresponding to a value obtained by dividing the pitch of the nicks or waveform of the reference peripheral cutting edge by the number of the cutting edges.

The end mill of the present invention is used to machine a workpiece formed of a hardened material whose hardness exceeds 40 HRC, which is called a difficult-to-cut material. The target workpiece of the present invention is that when an end mill formed of high-speed tool steel is used, irrespective of the shape of the tool, machining of such a workpiece is difficult in actuality, because the tool life becomes extremely short under conditions for high-efficiency machining. Since the base material of the end mill of the present invention is carbide, the wavy peripheral cutting edges or the nicked peripheral cutting edges each have greatly improved wear resistance, as compared with conventional end mills formed of high-speed tool steel. However, since the phases of the peripheral cutting edges are shifted from one another, the peripheral cutting edges suffer fracture or chipping, which occur because of brittleness of carbide.

In view of the above-described drawback of the carbide end mill, the present inventors determined, through a large number of cutting tests, the optimal arrangement of the pitches of the nicks or waveforms of the peripheral cutting edges of the carbide end mill, and found that at least one of phases of the peripheral cutting edges must be deviated in the direction of the tool axis from the respective reference phases by a considerably small amount of 5% or less (excluding 0%) of the pitch of the reference peripheral cutting edge, wherein the distance of the each reference phase is an amount corresponding to a value calculated by dividing the pitch of the nicks or waveform of the reference peripheral cutting edge by the number of the cutting edges.

In the present invention, phase deviation is essential, and the amount of phase deviation must be 5% or less, preferably 1% to 3%. When the amount of phase deviation exceeds 5%, fracture and chipping become more likely to occur at the wavy peripheral cutting edges or nicked peripheral cutting edges of the carbide end mill. One of the most important feature of the present invention resides in employment of the carbide end mill and optimization of the phase deviation amount for enabling high-speed rough cutting.

According to the present invention, despite the end mill being formed of carbide, manufacture of the tool is easy, and fracture or chipping does not occur, because the wavy peripheral cutting edges or the nicked peripheral cutting edges are shaped such that their phases are shifted from one other, and chattering vibration during machining can be suppressed. Accordingly, it becomes possible to perform high-efficiency rough machining or high-efficiency semi-finishing machining through high-speed cutting, and to provide a carbide end mill having a long service life.

The effect of the carbide end mill of the present invention can be attained even when the shape of the wavy peripheral cutting edge or the nicked peripheral cutting edge involving phase deviation is applied to only one of the peripheral cutting edges.

That is, the carbide end mill of the present invention may be configured such that the carbide end mill has three or more peripheral cutting edges; at least a pair of peripheral cutting edges of the adjacent peripheral cutting edges have no phase deviation from the respective reference phases—wherein the distance of the each reference shape is an amount corresponding to a value obtained by dividing the pitch of the nicks or waveform of the reference peripheral cutting edge by the number of the cutting edges—and the amounts of deviation of the remaining peripheral cutting edges from the respective reference phases are unequal from one another.

To find proper cutting edge amounts of deviation from the respective reference phase ranged by equal distance in the reference peripheral which equal distance is obtained by dividing the pitch of the nicks of the peripheral reference cutting edge by the number of the cutting edges, to minimize chattering vibration and enable the end mill to endure high-speed cutting, the present inventors conducted various studies. The present inventors also study on the shape of nicks which does not raise a problem of fracture or chipping of the peripheral cutting edges even when high-speed cutting is performed. As a result, the present inventors found that the carbide end mill of the present invention is desirably configured such that, when a certain nicked peripheral cutting edge is used as a reference, at least one remaining nicked peripheral cutting edge is disposed such that the phase of nicks of the at least one peripheral cutting edge is shifted within a range in which fracture or chipping does not occur at the nicked peripheral cutting edges, and the nicks have an improved shaped in order to suppress, to the possible extent, the influence on chipping caused by cutting load increased as a result of phase deviation.

That is, the end mill of the present invention having a novel nick shape is desirably configured such that each peripheral cutting edge has a plurality of nicks; when one peripheral cutting edge and its nicks are viewed on a cross section skewed at an angle equal to a helix angle of the end mill, opposite ends of each nick are smoothly connected to adjacent portions of the peripheral cutting edge via rounded portions; and the radius of curvature of the tool-end-side round portion of the nick is smaller than that of the tool-shank-side round portion of the nick.

The nicked carbide end mill of the present invention is enabled to perform cutting at a higher speed, as compared with conventional end mills, by means of changing the amounts of deviation from the respective reference phases ranged by equal distance in the peripheral cutting edge, which equal distance is obtained by dividing the pitch of the nicks of the peripheral cutting edge by the number of the cutting edges. Therefore, employment of severer cutting conditions results in increased possibility of occurrence of chipping at the peripheral cutting edges. In this connection, the present inventors found that special attention must be given to the shape of the nicks, including the shapes of the opposite ends of each neck, so as to prevent occurrence of chipping at the peripheral cutting edges, which chipping would otherwise occur due to load during high-speed cutting.

In the case of a conventional carbide end mill with nicks of this type, an average feed rate for securing an average surface roughness is about 500 mm/min. However, through use of a nicked carbide end mill in which the phases of the nicks are deviated in the direction of the tool axis and rounded portions are provided on opposite ends of each nick, feed rate can be increased to a rate approximately double the conventional feed rate. However, even in such a case, the feed rate cannot exceed a limit of 800 mm/min to 1000 mm/min, and, in high-speed cutting at a feed rate exceeding that limit, chipping or the like occurs at the peripheral cutting edges due to load produced as a result of high-speed cutting. Therefore, an end mill which is prescribed only for the shape of opposite ends of each nick and the amounts of deviation from the respective reference phases of the reference peripheral cutting edge, wherein the distance of the reference phase is an amount corresponding to a value obtained by dividing the pitch of the nicks of the peripheral reference edge by the number of the cutting edges—encounters difficulty in performing cutting operation at higher speed.

Therefore, in the carbide end mill of the present invention, which may be used under severe conditions involving a feed rate exceeding 1000 mm/min, it is important to consider not only the radiuses of curvature at opposite ends of each nick, but also the shape of each nick. That is, the carbide end mill of the present invention is desirably shaped such that the bottom end of each nick is connected with the tool-shank-side round portion via a straight portion or a curve portion which is convexed toward the nick groove.

That is, a nicked carbide end mill according to another invention is a carbide end mill characterized in that the bottom end of the groove of each nick is connected with the tool-shank-side round portion via a straight portion or a curve portion which is convexed toward the nick groove, or connected with the tool-shank-side round portion via a straight portion and a curve portion which is convexed toward the nick.

In the end mill of the present invention, the amounts of deviation from the respective reference phases of peripheral cutting edge, wherein the distance of the reference phase is an amount corresponding to a value obtained by dividing the pitch of the nicks of the peripheral cutting edge by the number of the cutting edges—are made unequal. As a result, the end mill of the present invention can perform cutting operation at speed far above conventional speed. However, since the cutting load acting on the end mill increases in such cutting operation, the consideration of and measure against chipping and breakage become more important. The technical idea of designing a carbide end mill in consideration of contradictory advantages and disadvantages cannot be obtained by combining any reference of the above-described conventional prior arts and other conventional techniques.

When cutting is performed by use of the carbide end mill having nicked peripheral cutting edges according to the present invention, the cutting volume slightly differ among each nicked peripheral cutting edges. Therefore, even when high-speed cutting is performed, cutting resistance is reduced by dispersion, and cutting load becomes stable, whereby chattering vibration can be suppressed. Therefore, the carbide end mill having nicks of the present invention can yield effects similar to those attained through use of a carbide end mill having wavy peripheral cutting edges.

Desirably, the nicked carbide end mill of the present invention is configured such that, when the tool diameter of the nicked carbide end mill is represented by D, the radius of curvature of the tool-end-side rounded portion of each nick is 0.01D to 0.03D, the radius of curvature of the tool-shank-side rounded portion of each nick is 1.5 to 2 times the radius of curvature of the tool-end-side rounded portion of each nick, and the depth of each nick is 0.01D to 0.05D.

Next, the gash shape in the present invention and its effect will be described.

Nicked peripheral cutting edges or wavy peripheral cutting edges for high-speed cutting is designed as the peripheral cutting edge for the carbide end mill of the present invention to enable chips to be removed in a larger amount per unit time, as compared with conventional end mills. The carbide end mill of the present invention desirably has a novel gash shape which enables satisfactory treatment of chips removed from the end cutting edges, and which secures the strength of a distal end portion of the end mill in a region from the rotational center of the end mill to the periphery thereof.

That is, whether the carbide end mill of the present invention has wavy peripheral cutting edges or nicked peripheral cutting edges, it is recommended that the carbide end mill have the following gash shape between cutting faces of the end cutting edges and the peripheral cutting edges, in addition of, peripheral cutting edges whose phases are deviated from the respective reference phases of the reference peripheral cutting edge, wherein the distance of the reference phase is an amount corresponding to a value obtained by dividing the pitch of the nicks of the reference peripheral cutting edge by the number of the cutting edges.

The shape of gashes suitable for the end mill of the present invention will be described with reference to FIGS. 12 and 13. Each of gashes provided for end cutting edges in the present invention is composed of a plurality of surfaces; i.e., a first gash surface 51 (cutting face of the corresponding end cutting edge), a second gash surface 52 provided on the side toward the rotational center of the tool axis of the end mill, and a third gash surface 53 provided on the peripheral side of the end mill. A first gash angle 55 is formed between a crossing portion 54 between the first gash surface 51 and the second gash surface 52, and a plane perpendicularly intersecting the axis. A second gash angle 57 is formed between a crossing portion 56 between the first gash surface 51 and the third gash surface 53, and the plane perpendicularly intersecting the axis. The second gash angle 57 is made greater than the first gash angle 55.

Accordingly, desirably, the carbide end mill of the present invention is characterized in that the carbide end mill includes the above-mentioned plurality of peripheral cutting edges, end cutting edges, and gashes each composed of a plurality of gash surfaces; the plurality of gash surfaces include a first gash surface serving as a cutting face of the corresponding end cutting edge, a second gash surface provided on the side toward the rotational center of the tool axis of the end mill, and a third gash surface provided on the peripheral side of the end mill; a first gash angle of 15° to 35° is formed between a crossing portion between the first gash surface and the second gash surface, and a plane perpendicularly intersecting the axis; a second gash angle of 40° to 60° is formed between a crossing portion between the first gash surface and the third gash surface, and the plane perpendicularly intersecting the axis; and the length of a connection portion between the second gash surface and the third gash surface is not less than 5% the tool diameter as measured from the tool rotation axis and less than 20% the tool diameter.

In the case where the carbide end mill of the present invention is required to remove chips in a larger amount per unit time as compared with conventional end mills, as described above, the gash shape of the end cutting edges is optimized as described above in the present invention. Through formation of gashes having a gash shape defined in the present invention, the following advantageous effects can be yielded. Longitudinal-feed cutting, lateral-feed cutting, and oblique cutting can be performed by use of a single carbide end mill having wavy peripheral cutting edges or peripheral cutting edges having phase-shifted nicks. Chips removed from the end cutting edges at the time of longitudinal-feed cutting or oblique cutting can be treated satisfactorily. The gash portions are strong enough to endure high-speed, lateral or oblique cutting. Further, chattering vibration can be minimized.

The carbide end mill of the present invention has peripheral cutting edges whose phases are deviated from the respective reference phases of the reference peripheral cutting edge, wherein the distance of the reference phase is an amount corresponding to a value obtained by dividing a pitch of the nick of the reference peripheral cutting edge by the number of the cutting edges—and also has the above-described gash shape in regions from the cutting faces of the end cutting edges to the peripheral cutting edges. Therefore, the carbide end mill of the present invention can efficiently cut structural steel, structural alloy steel, die steel for cold or hot working, stainless steel, titanium alloy, and super-heat-resistant alloy.

That is, the carbide end mill of the present invention is intended to machine a workpiece formed of structural steel, structural alloy steel, die steel for cold or hot working, stainless steel, titanium alloy, or super-heat-resistant alloy.

Next, suitable hard coats for the carbide end mill of the present invention and which enhances the characteristics thereof will be described. In the present invention, the shape of the carbide end mill is novel enough to enable high-speed cutting. Therefore, a hard coat is not necessarily required. However, use of an optimal hard coat is important so as to stabilize and extend the service life of the end mill of the present invention when the end mill is used for high-speed cutting.

Various hard coats have been developed so as to improve the performances and service lives of carbide end mills, and the hard coat proposed by the applicant of the present invention and disclosed in Patent Document 7 has been put to practical use. Since end mills are required to have higher oxidation resistance and higher wear resistance so as to cope with an increase in cutting speed, measures for enhancing oxidation resistance and wear resistance must be taken. When the present inventors actually used the above-described carbide end mill having a novel shape for rough machining, they found a remarkable increase in oxidation and wear of the peripheral cutting edges, which are peculiar to high-speed cutting. The present invention has been accomplished as measures against such oxidation and wear.

That is, the carbide end mill with hard coat according to the present invention is characterized in that a hard coat which can endure high-speed cutting is laminated on at least the wavy peripheral cutting edges or nicked peripheral cutting edges having a novel shape as described earlier.

In the case where the end mill has the above-described gashes, the hard coat according to the present invention is coated on the gash portions. Although removal of hot chips during cutting damages carbide, the hard coat of the present invention can greatly mitigate the damage.

That is, desirably, the carbide end mill of the resent invention is configured such that the above-mentioned wavy peripheral cutting edges are covered with a hard coat.

Next, the hard coat applied to the carbide end mill of the present invention will be described specifically. The hard coat used in the present invention is composed of an outermost layer and an innermost layer in contact with the surfaces of the peripheral cutting edges, or repetitive composite layer combined by substantially the same of the outermost layer composition and substantially the same of the innermost layer composition, or a composite layer including the above-described innermost layer and outermost layer, and one or more intermediate layers interposed therebetween. Desirably, the outermost layer is greater in oxidation resistance and wear resistance than the innermost layer.

The term "substantially" is used so as to encompass the case where a diffusion layer is formed between the innermost layer and the outermost and the diffusion layer may slightly differ in composition from the innermost layer or the outermost layer. But in the case where the thickness of the diffusion layer increases and the content ratio of a certain element in the diffusion layer deviates 50% or more from that element of the innermost layer and the outermost layer, the diffusion layer is regarded as an intermediate layer in the present invention.

By means of forming the hard coat on the end mill of the present invention by use of nitride, carbonitride, oxynitride, or oxycarbonitride of a metallic element with selecting the most suitable metallic element for the innermost layer, the outermost layer, and the intermediate layer which constitute a respective hard coat, damage to a carbide end mill covered by a hard coat can be mitigated, thereby enabling cutting operation to be performed more efficiently.

That is, in the carbide end mill of the present invention, the innermost layer of the hard coat is formed of a nitride, carbonitride, oxynitride, or oxycarbonitride containing Ti and Al as main metallic elements, and the outermost layer of the hard coat is formed of a nitride, carbonitride, oxynitride, or oxycarbonitride containing Ti and Si as main metallic elements.

Moreover, in the carbide end mill of the present invention, the innermost layer of the hard coat is formed of a nitride containing one or more metal elements selected from among Al, Cr, Ti, and Si; the intermediate layer is formed of a compound containing one or more metal elements selected from among Al, Cr, Ti, and Si, and one or more elements selected from among N, B, C, and O; and the outermost layer of the hard coat is formed of a compound containing one or more metal elements selected from among Ti and Si, and one or more elements selected from among N, S, C, and B.

Moreover, in the carbide end mill of the present invention, desirably, both the innermost layer and the outermost layer are formed of a nitrogen-containing TiAl compound which is represented by the formula $Ti_xAl_{1-x}N$, and preferably the innermost layer is formed of titanium-rich $Ti_xAl_{1-x}N$ (i.e., $0.5<x\leq1$), and the outermost layer is formed of aluminum-rich $Ti_xAl_{1-x}N$ (i.e., $0\leq x<0.5$).

The shape of the wavy peripheral cutting edges or the nicked peripheral cutting edges and the novel gash shape in the present invention yield various effects, such as enhanced chip breaking performance and enhanced chip removal performance, even in the case where a cutting edge portion of the end mill is detachable from a tool-holding portion thereof which holds the cutting edge portion. Therefore, when the cutting edge portion of the end mill wears as a result of cutting, the cutting edge portion can be exchanged individually for continuous use. Therefore, desirably, the end mill of the present invention includes a tool-holding portion and a cutting edge portion which is formed of carbide and which is detachably attached to the tool-holding portion.

That is, the present invention provides a carbide end mill characterized in that cutting edge portion formed of carbide is detachably attached to a tool-holding portion.

In the case where machining of a concave shape or the like, involving longitudinal-feed cutting and oblique cutting, is performed by use of conventional end mills, which are dedicated for longitudinal-feed cutting or oblique cutting, person had to change to a suitable end mill for the purpose of machining. When the carbide end mill of the present invention is employed, there can be performed a novel cutting method in which various types of machining operations can be performed efficiently by use of a single end mill without tool exchange, because the carbide end mill of the present invention has the above-described novel gashes and the above-described novel shape of the wavy peripheral cutting edges or the nicked peripheral cutting edges, and a hard coat which can endure high-speed cutting operation is layered on at least the peripheral cutting edges having a unique shape.

A cutting method according to the present invention is characterized by comprising the step of successively performing at least two types of cutting operations selected from longitudinal-feed cutting, lateral-feed cutting, and oblique cutting, by use of a carbide end mill. The carbide end mill includes a plurality of wavy peripheral cutting edges each having alternate crest portions and trough portions, or a plurality of peripheral cutting edges each having a plurality of nicks for breaking chips, end cutting edges, and gashes each composed of a plurality of gash surfaces. The plurality of gash surfaces include a first gash surface serving as a cutting face of the corresponding end cutting edge, a second gash surface provided on the side toward the rotational center of the tool axis of the end mill, and a third gash surface provided on the peripheral side of the end mill. A first gash angle of 15° to 35° is formed between a crossing portion between the first gash surface and the second gash surface, and a plane perpendicularly intersecting the axis. A second gash angle of 40° to 60° is formed between a crossing portion between the first gash surface and the third gash surface, and the plane perpendicularly intersecting the axis. The length of a connection portion between the second gash surface and the third gash surface is not less than 5% the tool diameter as measured from the tool rotation axis and less than 20% the tool diameter. The peripheral cutting edges are disposed such that, when a certain peripheral cutting edge is considered a reference peripheral cutting edge with reference phases in a pitch of the reference peripheral cutting edge, wherein the distance of each reference phase is an amount corresponding to a value obtained by dividing the pitch of the nicks or waveform of the reference peripheral cutting edge by the number of the cutting edges, and the phase of at least one of the remaining peripheral cutting edges is deviated in the direction of the tool axis from the corresponding reference phase by an amount corresponding to 5% or less (excluding 0%) of the pitch.

Effects of the Invention

In the carbide end mill of one invention, when a certain wavy or nicked peripheral cutting edge is considered a reference peripheral cutting edge, the phase of at least one of the remaining wavy or nicked peripheral cutting edges are deviated from the reference phase of the reference peripheral cutting edge and shifted from one another by an amount corresponding to a value obtained by dividing the pitch of the nicks or waveform of the reference peripheral cutting edge by the number of the cutting edges, and the amount of the deviation in the direction of the tool axis from each of the corresponding reference phase by an amount corresponding to 5% or less (excluding 0%) of the pitch, preferably, an amount corresponding to 1% to 3% of the pitch. Therefore, cutting resistance is dispersed, and cutting load is stabilized, whereby chattering vibration can be suppressed.

In the carbide end mill of one invention, when a certain peripheral cutting edge is considered a reference peripheral cutting edge, the phase of at least one of the remaining peripheral cutting edges are shifted from the reference phase of the reference peripheral cutting edge by an amount corresponding to a value obtained by dividing the pitch of the nicks or waveform of the reference peripheral cutting edge by the number of the cutting edges, and the amount of the deviation in the direction of the tool axis from each of the corresponding reference phase by an amount corresponding to 5% or less (excluding 0%) of the pitch of the peripheral cutting edge, preferably, an amount corresponding to 1% to 3% of the pitch. This end mill not only suppresses chattering vibration, but also breaks chips properly, can stably rotate at high speed, and has an extended service life.

The end mill according to another invention in which the radius of curvature of the tool-end-side rounded portion of each nick is made smaller than the radius of curvature of the tool-shank-side rounded portion of each nick and the bottom end of each nick is connected with the tool-shank-side round portion via a portion having a novel shape has a higher chipping resistance. Accordingly, stable machining can be performed without occurrence of fracture or chipping. Therefore, according to the present invention, there can be provided a nicked carbide end mill which can perform high-efficiency rough machining and high-efficiency semi-finish machining through high-speed cutting, and which has a long service life. Also, the nick shape according to the present invention improves the cutting performance of the end mill, to thereby reduce line-shaped marks on a machined surface. Accordingly, a workpiece can be machined to have an accurately machined surface.

Moreover, in the end mill of the present invention, a cutting edge portion formed of carbide is detachably attached to a tool-holding portion. Therefore, when the cutting edge portion wears, the cutting edge portion can be exchanged individually for new one of the end mill of the present invention maintaining of the above-mentioned effects, such as enhanced chip-breaking performance and enhanced chip-removing performance, realized through employment of the novel gash shape and the novel shape of the wavy peripheral cutting edges or the nicked peripheral cutting edges.

An end mill having wavy or nicked peripheral cutting edges according to the present invention can be rotated at a speed at least 1.5 times that of a conventional end mill whose peripheral cutting edges have no phase deviation in the direction of the tool axis. In particular, the hard coat applied to the peripheral cutting edges enables stable high-efficiency machining.

The carbide end mill of the present invention which is coated with a hard coat can have improved characteristics, can perform cutting at high speed, and can have a long service life, thanks to synergetic effects; i.e., the combination of the effects of the novel shape of the tool which can disperse cutting resistance and can suppress chattering vibration to thereby prevent accidental occurrence of fracture or chipping even when the carbide end mill performs high-speed cutting, and the effect of the hard coat which prevents oxidation and wear caused by severe high-speed cutting.

Specifically, the end mill of the present invention can machine at a cutting speed (peripheral speed) greater than 200 m/min, unlike the conventional end mill whose peripheral cutting edges have no phase deviation in the direction of the tool axis. Such an effect of high-efficiency machining is attained by the synergetic effect of the novel shape of the end mill and the hard coat of the present invention.

The peripheral cutting edges and gashes covered by the hard coat may be the wavy peripheral cutting edges or the nicked peripheral cutting edges of the present invention. When the hard coat covers not only these novel peripheral cutting edges but also all the gash portions which satisfy the above-described condition for the gashes shape, damage to carbide caused by removal of chips can be suppressed to the greatest possible extent.

Although a carbide end mill is expected that it might have a longer service life as compared with a conventional end mill formed of high-speed tool steel, a nick of fracture is always worried at the cutting edges, because the carbide end mill is formed of a brittle material. According to the present invention, there can be provided a carbide end mill with hard coat which can prevent chipping or breakage of the cutting edges and which has a long service life.

Since the nicked carbide end mill of the present invention is configured such that the phases of the nicked peripheral cutting edges are shifted from one another, chattering vibration can be suppressed without causing fracture or chipping. Accordingly, the present invention can perform high-efficiency rough machining or high-efficiency semi-finishing machining at a feed rate of 1000 mm/min or greater, and can have a long service life.

The carbide end mill of the present invention in which the gash shape is optimized within a range defined in the present invention can cope with various types of machining such as longitudinal-feed cutting, lateral-feed cutting, and oblique cutting. Therefore, the carbide end mill of the present invention can perform various types of machining operations, from high-efficiency rough machining to high-efficiency semi-finishing machining, through high-speed cutting, and can have a long service life.

Specifically, any of the carbide end mills of the present invention can perform, at the time of lateral-feed cutting, high-efficiency machining in which cutting speed is made at least 1.5 times the cutting speed of a conventional end mill whose cutting edges have no phase shift in the direction of the tool axis, while greatly suppressing chattering vibration. Moreover, the carbide end mill of the present invention in which the gash shape is optimized can perform, at the time of oblique cutting, high-efficiency machining in which cutting speed is made at least 1.5 times the cutting speed of the conventional end mill.

The carbide end mill of the present invention can be manufactured in the same manner as ordinary end mills, because the cutting edges are not separated unequally. Therefore, the carbide end mill of the present invention can be easily manufactured at lower cost. Furthermore, since all the flutes of the cutting edges have the same shape, chips are removed uniformly, and excellent chip removability is attained. Thus, the carbide end mill of the present invention can have a consistent service life, and can perform high-speed cutting.

The carbide end mill according to the present invention can perform high-efficiency machining for a wide range of workpieces, including those formed of structural steel, structural alloy steel, die steel for cold or hot working, stainless steel, titanium alloy, and super-heat-resistant alloy, which workpieces have many applications in the market.

When a conventional end mill is used, the maximum (limit) tilt angle of the end mill during oblique cutting is about 5°. In general, ordinary oblique cutting is performed while the tilt angle is set to about 3°. When the end mill of the present invention is used, ordinary oblique cutting can be performed while the tilt angle is set to 20° or greater. Therefore, even when a concave shape, such as a pocket is machined, a drill is not required to be used in combination with the end mill, and operation of exchanging the drill with the end mill and setup operation become unnecessary. That is, according to the cutting method performed by use of a carbide end mill of the present invention, oblique cutting, such as hole machining, can be performed efficiently, and, at the time of machining of a pocket shape, a number of tool exchange operations and setup operations can be reduced, whereby the process can be shortened, and the machining time can be shortened.

BRIEF DESCRIPTION OF THE DRAWINGS

FIGS. 2(a) and 2(b) are enlarged cross-sectional views of a peripheral cutting edge taken along line A-A' of FIG. 1, wherein FIG. 2(a) is an enlarged cross-sectional view of a wavy peripheral cutting edge, and FIG. 2(b) is an enlarged cross-sectional view of a nicked peripheral cutting edge.

FIGS. 26(a) and 26(b) are views corresponding to the cross-sectional view of a peripheral cutting edge of FIG. 1 taken along line A-A' and showing a hard coat applied to the carbide end mill of the present invention, wherein FIG. 26(a) is an enlarged cross-sectional view of a wavy peripheral cutting edge, and FIG. 26(b) is an enlarged cross-sectional view of a nicked peripheral cutting edge.

MODE FOR CARRYING OUT THE INVENTION

Figure 1:
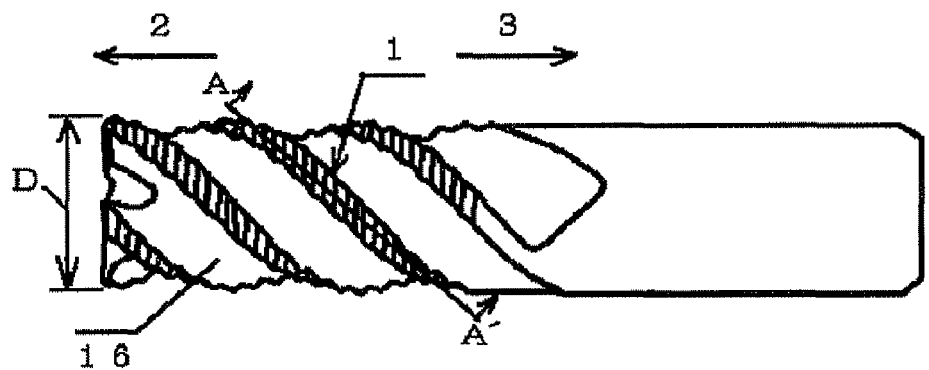
FIG. 1 is an overall schematic view of a carbide end mill showing one embodiment of the present invention.

Embodiments of the present invention will now be described with reference to FIGS. 1 to 31, while comparing with conventional examples. In the case of the embodiments of the present invention described below, hard coat is not necessarily required. However, desirably, hard coat is provided in order to improve performances. FIG. 1 is an overall schematic view of a carbide end mill showing one embodiment of the present invention. FIG. 1 shows an example carbide end mill which has a tool diameter D and has flutes 16 for chip removal and four peripheral cutting edges 1 on the periphery thereof. The peripheral cutting edges are wavy peripheral cutting edges extending from a tool end side 2 toward a shank side 3. The number of the cutting edges can be changed as needed so long as the number of the cutting edges is two or more, which enables phase shift among the cutting edges. For example, in the case where the end mill is used to cut aluminum or the like, the number of the cutting edges is set to two or so in order to make chip pockets for chip removal a little larger. In the case where the end mill is used to cut hard material, the number of the cutting edges can be increased up to eight so as to cope with high feed rates.

Figure 2:

FIGS. 2(a) and 2(b) are enlarged cross-sectional views of a peripheral cutting edge taken along line A-A' of FIG. 1. FIG. 2(a) is an enlarged cross-sectional view of a wavy peripheral cutting edge. As shown in FIG. 2, a normal wavy cutting edge has a waveform whose wave height is indicated by 5 and which includes crest portions 6 and trough portions 7 repeatedly appearing at a waveform pitch 4. FIG. 2(b) is an enlarged cross-sectional view of a nicked peripheral cutting edge. Each nicked peripheral cutting edge has a shape which has a nick (depth is denoted by 9) and which is repeated at a nick pitch 8, which is the interval of intersections 20 between the peripheral cutting edge and nicks. Thus, the nicked peripheral cutting edge can break chips to thereby reduce cutting resistance.

Figure 3:
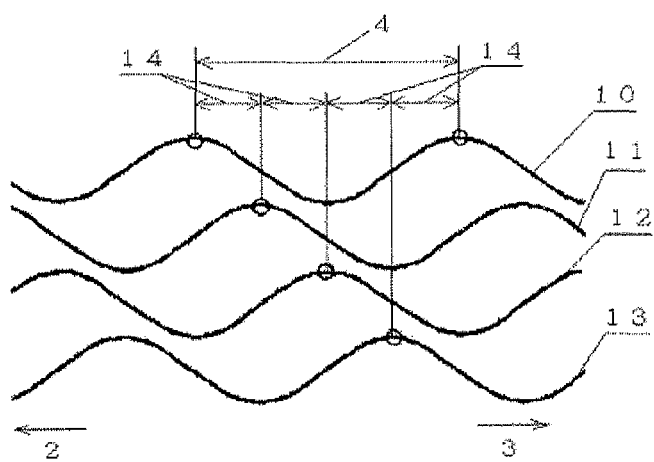
FIG. 3 is a development figure showing the phases and pitch of the wavy peripheral cutting edges of a conventional end mill in which the peripheral cutting edges have no phase deviation.
Figure 4:
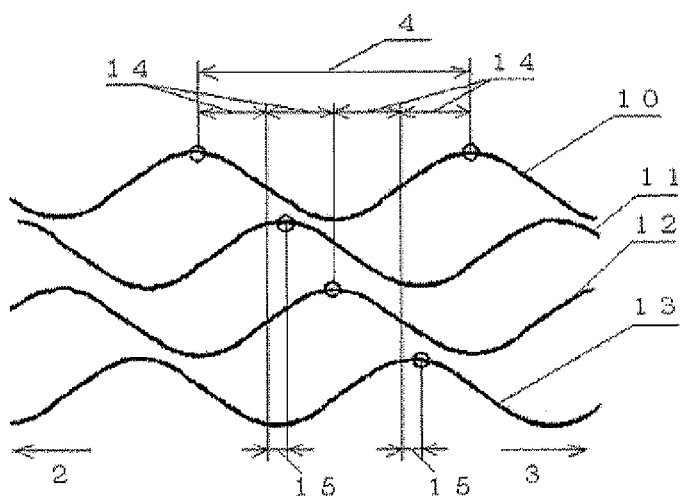
FIG. 4 is a development figure showing the phases and pitch of the wavy peripheral cutting edges of a carbide end mill of the present invention.
Figure 5:
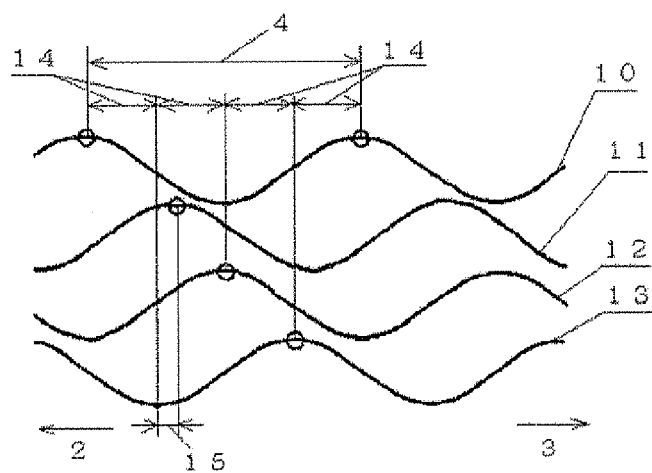
FIG. 5 is a development figure showing one embodiment of the present invention in which one pair of wavy peripheral cutting edges of adjacent wavy peripheral cutting edges has no phase deviation from the respective reference phases lined up in a pitch of the reference peripheral cutting edge, wherein the same distance of the reference phase is an amount corresponding to a value obtained by dividing the waveform pitch by the number of the cutting edges—and one cutting edge is deviated from the corresponding reference phase.

The waveform pitch and phases of wavy peripheral cutting edges of the carbide end mill of the present invention and those of a conventional end mill will be described for comparison with reference to FIGS. 3 to 5. FIG. 3 is a development figure showing the phases and pitch of the wavy peripheral cutting edges of a conventional end mill in which the peripheral cutting edges have no phase deviation. FIG. 4 is a development figure showing the phases and pitch of the wavy peripheral cutting edges of a carbide end mill of the present invention. FIG. 5 is a development figure showing the one embodiment of the present invention in which one pair of wavy peripheral cutting edges of adjacent wavy peripheral cutting edges has no phase deviation from respective reference phases—which are shifted from one another by an amount corresponding to a value obtained by dividing the waveform pitch by the number of the cutting edges—and one cutting edge is deviated from the corresponding reference phase. Notably, in FIGS. 3 to 5, the positions of crest portions of the waveform are indicated by circular marks.

As shown in FIG. 3, in the case of the conventional end mill, a first wavy peripheral cutting edge, which is illustrated at the top in the drawing, is a reference peripheral cutting edge 10. A waveform pitch 4, which is a distance from a certain crest portion to the next crest portion, (in the case of a nicked peripheral cutting edge, nick pitch 8, which is a distance from the intersection of a certain peripheral cutting edge with a certain nick to the next intersection of the next peripheral cutting edge with the next nick) is divided by four so as to obtain each reference phase 14. The remaining peripheral cutting edges are disposed such that crest portions of second, third, and fourth wavy peripheral cutting edges 11, 12, and 13 are successively arranged with the distance of the each reference phase 14 (every ¼ the pitch of the reference peripheral cutting edge 10) therebetween.

In such an arrangement, the reference phase 14 between the crest portions of a certain wavy peripheral cutting edge and those of a wavy peripheral cutting edge adjacent thereto is constant among all the wavy peripheral cutting edges. Therefore, the amount of cutting of a workpiece by the end mill is equally shared by each of the wavy peripheral cutting edge. In the case where each cutting edge cuts the workpiece in the same amount, resonance occurs during machining, as in the case of an equal separation end mill, which has been described in the prior art section. Therefore, chattering vibration is apt to be generated.

In contrast, in the case of the end mill of the present invention, as shown in FIG. 4, the crest portion of the phases of the second wavy peripheral cutting edge 11 which are disposed adjacent to the reference peripheral cutting edge 10, and the phase of the fourth wavy peripheral cutting edge 13, are shifted equally by a deviation amount 15 from each of the reference phase 14 wherein the distance of each reference phase 14 is obtained by dividing the waveform pitch 4 by four. Specifically, the deviation amounts 15 of the reference phases 14 of the wavy peripheral cutting edges, other than the reference peripheral cutting edge 10, are determined such that the phase of at least one wavy peripheral cutting edge is deviated by an amount corresponding to 5% or less (excluding 0%) of the waveform pitch 4 of the reference peripheral cutting edge 10 in the direction of the tool axis from the corresponding reference phase 14, the distance of the reference phase 14 obtained by dividing the wavy form pitch 4 by four.

One of the embodiment of the carbide end mill of the present invention shown in FIG. 4 is that the waveform pitch 4 of the reference peripheral cutting edge 10 is 1 mm and the reference phase 14 is obtained by dividing 1 mm of waveform pitch 4 by four that is the number of the wavy peripheral cutting edge. In such a case, the deviation amount 15 of the phase of the second wavy peripheral cutting edge 11 from the corresponding reference phase is 0.02 mm (2% the waveform pitch 4), the deviation amount 15 of the phase of the third wavy peripheral cutting edge 12 from the corresponding reference phase is 0 mm, and the deviation amount 15 of the phase of the fourth wavy peripheral cutting edge 13 from the corresponding reference phase is 0.02 mm (2% the waveform pitch 4). The deviation amount 15 assumes a positive value when the phase is deviated toward the shank side 3, and a negative value when the phase is deviated toward the tool end side 2.

In the case of another end mill of the present invention shown in FIG. 5, peaks of the phase of the second wavy peripheral cutting edge 11 disposed next to the reference peripheral cutting edge 10 is deviated from the corresponding reference phase by the deviation amount 15, and the phases of the adjacent third wavy peripheral cutting edge 12 and the fourth wavy peripheral cutting edge 13 are not deviated from the corresponding reference phase 14 of the reference phases. The deviation amounts 15 of the phases of at least one wavy peripheral cutting edges, other than the reference peripheral cutting edge 10, are determined such that the deviation amount 15 is 5% or less (excluding 0%) of the waveform pitch 4 of the reference peripheral cutting edge 10 and the peripheral cutting edge with that deviation amount 15 from the reference phase 14 is set to the direction of tool axis. As described above, the carbide end mill is configured such that the carbide end mill has three or more wavy peripheral cutting edges; at least a pair of peripheral cutting edges of the adjacent peripheral cutting edges has no phase deviation from the respective reference phases; and the amounts of deviation of the remaining peripheral cutting edges from the respective reference phases are unequal from one another. Even in such a case, chattering vibration can be suppressed, and high-efficiency machining can be performed through high speed cutting.

An example of the end mill in which the phase of only one cutting edge is deviated from the corresponding reference phase will be described below. A small-diameter end mill used to form a groove in a workpiece often has three (odd number) cutting edges in order to secure chip removal. In such a case, according to the specifications described in Patent Document 1, all the deviation amounts 15 from the reference phase 14 of the mutually adjacent peripheral cutting edges are rendered different from one another. In contrast, according to the present invention, the deviation amount 15 from the reference phase 14 is limited to only one peripheral cutting edge.

In the case of an end mill which has five (odd number) cutting edges, according to the specifications described in Patent Document 1, two kinds of deviation amounts 15 from the reference phases are required. In contrast, according to the present invention, only one type of deviation amount 15 from the reference phases 14 is required. Even in such a case, chattering vibration can be suppressed, high-efficiency machining can be performed through high-speed cutting, and service life can be extended according to the present invention.

In the carbide end mill of the present invention, as described above, when the positions of the crest portions of each wavy peripheral cutting edge are deviated, the amount of cutting of a workpiece by the end mill is unequally shared by the cutting edges, whereby chattering vibration can be suppressed.

Figure 10:
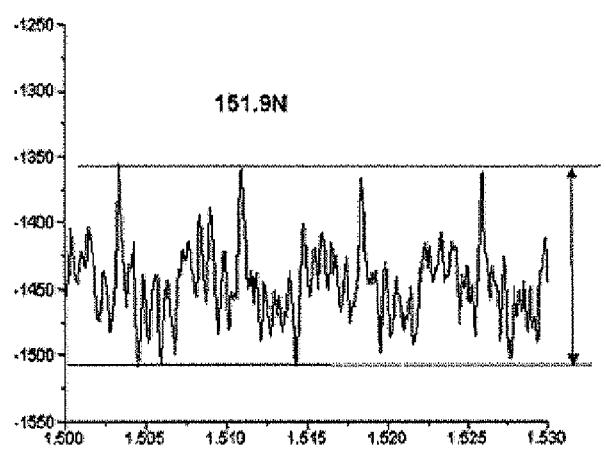
FIG. 10 is a graph showing cutting resistance for a conventional end mill in which cutting edges are separated unequally.
Figure 11:
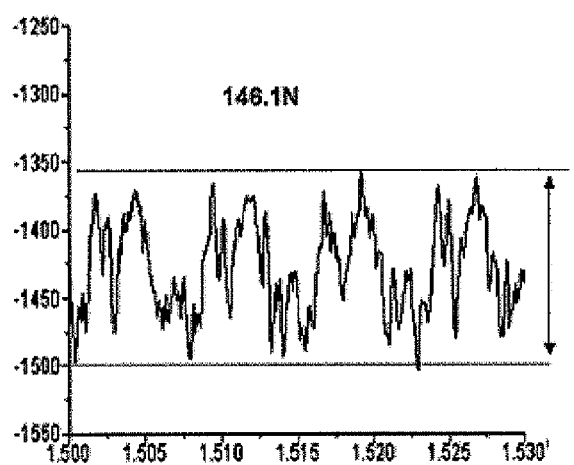
FIG. 11 is a graph showing cutting resistance for the case where cutting operation is performed by use of the carbide end mill of the present invention in which the phases of the waveform peripheral cutting edges are deviated by an amount corresponding to 2% the waveform pitch which falls in a desired range of the present invention from the respective reference phases arrayed in equal distance which equal distance is obtained by dividing the waveform pitch by the number of the cutting edges of the peripheral cutting edge.

The results of an experiment in which cutting resistance and chattering vibration were measured for a conventional end mill in which peripheral cutting edges have no phase deviation and a carbide end mill of the present invention, will be described with reference to FIGS. 9 to 11.

Figure 9:
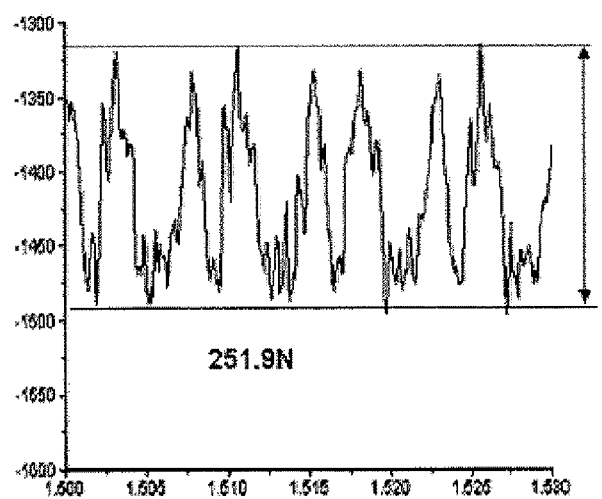
FIG. 9 is a graph showing cutting resistance for a conventional end mill in which the phases of cutting edges are shifted from one another by an equal amount.

FIG. 9 is a graph showing cutting resistance for a conventional end mill in which the phases of cutting edges are shifted from one another by an equal amount. FIG. 10 is a graph showing cutting resistance for a conventional end mill in which cutting edges are separated unequally. FIG. 11 is a graph showing cutting resistance for the case where cutting operation is performed by use of a carbide end mill of the present invention. The end mill of the present invention has peripheral cutting edges in which phases are deviated from the respective reference phases of peripheral cutting edge. The respective reference phase is arranged equally with the distance value obtained by dividing the pitch of the wave by the number of the cutting edge. The amount of the deviation is 2% the waveform pitch, which falls within a preferred range of the present invention in FIG. 11.

A workpiece was formed of structural steel, and an end mill used for measurement was formed of carbide, and had a tool diameter D of 8 mm and four cutting edges. Data were acquired in a state in which the end mill was forming a groove in the workpieces under the following cutting conditions: N=8000 rpm (Vc=200 m/min); Vf=3000 mm/min (fz=0.09 mm/tooth), and axial cutting amount=8 mm. Chattering vibration was determined from the amplitude of the waveform of cutting resistance.

As shown in FIG. 9, in the case of the conventional end mill in which the cutting edges had no phase deviation, the amplitude of the waveform of cutting resistance was 251.9 N (Newton). This means that a cutting force acts on a workpiece at a period corresponding to a value obtained by multiplying the rotational speed at the time of cutting by the number of the cutting edges, and resonance occurs at a frequency corresponding to that period, whereby chattering vibration is generated. In particular, during high-speed cutting, resonance is more likely to occur, and the magnitude of chattering vibration increases. As shown in FIG. 10, in the case of the conventional end mill in which cutting edges are separated unequally, the amplitude of the cutting resistance waveform was 151.9 N. As shown in FIG. 11, in the case of the end mill of the present invention, the amplitude of the cutting resistance waveform was 146.1 N, and the amplitude of the cutting resistance waveform of the end mill of the present invention was the smallest.

The end mill of the present invention is configured such that the end mill includes a plurality of wavy peripheral cutting edges each having alternate crest portions and trough portions. When a certain peripheral cutting edge is considered a reference peripheral cutting edge with the equally distant reference phases which distance is obtained by dividing the wave pitch of the reference peripheral cutting edges by the number of the cutting edges, and the phase of at least one of the remaining peripheral cutting edges is deviated in the direction of the tool axis from the corresponding reference phase of the reference peripheral cutting edges by an amount corresponding to 5% or less (excluding 0%) of the waveform pitch. When the end mill of the present invention is used, the amount of cut by an edge slightly differs among each of the peripheral cutting edges. Therefore, even when high-speed cutting is performed, cutting resistance is dispersed, and cutting load becomes stable, whereby chattering vibration can be suppressed.

The reason for determining the phase deviation amount such that it becomes equal to or less than 5% (excluding 0%) of the waveform pitch will be described below. In the case where the phase deviation amount is greater than 5%, the amount of cutting greatly differs among the peripheral cutting edges, and cutting load concentrates on the peripheral cutting edge having the largest phase deviation amount. Accordingly, breakage of the tool or chipping of the wavy peripheral cutting edge occurs, whereby the service life of the end mill becomes short as a whole.

Patent Document 1 discloses an example in which cutting was performed by use of an end mill which was formed of high-speed steel and in which the phase deviation amount was set to about 6%. If high-speed cutting is performed by use of an end mill of the present invention whose base material is carbide and in which the phase deviation amount was set to the same value, variation of cutting load increases, and chipping occurs at the wavy peripheral cutting edge having the largest deviation amount.

In the case where a workpiece formed of a material having a good merchantability such as cast iron is machined by use of an end mill whose base material is high-speed tool steel having a high toughness at a cutting speed of 80 m/min or less, the workpiece can be machining without problem. However, in the case where a carbide end mill is used for performing higher-efficiency machining, the above-mentioned phase deviation amount of 6% is excessively large, and the problems of chipping, fracture, etc. occur. This was confirmed through an experiment in an example to be described later.

At present machining sites where dies and parts are machined, there is required an end mill which can machine a hardened material having a hardness greater than 40 HRC, as well as steel not having hardening treatment. End mills formed of high-speed tool steel cannot satisfy the above-mentioned need, irrespective of their shapes, because their service lives become extremely short.

In order to enable high-efficiency machining or cutting of a hard material, which is common in such machining sites, the present invention provides a carbide end mill in which the phases of the wavy peripheral cutting edges are deviated optimally and which is characterized by the phase deviation amount which prevents fracture or chipping during high-speed cutting. The phase deviation amount is set to 5% or less. Desirably, the phase of at least one wavy peripheral cutting edge is deviated in the direction of the tool axis from the corresponding reference phases of the reference peripheral cutting edge by 1% to 3% the waveform pitch.

As described above, the carbide end mill of the present invention in which the phases of the wavy peripheral cutting edges are deviated can be used to machine a workpiece formed of structural steel, structural alloy steel, die steel for cold or hot working, hot-rolled die steel, stainless steel, titanium alloy, or super-heat-resistant alloy. Even in such a case, chattering vibration can be suppressed, breaking of chips can be performed properly, the end mill of this invention can be stably rotated at high speed, and the end mill can have an extended service life.

Figure 6:
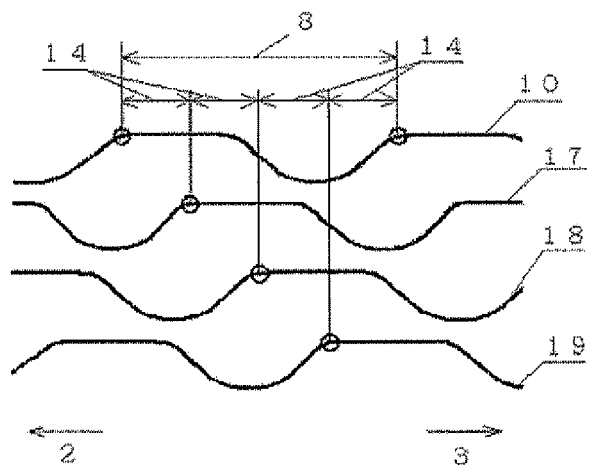
FIG. 6 is a development figure showing the pitch of nicks and the phase of nicked peripheral cutting edges of a conventional end mill in which the peripheral cutting edges have no phase deviation.
Figure 7:
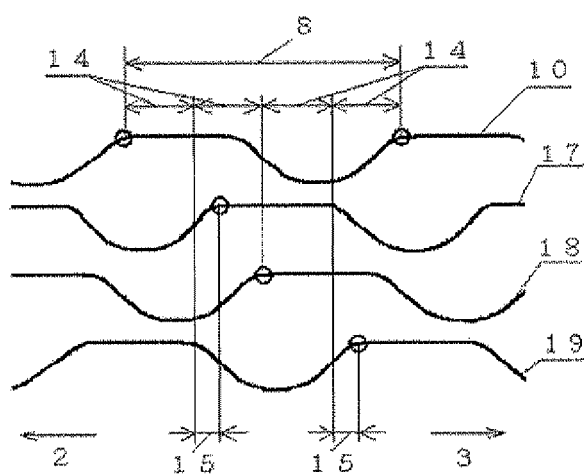
FIG. 7 is a development figure showing the pitch of nicks and the phase of nicked peripheral cutting edges of a carbide end mill of the present invention.
Figure 8:
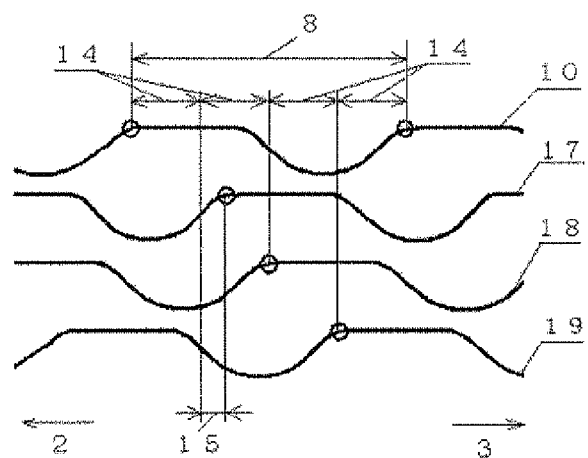
FIG. 8 is a development figure showing one embodiment in which a pair of nicked peripheral cutting edges of the adjacent nicked peripheral cutting edges has no phase deviation from the respective reference phase ranged by equal distance of the reference peripheral cutting edge, which equal distance is obtained by dividing the nick pitch by the number of the cutting edges of the peripheral cutting edge.

Next, a carbide end mill of the present invention which has nicked peripheral cutting edges will be described. FIGS. 6 to 8 are development figures which show, for comparison, the nick pitch and phases of nicked peripheral cutting edges of a carbide end mill of the present invention and those of a conventional end mill. FIG. 6 is a development figure showing the pitch of nicks and the phase of nicked peripheral cutting edges of a conventional end mill in which the peripheral cutting edges have no phase deviation. FIG. 7 is a development figure showing the pitch of nicks and the phase of nicked peripheral cutting edges of a carbide end mill of the present invention. FIG. 8 is a development figure showing one embodiment in which a pair of nicked peripheral cutting edges of the adjacent nicked peripheral cutting edges has no phase deviation from the respective reference phases with equal distances which are obtained by dividing the nick pitch by the number of the cutting edges, and one cutting edge is deviated from the corresponding reference phase. Notably, in FIGS. 6 to 8, the positions of intersections between the peripheral cutting edges and nicks are indicated by circular marks.

As shown in FIG. 6, in the case of the conventional end mill, a first nicked peripheral cutting edge, which is illustrated at the top in the drawing, is a reference peripheral cutting edge 10. A nick pitch 8 is a distance from the intersection 20 between a certain nick and the reference peripheral cutting edge 10 to the next intersection 20. Each reference phase 14 is obtained by dividing the nick pitch 8 by four, and the remaining peripheral cutting edges are arranged such that the intersections 20 between the corresponding nicks and the second, third, and fourth nicked peripheral cutting edges 17, 18, and 19 are successively arranged with same distance of the reference phase 14 (¼ the pitch of the reference peripheral cutting edge 10) therebetween.

In such an arrangement, the reference phase 14 between the intersections 20 of a certain nicked peripheral cutting edge and those of a nicked peripheral cutting edge adjacent thereto is constant among all the nicked peripheral cutting edges. Therefore, the amount of cutting of a workpiece by the end mill is equally shared by each of the nicked peripheral cutting edges. In the case where each cutting edge cuts the workpiece in the same amount, resonance occurs during machining, as in the case of an equal separation end mill, which has been described in the prior art section. Therefore, chattering vibration is easily generated.

In contrast, in the case of the end mill of the present invention, as shown in FIG. 7, The intersection 20 of a certain nick and each of the second nicked peripheral cutting edge 17 which are disposed adjacent to the reference peripheral cutting edge 10, and the fourth nicked peripheral cutting edge 19, are deviated from respective ones of the reference phases 14 in the direction of the tool axis by a deviation amount 15. The value of the reference phase 14 is obtained by dividing the nick pitch 8 by four—by a deviation amount 15. Specifically, the deviation amounts 15 of the phases of the second nicked peripheral cutting edge 17 and the fourth nicked peripheral cutting edge 19 are determined such that the phase of at least one nicked peripheral cutting edge is deviated in the direction of the tool axis from the corresponding reference phase 14, by an amount corresponding to 5% or less (excluding 0%) of the nick pitch 8 of the reference peripheral cutting edge 10.

FIG. 7 shows an example carbide end mill of the present invention configured such that the nick pitch 8 of the reference peripheral cutting edge 10 is 1 mm. In such a case, the deviation amount 15 of the phase of the second nicked peripheral cutting edge 17 from the corresponding reference phase 14 of the reference peripheral cutting edge is 0.02 mm (2% the nick pitch 8), the deviation amount 15 of the phase of the third nicked peripheral cutting edge 18 from the corresponding reference phase 14 is 0 mm, and the deviation amount 15 of the phase of the fourth nicked peripheral cutting edge 19 from the corresponding reference phase 14 is 0.02 mm (2% the nick pitch 8). The deviation amount 15 is defined as a positive value when the phase is deviated toward the shank side 3, and a negative value when the phase is deviated toward the tool end side 2.

In the case of another end mill of the present invention shown in FIG. 8, the intersection 20 of a certain nick and the second nicked peripheral cutting edge 17 disposed next to the reference peripheral cutting edge 10 is deviated from the corresponding reference phase 14 by the deviation amount 15, and the phases of the adjacent third nicked peripheral cutting edge 18 and the fourth nicked peripheral cutting edge 19 are not deviated from the corresponding reference phases 14.

In FIG. 8, the deviation amounts 15 of the phases of the nicked peripheral cutting edges, other than the reference peripheral cutting edge 10, from the respective reference phases 14 are determined such that the deviation amount 15 of the phase of at least one nicked peripheral cutting edge from the corresponding reference phase 14 is 5% or less (excluding 0%) of the nick pitch 8 of the reference peripheral cutting edge 10. Furthermore, as in the same manner of the above-mentioned carbide end mill of the present invention which have wavy peripheral cutting edges and in which only one of the peripheral cutting edges has the phase deviation amount 15, when the number of the cutting edges is an odd number, by means of making the phase deviation amount 15 of only one peripheral cutting edge different from those of the remaining peripheral cutting edges, the end mill can suppress chattering vibration, can perform high-efficiency machining through high speed cutting, and can have an extended service life.

The reason for configuring the carbide end mill of the present invention having nicked peripheral cutting edges such that the deviation amount 15 of the phase of each peripheral cutting edge becomes equal to or less than 5% (excluding 0%) of the nick pitch 8 will be described below. In the case where the phase deviation amount is greater than 5%, the amount of cutting greatly differs among the peripheral cutting edges, and cutting load concentrates on the peripheral cutting edge having the largest phase deviation amount. Accordingly, breakage of the tool or chipping of the nicked peripheral cutting edge occurs, whereby the service life of the end mill becomes short as a whole. Preferably, the phase of each nicked peripheral cutting edge is deviated in the direction of the tool axis from the corresponding reference phase 14 by 1% to 3% the nick pitch 8.

As described above, the carbide end mill of the present invention in which the phases of the nicked peripheral cutting edges are deviated from the respective reference phases can be used to machine a workpiece formed of structural steel, structural alloy steel, die steel for cold or hot working, stainless steel, titanium alloy, or super-heat-resistant alloy. Even in such a case, chattering vibration can be suppressed, breaking of chips can be performed properly, the end mill can be stably rotated at high speed, and the end mill can have an extended service life.

Figure 14:
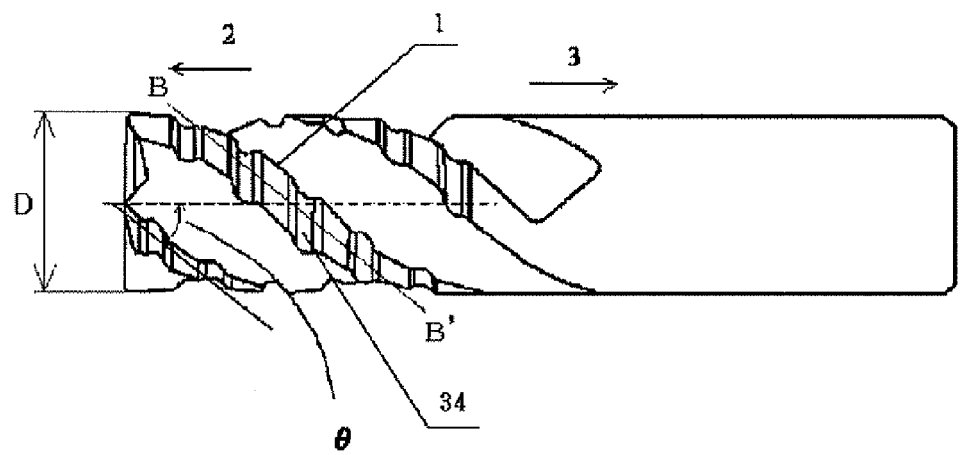
FIG. 14 is an overall schematic view of a nicked carbide end mill showing one embodiment of the present invention.

The distinctive nick shape of the nicked carbide end mill of the present invention will be described, together with the nick shape of a conventional end mill, for comparison with reference to FIGS. 14 to 22. FIG. 14 is an overall schematic view of a nicked carbide end mill showing one embodiment of the present invention. As shown in FIG. 14, the end mill of the present invention has an end mill body which has a tool diameter D and which has a plurality of peripheral cutting edges 1 having a helix angle θ. Nicks 34 for breaking chips are provided on the outer circumference of the end mill body at predetermined intervals from the tool end side 2 toward the shank side 3.

Figure 15:
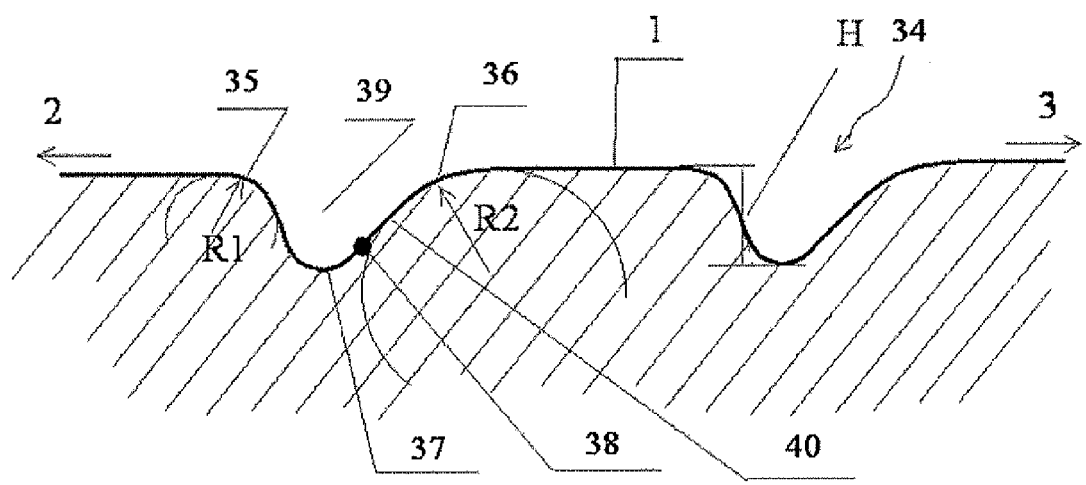
FIG. 15 is an enlarged cross-sectional view of a nicked peripheral cutting edge of FIG. 14, taken along line B-B', that is taken along a cutting plane parallel to a line representing the helix angle of the end mill, for the case where the bottom end of each nick is connected to a tool-shank-side rounded portion via a straight portion.

The detailed cross-sectional shape of the nicks 34 of the nicked carbide end mill of the present invention will be described with reference to FIGS. 15 to 17. The detailed cross-sectional shape of the nicks 34 of a conventional nicked end mill will be described with reference to FIGS. 18 to 22. FIG. 15 is an enlarged cross-sectional view of a nicked peripheral cutting edge of FIG. 14, taken along line B-B', that is taken along a cutting plane parallel to a line representing the helix angle of the end mill, for the case where the bottom end of each nick groove is connected to a tool-shank-side rounded portion via a straight portion.

Since each peripheral cutting edge of the end mill has a predetermined helix angle θ, the B-B' cross section is a cross section of nicks and a peripheral cutting edge taken along a cutting plane parallel to a line representing the helix angle of the end mill. Notably, in FIGS. 15 to 17, which show an example end mill of the present invention and FIG. 18 and FIGS. 20 to 22 which show a conventional end mill, for convenience, the radius of curvature of an circular portion (rounded portion) 35 present on the tool end side of each nick is presented by R1, and the radius of curvature of an circular portion (rounded portion) 36 present on the shank side of the nick is presented by R2. Hatching in each of FIGS. 15 to 22 indicates a cross section of an end mill.

In the nicked carbide end mill of the present invention, each nick 34 is configured such that each nick groove 39 is connected to the corresponding peripheral cutting edge 1 via the tool-end-side rounded portion 35 having the radius R1 of curvature and the tool-shank-side rounded portion 36 having the radius R2 of curvature. The curvature radius R1 of the tool-end-side rounded portion of each nick is rendered smaller than the curvature radius R2 of the tool-shank-side rounded portion of each nick. Furthermore, preferably, a bottom portion 37 of each nick groove 39 has a concave shape, and is connected, at a bottom end 38 of the nick groove 39, to the tool-shank-side rounded portion (having the curvature radius R2) via a straight portion or a convex curve.

Figure 16:
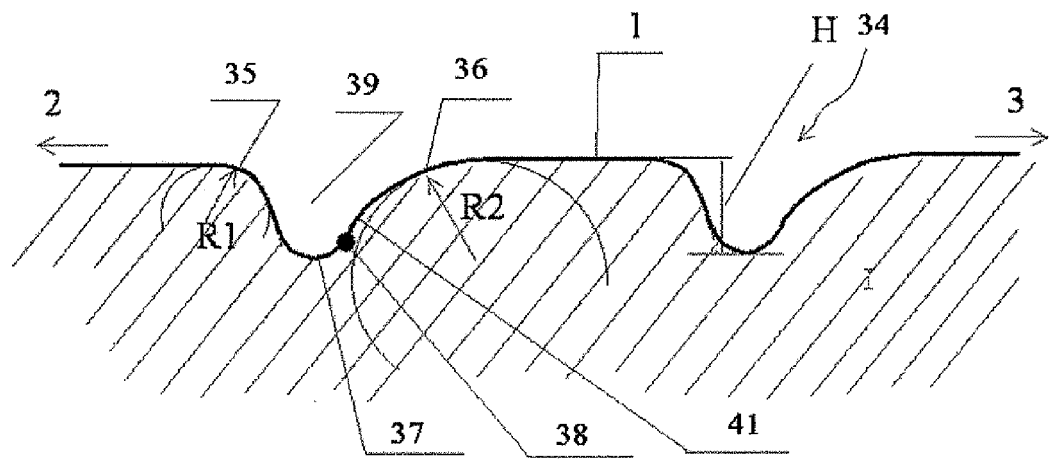
FIG. 16 is a view corresponding to FIG. 15 for the case where the bottom end of each nick is connected to a tool-shank-side rounded portion via a curve portion convexed toward the nick groove.
Figure 17:
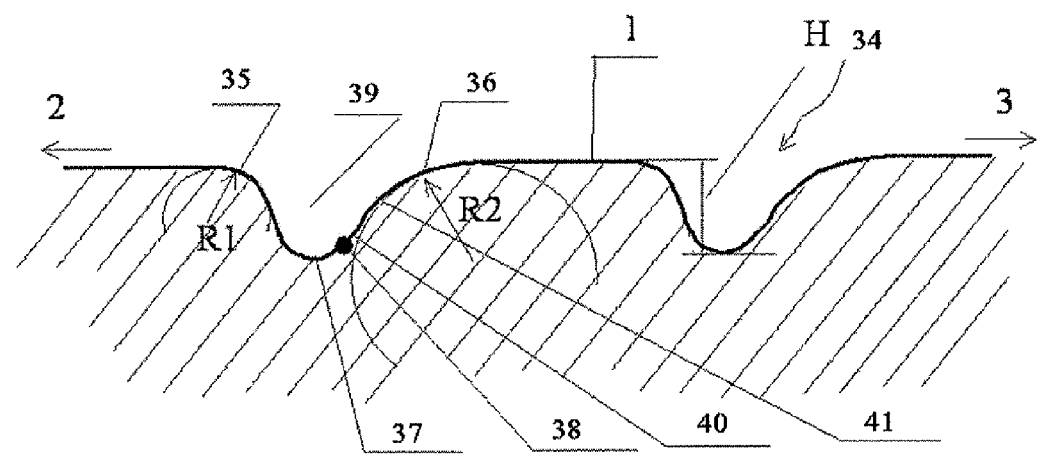
FIG. 17 is a view corresponding to FIG. 15 for the case where the bottom end of each nick is connected to a tool-shank-side rounded portion via a straight portion and a curve portion convexed toward the nick groove.

In the nicked carbide end mill of the present invention, the bottom end 38 of each nick groove is connected to the tool-shank-side rounded portion 36 by one of three methods, as shown in FIGS. 15 to 17. In the representative example already described with reference to FIG. 15, the bottom end of each nick groove is connected to the tool-shank-side rounded portion via a straight portion. In an example shown in FIG. 16, the bottom end of each nick groove is connected to the tool-shank-side rounded portion via a curve portion convexed toward the nick groove. In an example shown in FIG. 17, the bottom end of each nick groove is connected to the tool-shank-side rounded portion via a combination of curve portion convexed toward the nick groove and a straight portion.

High-speed cutting becomes possible through optimization of the phase deviation amount, which is another shape-related feature of the present invention. However, in the case where machining is performed under conditions for high-efficiency machining at a high feed rate, chipping may occur and the accuracy of a machined surface may deteriorate unless the nick shape is further optimized. In such a case, as better means, there can employed an improved nicked carbide end mill of the present invention in which, as shown in FIGS. 15 to 17, the tool-shank-side rounded portion 36 and the bottom end 39 of each nick groove are connected via a shape selected from straight portion 40, a curve portion 41 convexed toward the nick groove, and the convex curve portion 41 combined with the straight portion 40. Since the improved nicked carbide end mill has an increased strength, stable cutting can be performed without causing chipping further to the optimizing of the phase deviation amount, at a cutting speed 1.5 times or more, as compared with the case where a conventional end mill is used.

As compared with high-speed tool steel having a relatively high toughness, which is used for cutting tools, carbide, which is the base material of the carbide end mill of the present invention, is brittle. Therefore, in the case where rough machining is performed by use of the carbide end mill of the present invention at a cutting speed 1.5 times or more the conventional cutting speed, optimization of the phase deviation amount, which is unnecessary for end mills formed of high-speed tool steel, becomes necessary. In addition, in order to stably perform high-speed machining, which can be realized through optimization of the phase deviation amount, a severe shape design must be applied for the nick shape. Therefore, in the present invention, as measures against chipping during high-speed cutting, it is more essential how to connect the bottom end 38 of each nick groove and the tool-shank-side rounded portion 36 via a straight portion and/or a curve portion, which is one feature of the present invention, as described above.

In the nicked carbide end mill of the present invention, desirably, the curvature radius R1 of the tool-end-side rounded portion of each nick 34 falls within a range of 0.01D to 0.03D (D represents the tool diameter). When the curvature radius R1 falls within this range, the strength of the rounded portion connecting the nick 34 and the peripheral cutting edge 1 on the tool end side 2 can be increased, whereby chipping can be prevented. When the curvature radius R1 of the tool-end-side rounded portion is less than 0.01D, the strength of the rounded portion is relatively low, whereby chipping may occur during cutting. When the curvature radius R1 of the tool-end-side rounded portion exceeds 0.03D, a force with which a machined surface is pressed toward to the tool shank increases. As a result, line-shaped marks remain on the machined surface, which affects the accuracy of the machined surface.

Desirably, the curvature radius R2 of the tool-shank-side rounded portion of each nick 34 of the nicked carbide end mill of the present invention falls within a range of 1.5D to 2.0D (D represents the tool diameter). In this case, the nick 34 and the peripheral cutting edge 1 is connected together properly, whereby the rounded portion on the tool shank side 3 of the nick groove 39 can have a sufficiently large strength, and chipping can be prevented. Therefore, high-efficiency machining can be performed at a high feed rate. In the case where the curvature radius R2 of the tool-shank-side rounded portion of each nick 34 is less than 1.5 times the tool diameter D, the strength is insufficient. In the case where the curvature radius R2 of the tool-shank-side rounded portion of each nick 34 exceeds 2.0 times the tool diameter D, cutting resistance increases. In either case, chipping is apt to occur.

Desirably, the depth 9 of each nick of the nicked carbide end mill of the present invention falls within a range of 0.01D to 0.05D. In the case where the depth 9 of each nick is less than 0.01D, the feed amount per single cutting edge cannot be increased. In such a case, the nick 34 does not act efficiently. For example, in the case where the feed amount per single cutting edge is greater than the depth 9 of each nick, instead of short chips, long continuous chips are produced, which makes employment of high feed rate difficult. In contrast, in the case where the feed amount per single cutting edge is less than the depth 9 of each nick, employment of high feed rate becomes impossible. In the case where the depth 9 of each nick exceeds 0.05D, the strength of each cutting edge decreases, and chipping may occur. Therefore, in the case where the depth 9 of each nick falls in the above-mentioned range of this invention, chips can be broken more properly, and cutting resistance decreases. Accordingly, high-efficiency machining can be performed more reliably.

Notably, the contour shape of three representative nick grooves are shown in each of FIGS. 15 to 17. In the present invention, each nick 34 must satisfy the essential condition that the curvature radius R1 of the tool-end-side rounded portion is smaller than the curvature radius R2 of the tool-shank-side rounded portion. However, all the nicks 34 do not necessarily to have the same curvature radius R1 of the tool-end-side rounded portion and the same curvature radius R2 of the tool-shank-side rounded portion. However, since it is common to use a grinding stone for grinding the nick grooves 39, desirably, all the nicks 34 have substantially the same dimensions. In this case, when the nicked carbide end mill is manufactured, the same grinding wheel shape can be conveniently used to grind all the nick grooves 39.

Both the inventions disclosed in Patent Document 3 and Patent Document 4 are characterized by the shape of nicks. As can be understood from the results of evaluation descried in Table B2, end mills (Conventional Example B4 to B7) fabricated on the base of the shapes of these inventions, have the following problems.

Figure 19:
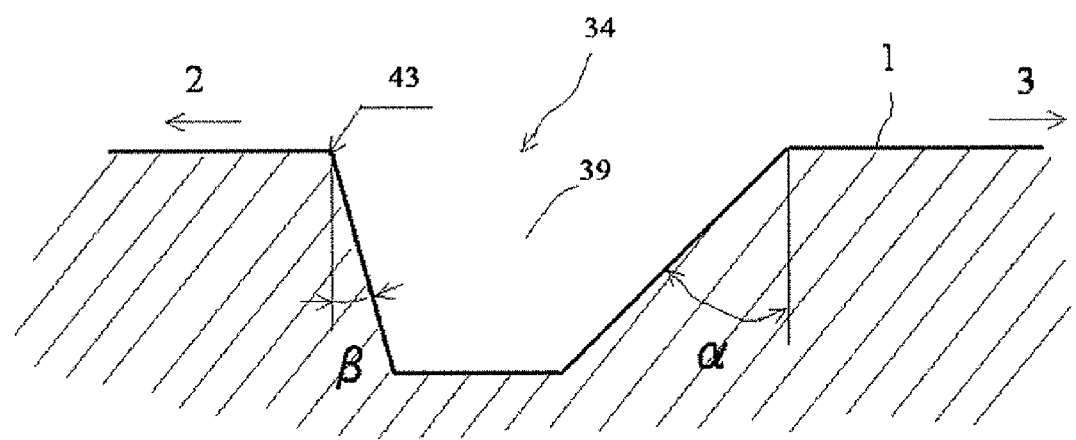
FIG. 19 is a view showing the nick shape described in Patent Document 3 in which a portion connecting each nick and a corresponding peripheral cutting edge portion has a sharp edge shape.

As shown in FIG. 19, the shape of nicks described in Patent Document 3 is such that the connected shape of a nick 34 and a peripheral cutting edge portion 1 has a sharp edge. Large flank angles are provided at opposite ends of each nick so as to secure sufficient strength in this case. However, this shape raises a big problem associated with chipping resistance during high-efficiency machining.

Figure 20:
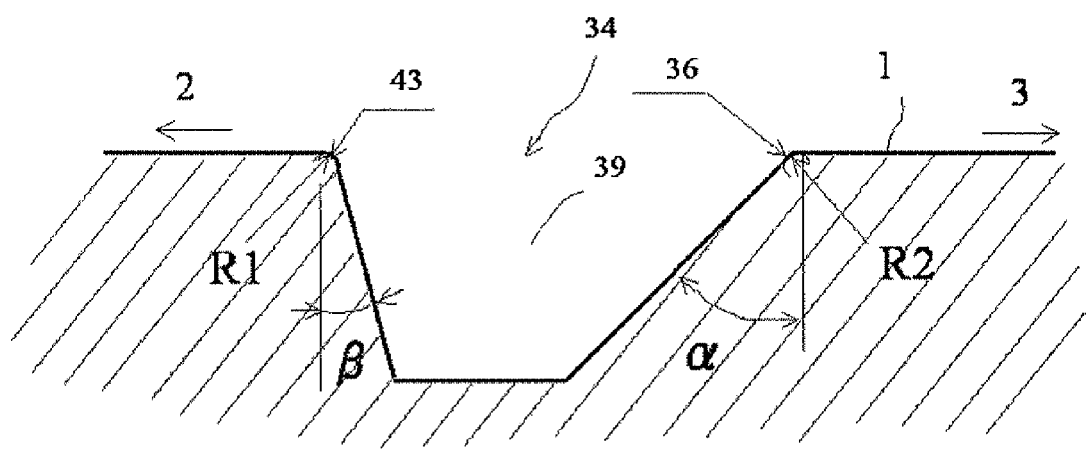
FIG. 20 is a view corresponding to FIG. 19 and showing a rounded nick shape described in Patent Document 4.

In particular, in the case where cutting is performed under conditions for high efficiency by use of a nicked carbide end mill in which the phase of the nicked peripheral cutting edges are deviated from the respective reference phases with equal distances which are obtained by dividing the nick pitch of the reference peripheral cutting edge by the number of the cutting edges. If the nicks have edge portions 43, which are angular; i.e., have sharp edges as shown in FIG. 19, which shows the cross-sectional shape of a nick, the possibility of occurrence of chipping is high. In this case, there arises a problem in that line-shaped marks remain on a machined surface, and a sufficient surface roughness cannot be obtained. Patent Document 3 describes that the shape edge portions may be rounded. However, this only disclosed an idea of rounding the sharp edge portions within a commonly employed range. As shown in FIG. 20, the edge portion 43 has a curvature radius R1, and the tool-shank-side rounded portion has a curvature radius R2. The idea of rounding the sharp edge portions as shown in FIG. 20 merely produces shapes similar to the basic shape shown in FIG. 19.

Figure 21:
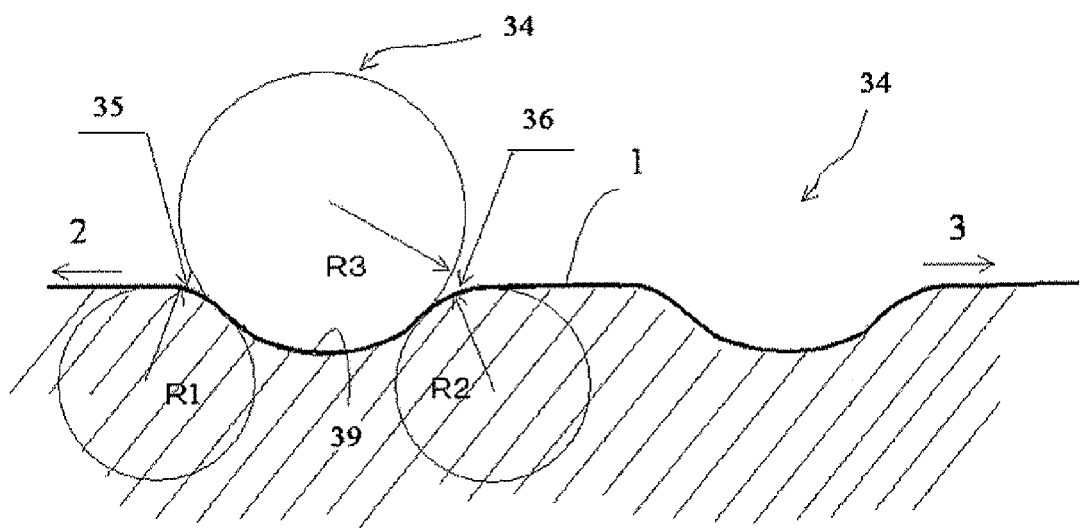
FIG. 21 is a view showing the nick shape described in Patent Document 4 in which a connection portion between each nick and a corresponding peripheral cutting edge has a radius of curvature smaller than that of a concave circular portion forming the nick groove, and the radius of curvature is made equal between the tool end side and the tool shank side.

FIG. 21 is a view showing the nick shape described in Patent Document 4. In the nick shape shown in FIG. 21, a connection portion between each nick and a corresponding peripheral cutting edge portion has a radius of curvature smaller than that of a concave circular portion forming the nick groove, and the radius of curvature is made equal between the tool end side and the tool shank side.

Figure 22:
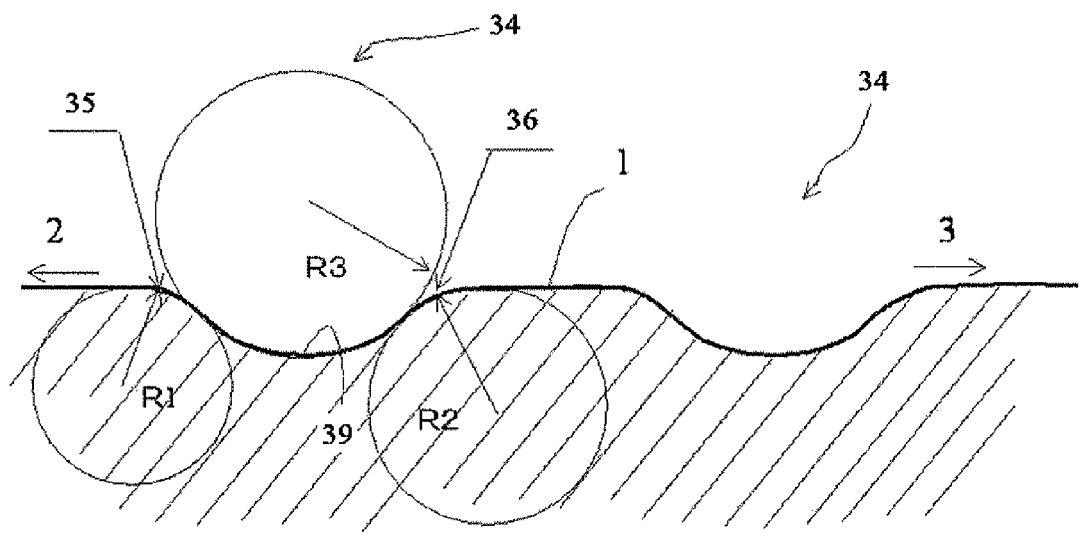
FIG. 22 is a view corresponding to FIG. 21 and showing the nick shape described in Patent Document 4 in which the radius of curvature on the tool shank side is made larger than that on the tool end side.

FIG. 22 shows a nick shape which is similar to that shown in FIG. 21 and which is also described in Patent Document 4. In the nick shape of FIG. 21, the radius of curvature on the tool shank side is made larger than that on the tool end side.

In order to achieve the object of the present invention; i.e., in order to realize a machining efficiency (feed amount per single cutting edge; rotational speed) at least two times the machining efficiency achieved by use of a conventional end mill, only to round the sharp edge portions within the bound of common sense is insufficient. In order to achieve the object of the present invention, it is important to determine the shapes of portions which connect each nick 34a and the corresponding peripheral cutting edge 1, including the relation between the radius of curvature on the tool end side 2 and the radius of curvature on the tool shank side 3, and it is also important to determine the manner how to connect the curvature to the nick grooves 39.

The present inventor carried studies on the optimum sizes of the curvature radius R1 of the tool-end-side rounded portion and the curvature radius R2 of the tool-shank-side rounded portion, the relation between the curvature radius R1 and the curvature radius R2, and the manner in which the bottom portion 37 of each nick groove is connected to the corresponding tool-shank-side rounded portion 36 in the case where the above-mentioned sizes fall within respective desired ranges. As a result, the present inventors succeeded in developing the nicked carbide end mill which has a cutting performance for obtaining a semi-finishing surface roughness (which cannot be attained by use of a conventional end mill in which the portion which connects each nick groove and the corresponding tool-shank-side rounded portion assumes a mere partial circular shape), and which has a sufficiently high chipping resistance of the nick.

A desired nick shape of the nicked carbide end mill of the present invention is such that the tool-shank-side rounded portion is connected to the bottom end of the nick groove via a straight portion, a curve portion convexed toward the nick groove, or a combination of the straight portion and the convex curve portion. This shape increases the strength of the nick considerably.

In contrast, in each of the conventional end mills shown in FIGS. 21 and 22, each of which shows a cross section of nicks, the bottom portion of each nick groove assumes a partial circular shape, and, therefore, as viewed in the cross section, the surface of each of the tool-end-side rounded portion 35 and the tool-shank-side rounded portion 36 is connected by a curve having a point of inflection. The strength of each nick having such a shape is lower than that of the end mill of the present invention. Therefore, the conventional end mill in which each nick has the above-described shape cannot be said to have a cutting performance for obtaining a semi-finishing surface roughness and have a sufficiently high nick chipping resistance.

The desired shape of each nick 34 of the present invention and the partial role of the shape, which can be also understand from the example of the present invention are as follows. The curvature radius R1 of the tool-end-side rounded portion is required so as to secure a satisfactory cutting performance, while securing a satisfactory strength, and maintain good surface roughness. Desirably, the curvature radius R1 falls within the range of 0.01D to 0.05D (D: tool diameter), and the more desirable range is 0.01D to 0.03D.

In order to secure the chipping resistance of each nick 34, the curvature radius R2 of the tool-shank-side rounded portion is desirably set to fall within the range of 1.1 times to 2.5 times the curvature radius R1 of the tool-end-side rounded portion. The more desirable range of the curvature radius R2 of the tool-shank-side rounded portion is 1.1 times to 2.0 times the curvature radius R1 of the tool-end-side rounded portion.

However, the above described effects of the curvature radius R2 of the tool-shank-side rounded portion and the curvature radius R1 of the tool-end-side rounded portion and the effect of the shape of nicks groove which is taken into consideration as needed are not exhibited solely in the nicked carbide end mill. The effect of the shape of nicks groove is truly produced through satisfaction of all the requirements regarding the nick groove, in particular, additionally through optimization of the phase deviation amount of the nicks, which makes possible to perform cutting at a speed far beyond conventional cutting speed without chipping.

Figure 24:
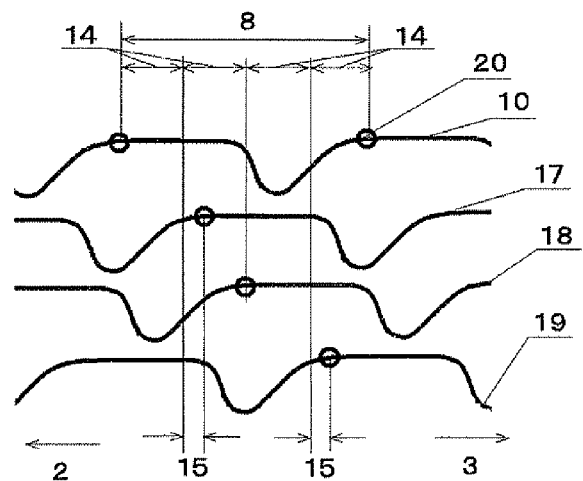
FIG. 24 is a development figure showing the pitch of nicks and the phases of peripheral cutting edges of the nicked carbide end mill of the present invention.
Figure 25:
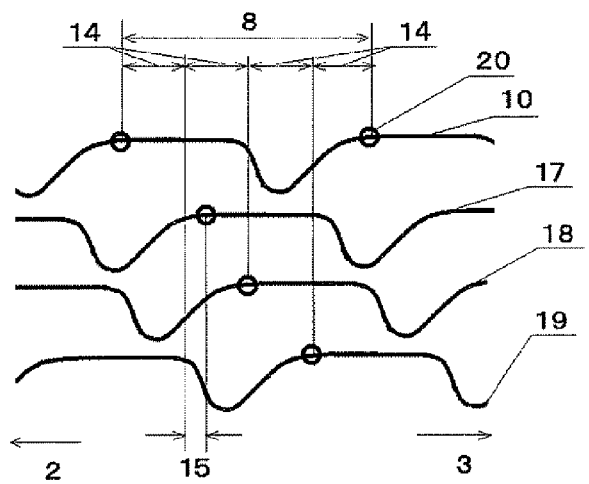
FIG. 25 is a development figure showing one embodiment of the present invention in which a pair of nicked peripheral cutting edges of the adjacent nicked peripheral cutting edges has no phase deviation from the respective reference phases arrayed in equal distance which equal distance is obtained by dividing the nick pitch by the number of the cutting edges—and one cutting edge is deviated from the corresponding reference phase.

Next, the nicked carbide end mill of the present invention in which the phase deviation amount is nonuniform among the nicked peripheral cutting edges and a conventional nicked carbide end mill in which the nicked peripheral cutting edges have no phase deviation amount will be described for comparison with reference to FIGS. 23 to 25. A nick cross-sectional shape shown in each of FIGS. 23 to 25 shows the case where a tool-shank-side rounded portion is continuously connected to the bottom end of a corresponding nick groove via a convex curve portion.

Figure 23:
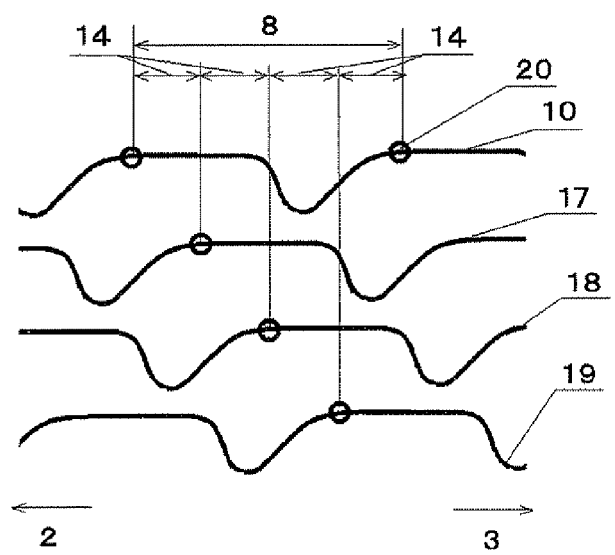
FIG. 23 is a development figure showing the pitch of nicks and the phase of peripheral cutting edges of a conventional nicked carbide end mill in which the peripheral cutting edges have no phase deviation.

FIG. 23 is a development figure showing the pitch of nicks and the phase of peripheral cutting edges of a conventional nicked carbide end mill in which the peripheral cutting edges have no phase deviation. FIG. 24 is a development figure showing the pitch of nicks and the phases of peripheral cutting edges of the nicked carbide end mill of the present invention. FIG. 25 shows one of the embodiment of the present invention. In FIG. 25, a pair of nicked peripheral cutting edges of the adjacent nicked peripheral cutting edges has no phase deviation from the respective phases of the reference peripheral cutting edge, and one cutting edge is deviated from the corresponding phase. Notably, in FIGS. 23 to 25, the positions of intersections between the peripheral cutting edges and nicks are indicated by circular marks.

As shown in FIG. 23, in the case of the conventional end mill, a first nicked peripheral cutting edge, which is illustrated at the top in the drawing, is a reference peripheral cutting edge 10. A nick pitch 8 is a distance from the intersection 20 of a certain nick with a certain cutting edge 10 to the next intersection 20 of the next peripheral cutting edge with the next nick. A reference phase 14 is obtained by dividing the nick pitch 8 by four. The remaining peripheral cutting edges are disposed such that the intersections 20 of the corresponding nicks with the second, third, and fourth nicked peripheral cutting edges 17, 18, and 19 are successively arranged with the same distance of the corresponding reference phase 14 (every ¼ the pitch of the reference peripheral cutting edge 10) therebetween.

In such an arrangement, the reference phase 14 at the intersections 20 of a certain nick with a certain peripheral cutting edge is constant among all the nicked peripheral cutting edges. Therefore, the amount of cutting of a workpiece by the end mill is equally shared by each of the nicked peripheral cutting edges. In the case where each cutting edge cuts the workpiece in the same amount, resonance occurs during cutting, as in the case of an equal separation end mill, which has been described in the prior art section. Therefore, chattering vibration is apt to be generated.

In contrast, in the case of the end mill of the present invention, as shown in FIG. 24, the phases of the second nicked peripheral cutting edge 17 which are disposed adjacent to the reference peripheral cutting edge 10, and the fourth nicked peripheral cutting edge 19, are shifted equally by a deviation amount 15 from each of the reference phase 14 which value is obtained by dividing the nick pitch 8 by four.

Specifically, the deviation amounts 15 from the reference phase 14 of the second nicked peripheral cutting edge 17 and the fourth nicked peripheral cutting edge 19 are determined such that the phase of at least one nicked peripheral cutting edge is deviated by an amount corresponding to 5% or less (excluding 0%) of the nick pitch 8 of the reference peripheral cutting edge 10 in the direction of the tool axis from the corresponding reference phase 14. The distance of the reference phase 14 is obtained by dividing the waveform pitch 4 by four.

FIG. 24 shows an example carbide end mill of the present invention configured such that the nick pitch 8 of the reference peripheral cutting edge 10 is 1 mm. In such a case, the deviation amount 15 of the phase of the second nicked peripheral cutting edge 17 from the corresponding reference phase 14 is 0.02 mm (2% the nick pitch 8), the deviation amount 15 of the phase of the third nicked peripheral cutting edge 18 from the corresponding reference phase 14 is 0 mm, and the deviation amount 15 of the phase of the fourth nicked peripheral cutting edge 19 from the corresponding reference phase 14 is 0.02 mm (2% the nick pitch 8). The deviation amount 15 assumes a positive value when the phase is deviated toward the tool shank side 3, and a negative value when the phase is deviated toward the tool end side 2.

In the case of another end mill of the present invention shown in FIG. 25, the phase of the second nicked peripheral cutting edge 17 disposed next to the reference peripheral cutting edge 10 is deviated from the corresponding reference phase 14 by the deviation amount 15, and the phases of the adjacent third nicked peripheral cutting edge 18 and the fourth nicked peripheral cutting edge 19 are not deviated from the corresponding reference phases 14.

The deviation amounts 15 of the phases of the nicked peripheral cutting edges, other than the reference peripheral cutting edge 10, from the respective reference phases 14 are determined such that the deviation amount 15 of the phase of at least one nicked peripheral cutting edge from the corresponding reference phase 14 is 5% or less (excluding 0%) of the nick pitch 8 of the reference peripheral cutting edge 10.

An example of the end mill in which only one cutting edge has the deviation amount 15 will be described. A small-diameter end mill used to form a groove in a workpiece often has three (odd number) cutting edges in order to secure chip removal. In such a case, according to the specifications described in Patent Document 1, all the deviation amounts 15 of the phases of the mutually adjacent peripheral cutting edges from the respective reference phases 14 are rendered different from one another. In contrast, according to the present invention, the deviation amount 15 of the phase of only one peripheral cutting edge from the corresponding reference phase 14 is rendered different from those of the remaining peripheral cutting edges.

In the case of an end mill which has five (odd number) cutting edges, according to the specifications described in Patent Document 1, two kinds of deviation amounts 15 from the reference phases 14 are required. In contrast, according to the present invention, even only one kind of deviation amount 15 from the reference phases 14 is acceptable to suppress chattering vibration to perform high-efficiency machining through high-speed cutting, and service life can be extended.

In order to realize a carbide end mil for high-speed cutting in which the phase deviation amount is made nonuniform among the peripheral cutting edges, properly determining the nick phase deviation amount is very important. Furthermore, both the proper determination of the phase deviation amount and the optimization of the cross-sectional shape of the nicks are essential for putting the nicked carbide end mill into practice.

In the case of the carbide end mill of the present invention, to get a larger removal amount of chips per unit time compared to the amount by use of a conventional end mill, it is a good avenue to optimize the gash shape of the end cutting edges. An embodiment in which the peripheral cutting edges as shown in FIG. 1 are wavy peripheral cutting edges and gashes are provided for the end cutting edges will be described with reference to FIGS. 12 and 13.

Figure 12:
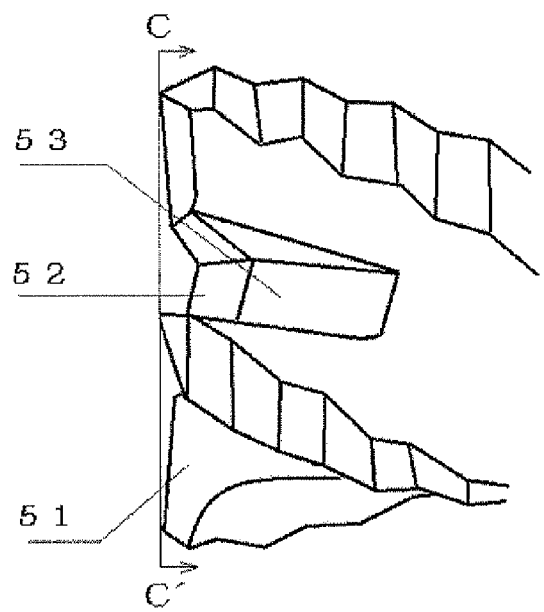
FIG. 12 is an enlarged view of end cutting edges of FIG. 1 and neighboring portions.

FIG. 12 is an enlarged view of end cutting edges of FIG. 1 and neighboring portions. Each gash of the carbide end mill of the present invention shown in FIG. 12 is composed of a first gash surface 51 (cutting face of a corresponding end cutting edge), a second gash surface 52 provided on the side toward the rotational center of the tool axis of the end mill, and a third gash surface 53 provided on the peripheral side of the end mill.

Figure 13:
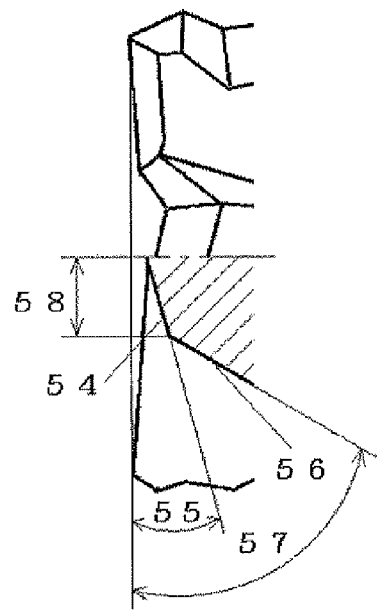
FIG. 13 is a partial cross-sectional view taken along line C-C' of FIG. 12 schematically showing the shape of a gash taken along a plane parallel to a first gash surface.

FIG. 13 is a partial cross-sectional view taken along line C-C' of FIG. 12 schematically showing the shape of a gash taken along a plane parallel to the first gash surface. Notably, a hatched portion of FIG. 13 shows a cross section.

In FIG. 13, a first gash angle 55 is formed between a crossing portion 54 of the first gash surface with the second gash surface, and a plane perpendicularly intersecting the axis, and a second gash angle 57 is formed between a crossing portion 56 of the first gash surface and the third gash surface, and the plane perpendicularly intersecting the axis. The first gash angle 55 is 15° to 35°, and the second gash angle 57 is 40° to 60°. The length 58 of a connection portion between the second gash surface and the third gash surface is not less than 5% the tool diameter D as measured from the tool rotation axis and less than 20% the tool diameter D. The length 58 of a connection portion refers to the distance between the center of the rotation axis and the connection portion of the second gash surface 52 with the third gash surface 53.

With reference to FIGS. 12 and 13, there has been described the embodiment in which the peripheral cutting edges are wavy peripheral cutting edges, and gashes are provided for the end cutting edges. However, it is good practice to optimize the gash shape of the end cutting edges even in the carbide end mill of the present invention whose peripheral cutting edges are nicked peripheral cutting edges as shown in FIG. 14. Even in such a case, preferably, the carbide end mill has a gash shape as shown in FIGS. 12 and 13; i.e., each gash is formed such that the gash is composed of a plurality of surface; i.e., a first gash surface (cutting face of the corresponding end cutting edge), a second gash surface provided on the side toward the rotational center of the tool axis of the end mill, and a third gash surface provided on the peripheral side of the end mill; a first gash angle 55 of 15° to 35° is formed between a crossing portion 54 of the first gash surface with the second gash surface, and a plane perpendicularly intersecting the axis; and a second gash angle 57 of 40° to 60° is formed between a crossing portion 56 of the first gash surface with the third gash surface, and the plane perpendicularly intersecting the axis.

By virtue of such a configuration of the gashes, even when longitudinal-feed cutting, lateral-feed cutting, or oblique cutting is performed by use of the peripheral cutting edges having deviated phases, chips are removed easily from the end cutting edges at the time of longitudinal-feed cutting or oblique cutting. Therefore, the end mill of the present invention having such a gash configuration can endure high-speed cutting during lateral-feed cutting or oblique cutting, and can minimize chattering vibration.

Since the first gash angle 55 is set to 15° to 35°, the rigidity in the vicinity of the tool rotation axis can be secured, and chip removability is improved. In the case where the first gash angle 55 is less than 15°, chip pockets in the vicinity of the center portion of the tool rotation axis become narrow, whereby fracture occurs due to chip clogging. Furthermore, in the case where the first gash angle 55 is in excess of 35°, fracture occurs due to lack of the rigidity of the end cutting edges in the vicinity of the center.

The length 58 of the connection portion of the second gash surface 52 with the third gash surface 53 as measured from the tool rotation axis is set to be not less than 5% the tool diameter but be less than 20% the tool diameter. Thus, the rigidity of the end cutting edges in the vicinity of the tool rotation axis can be secured; and removal of chips to the grooves on the periphery can be improved. In the case where the length 58 of the connection portion of the second gash surface 52 with the third gash surface 53 as measured from the tool rotation axis is less than 5% the tool diameter, the third gash surface 53 is provided to be closer to the tool rotation axis. Therefore, the rigidity of the end cutting edges in the vicinity of the tool rotation axis decreases, and fracture becomes more likely to occur at the end cutting edges in the vicinity of the tool rotation axis.

In the case where the length 58 of the connection portion as measured from the tool rotation axis is equal to or greater than 20% the tool diameter, chips produced by the end cutting edges are pressed against the second gash surface 52 for a longer time. Therefore, at the time of high-speed cutting, chips stagnate on the second gash surface 52, and chip removability deteriorates. As a result, chip congestion is likely to occur, which may result in fracture of the end cutting edges.

The second gash angle 57 is set to 40° to 60° as a result of studies performed on the removability of chips produced by the end cutting edges at the time of longitudinal-feed cutting and oblique cutting. In the case where the second gash angle 57 is less than 40°, chips pressed against the second gash surface 52 are difficult to flow along the third gash surface 53 to the flutes on the periphery, and the chips are scattered to the outside of the tool. In particular, at the time of longitudinal-feed machining, the tool is surrounded by the wall surface of a machined hole, and, even at the time of oblique cutting, the tool is partially surrounded by the formed wall surface. Therefore, it is difficult for the tool to remove chips to the outside of the tool. Therefore, in the case where the second gash angle 57 is less than 40°, chips produced by the end cutting edges do not smoothly flow toward the flutes on the periphery, whereby chip clogging becomes more likely to occur.

In the case where the second gash angle 57 exceeds 60°, the rigidity in the vicinity of the tool end decrease, fracture is apt to occur, even if there is no problem with removing chip because chip pockets for chip removal become larger, whereby chips produced by the end cutting edges smoothly flow toward the flutes on the periphery.

By means of setting the first gash angle 55 and the second gash angle 57 to respective optimal ranges, chips produced by the end cutting edges can be removed smoothly during longitudinal-feed cutting and oblique cutting. Since the performance of removing chips produced by the end cutting edges is not affected by the shape of the peripheral cutting edges, the same effect can be obtained irrespective of whether the peripheral cutting edges are wavy peripheral cutting edges or nicked peripheral cutting edges.

In particular, as an oblique cutting is apt to become unstable, an end mill must have satisfactory chip removability and satisfactory tool rigidity at the same time in order to efficiently and stably perform high-speed oblique cutting. If importance is attached to the chip removability, the tool rigidity decreases, and fracture and breakage become more likely to occur. If importance is attached to the tool rigidity, the chip removability deteriorates, and fracture and breakage become more likely to occur. The end mill of the present invention in which gashes are provided for the end cutting edges has a cutting edge shape determined by focusing on both of the chip removability and the rigidity of the end mill. Since chattering vibration can be suppressed by means of optimally determining the arrangement of nicks or the waveform of the peripheral cutting edges, fracture and breakage are less likely to occur, and stable and high-efficiency oblique cutting can be performed. When a conventional end mill is used, the maximum tilt angle of the end mill during oblique cutting is about 5°. In contrast, when the end mill of the present invention is used, ordinary oblique cutting can be performed with 20° or greater of the tilt angle.

Figure 27:
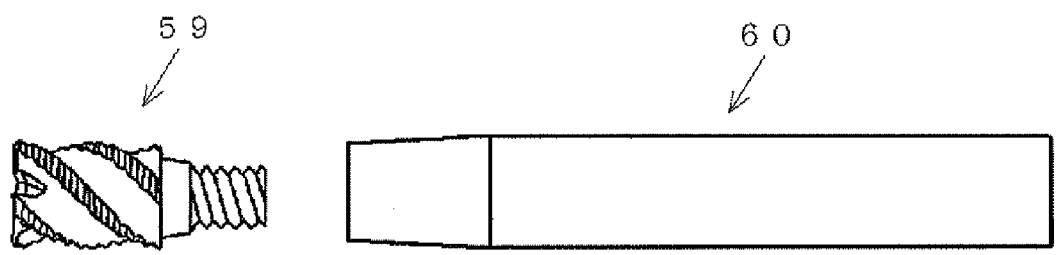
FIG. 27 is an overall schematic view of an end mill showing one embodiment of the present invention configured such that a cutting edge portion is detachably attached to a tool-holding portion.

FIG. 27 is an overall schematic view of an end mill showing one embodiment of the present invention configured such that a cutting edge portion is detachably attached to a tool-holding portion. A cutting edge portion 59 formed of carbide can be detachably attached to a tool-holding portion 60. Therefore, in the case where the cutting edges wear as a result of cutting, only the cutting edge portion 59 is required to be exchanged. Thus, cost of use can be lowered. Although the material of the tool-holding portion 60 may be carbide, which is the same material as the cutting edge portion 59, the tool-holding portion 60 may be formed of alloy steel such as SCM440 or SKD61. In this case, manufacturing cost can be lowered.

Figure 28:
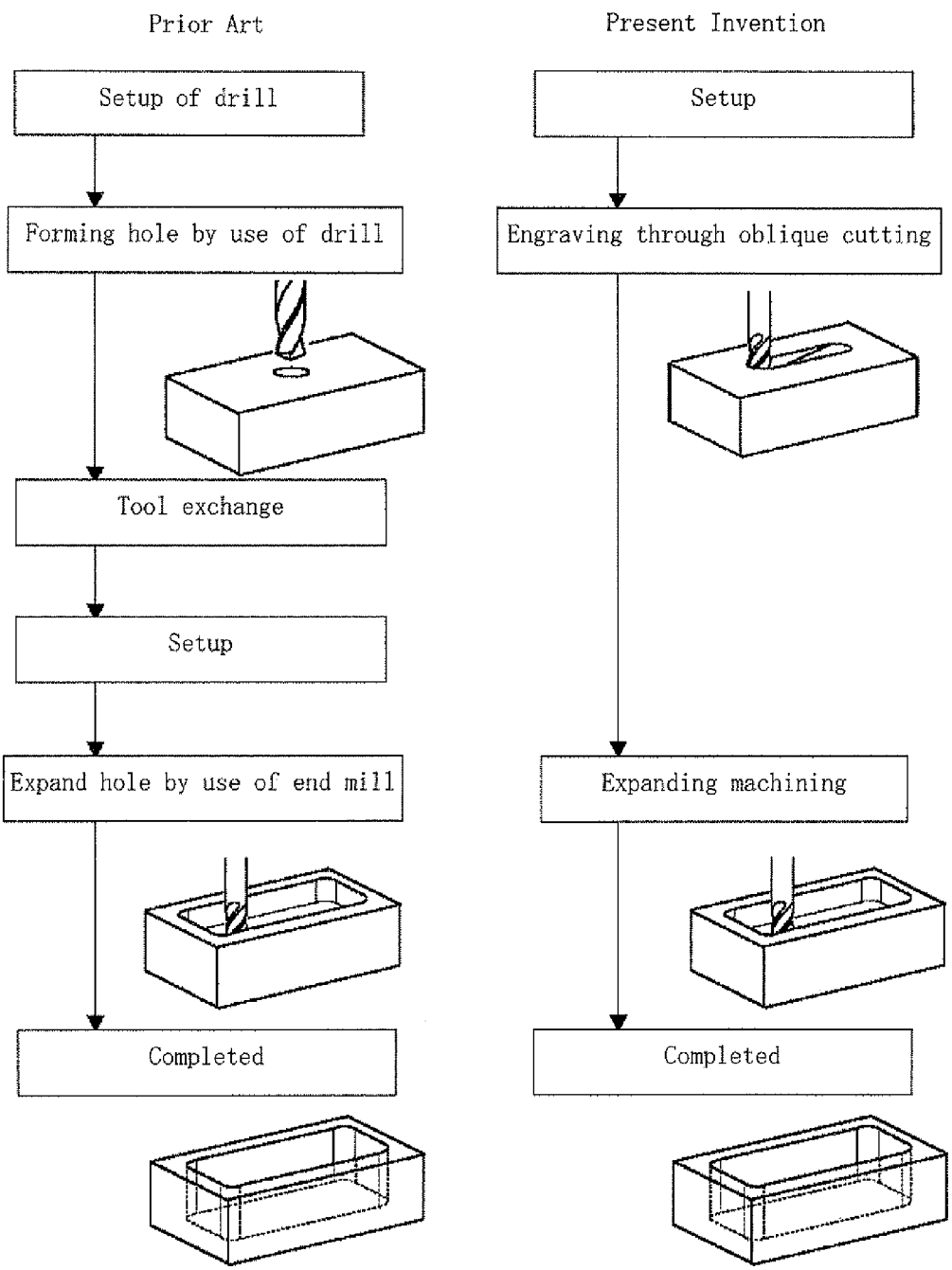
FIG. 28 shows, for comparison, a flowchart of a process in which engraving is performed by use of a conventional end mill and a flowchart of a process in which engraving is performed by use of an end mill according to the present invention.

FIG. 28 shows, for comparison, a flowchart of a process in which engraving is performed by use of a conventional end mill and a flowchart of a process in which engraving is performed by use of an end mill according to the present invention. In the case where a pocket is engraved by a conventional method, first a hole is formed by use of a drill. After that, the drill is replaced with an end mill through tool exchange, and the formed hole is extended by use of the end mill. In the case where the end mill of the present invention having a novel shape is used, high-efficiency oblique cutting can be performed while the tilt angle is set to 20° or greater. Therefore, the pocket can be formed without tool exchange. According to the cutting method of the present invention, any combination of longitudinal-feed cutting, oblique cutting, and lateral-feed cutting can be performed by use of a single end mill. Therefore, the man-hour required for setup can be reduced, and the machining process can be shortened greatly.

Next will be described typical hard coats suitable for use in the coated end mill of the present invention. The end mill of the present invention has a novel shape, and thus the end mill realizes high-speed cutting only by virtue of this shape, as compared with the case of conventional end mills. However, as shown in the Examples hereinbelow, coating of the end mill with a hard coat further improves the performance thereof. The hard coat may be formed of a TiN coat, from the viewpoint of oxidation resistance. Alternatively, the hard coat may be formed of a TiCN coat, from the viewpoint of wear resistance. However, in consideration that the end mill of the present invention is employed in the environment where the temperature of a cutting edge tip reaches 800° C. or higher, the hard coat is preferably formed of a TiAlN coat, which is superior to the aforementioned TiN or TiCN coat in terms of oxidation resistance (evaluated by oxidation initiation temperature) and hardness property.

Figure 26:

FIG. 26 is an enlarged cross-sectional view of a peripheral cutting edge of the hard coat-coated carbide end mill of the present invention, as taken along A-A' of FIG. 1. FIG. 26(a) is an enlarged view of a wavy peripheral cutting edge, and FIG. 26(b) is an enlarged view of a nicked peripheral cutting edge. The wavy peripheral cutting edge shown in FIG. 26(a) is coated with a hard coat 31. Also, the nicked peripheral cutting edge shown in FIG. 26(b) is coated with a hard coat 31. When the peripheral cutting edge is coated with a hard coat as shown in FIG. 26(a) or 26(b), the performance of the end mill can be further improved.

The hard coat may be formed of a TiN film, when priority is given to oxidation resistance. Alternatively, the hard coat may be formed of a TiCN film, when priority is given to wear resistance. However, in consideration that the end mill of the present invention is employed in the environment where the temperature of a cutting edge tip reaches 800° C. or higher, the hard coat is preferably formed of a TiAlN film, which is superior to the aforementioned TiN or TiCN film in terms of oxidation resistance (evaluated by oxidation initiation temperature) and hardness property.

Figure 29:
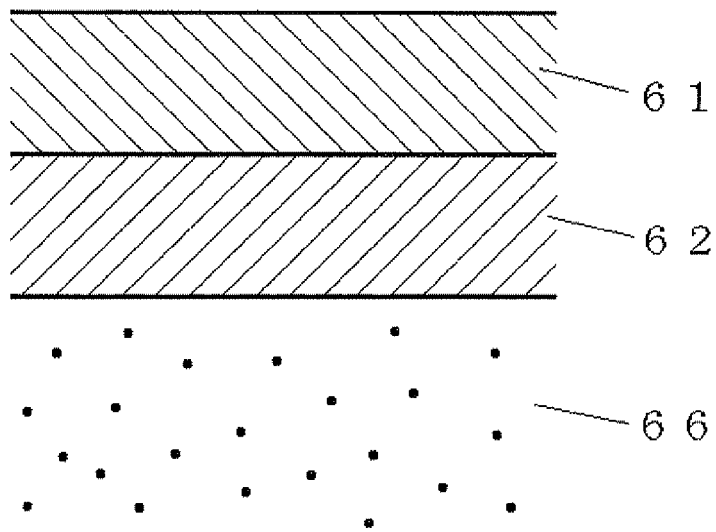
FIG. 29 is a view showing an example laminate structure of a hard coat suitable for a hard-coat-coated end mill of the present invention, the hard coat being composed of an outermost layer and an innermost layer.

FIG. 29 shows an example laminate structure of a hard coat suitable for use in the hard coated end mill of the present invention, wherein the hard coat includes an outermost layer and an innermost layer. The lower side of FIG. 29 corresponds to a base carbide 66, and the base carbide 66 is coated with the hard coat including the following two layers: the innermost layer 62 and the outermost layer 61.

Figure 30:
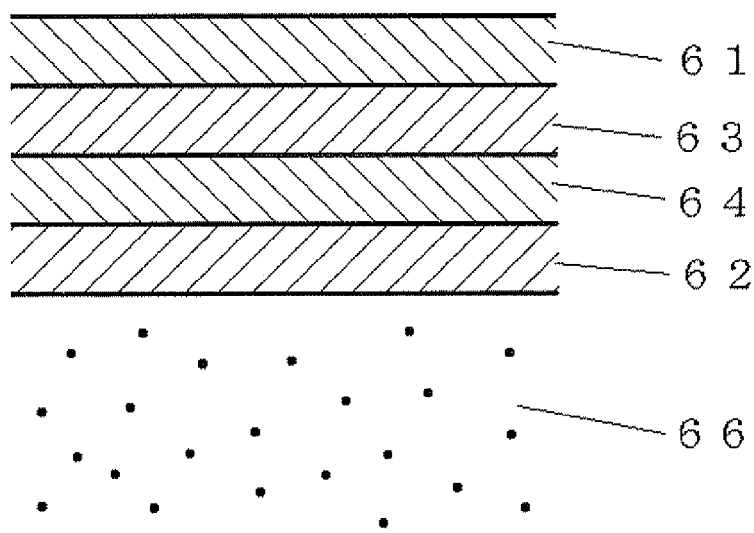
FIG. 30 is a view showing an example laminate structure of a hard coat suitable for the hard-coat-coated end mill of the present invention, the hard coat being a composite layer formed by repeating an operation of laminating a first layer having substantially the same composition as the innermost layer and a second layer having substantially the same composition as the outermost layer is repeated at least once.

FIG. 30 shows an example laminate structure of a hard coat suitable for the hard coated end mill of the present invention, the hard coat being a composite layer formed by repeating coating at least one with substantially the same composition of the innermost layer and substantially the same composition of the outermost layer. The lower side of FIG. 30 corresponds to a base carbide 66, and the base carbide 66 is coated with the hard coat including the following four layers: an innermost layer 62 on the base carbide 66, a film 64 having the same composition as the outermost layer, a coat 63 having the same composition as the innermost layer, and an outermost layer 61. The composite layer also can be formed by repeating a coating with alternately laminating a plurality of films 64 having the same composition as the outermost layer of the hard coat and a plurality of films 63 having the same composition as the innermost layer of the hard coat.

Figure 31:
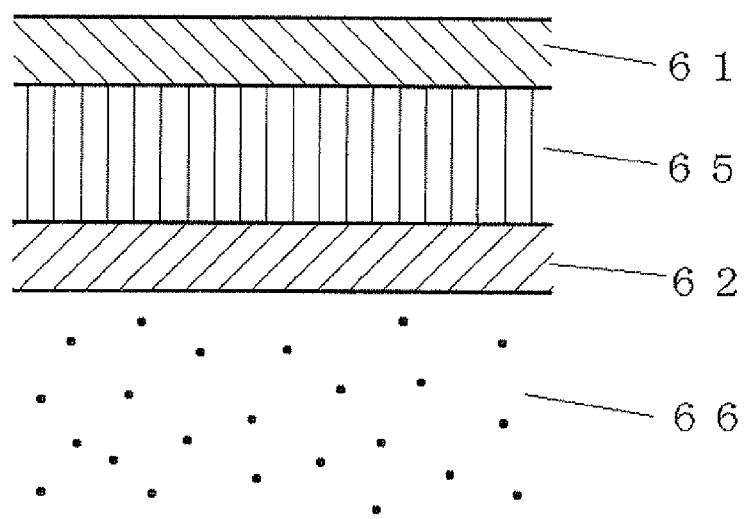
FIG. 31 is a view showing an example laminate structure of a hard coat suitable for the hard-coat-coated end mill of the present invention, the hard coat being composed of an outermost layer, an intermediate layer, and an innermost layer.

FIG. 31 shows an example laminate structure of a hard coat suitable for use in the hard coated end mill of the present invention, the hard coat being composed of an outermost layer, an intermediate layer, and an innermost layer. The lower side of FIG. 31 corresponds to a base carbide 66, and the base carbide 66 is coated with the hard coat including the following three layers: an innermost layer 62, an intermediate layer 65, and an outermost layer 61.

In the case of a TiAlN hard coat, oxidation initiation temperature can be controlled by varying the compositional proportions of Ti and Al. When the end mill is employed under the conditions that the temperature of a cutting edge tip reaches 800° C. to 900° C. or thereabouts, preferably, the amount of Al in the hard coat is increased such that the ratio by atom of metallic Al to metallic Ti is about 50 to about 700. As used herein, "TiAlN compound" refers to a nitride, but may be a compound containing Ti and Al as main components and containing a nonmetallic element other than Ti and Al; for example, the compound may be a nitride (i.e., the nonmetallic element other than Ti and Al is only nitrogen), a carbonitride (e.g., (TiAl)CN), an oxynitride (e.g., (TiAl)ON), or an oxycarbonitride (e.g., (TiAl)CON). Hereinafter, these compounds may be collectively referred to as "nitrogen-containing TiAl compound."

The end mill realizes more stable cutting and attains prolonged service life by providing the hard coat on the surface of a nicked peripheral cutting edge of the end mill such that the hard coat is a composite layer formed by repeating coating at least once with substantially the same composition of the innermost layer and substantially the same composition of the outermost layer, or a composite layer including an innermost layer, an outermost layer, and one or more intermediate layers interposed therebetween, wherein the innermost layer of the hard coat is formed of selecting from a nitride, carbonitride, oxynitride, and oxycarbonitride containing Ti and Al as main metallic components, and the outermost layer of the hard coat contains Si.

More specifically, the hard coat preferably has a structure formed of a compound containing Ti and Si as main components in the form of a nitride, carbonitride, oxynitride, or oxycarbonitride of these metallic elements.

The most suitable Si-containing component for the outermost layer of the hard coat is a TiSi-nitride, preferably a TiSi-nitride having an Si content of 5 to 30% by atom (Ti content: balance). The performance of the nicked carbide end mill of the present invention can be considerably improved by use of a TiAlSi nitride or AlCrSi nitride having an Si content of 1 to 15% by atom (Ti, Cr, or Al content: balance).

A layered coat formed of a TiSi nitride, a TiAlSi nitride, or an AlCrSi nitride exhibits more excellent durability. Similar to the aforementioned case, when such a hard coat is laminated together with one or more films selected from among films formed of, for example, TiN, CrN, TiAlN, and AlCrN, the nicked carbide end mill of the present invention exhibits improved cutting performance.

From the viewpoint of improvement of durability, preferably, the hard coat having the above-exemplified composition is produced through a physical vapor deposition technique. Both of arc discharge ion plating and sputtering can be applied as the physical vapor deposition technique. These hard coats can also be applied to a peripheral cutting edge of the nicked carbide end mill.

In another preferred embodiment of the present invention, the hard coat is provided on the surface of a wavy peripheral cutting edge or a nicked peripheral cutting edge of the nicked carbide end mill such that the hard coat is a composite layer formed by repeating coating at least once with substantially the same composition of the innermost layer and substantially the same composition of the outermost layer, or a composite layer including an innermost layer, an outermost layer, and one or more intermediate layers interposed therebetween, wherein the innermost layer of the hard film is formed of a nitride containing one or more metal elements selected from among Al, Cr, Ti, and Si; the intermediate layer is formed of a compound containing one or more metal elements selected from among Al, Cr, Ti, and Si, and one or more elements selected from among N, B, C, and O; and the outermost layer of the hard coat is formed of a compound containing one or more metal elements selected from among Ti and Si, and one or more elements selected from among N, S, C, and B.

In such a case, preferably, the hard coat has a film structure in which the outermost layer formed of a nitrogen-containing TiSi compound is stacked on a coat formed of any of the aforementioned nitrogen-containing TiAl compounds, or a coat structure in which one or more layers formed of a nitrogen-containing TiAl compound and one or more layers formed of a nitrogen-containing TiSi compound are stacked alternately so that a layer formed of a nitrogen-containing TiAl compound is provided directly on the base carbide of the end mill and a layer formed of a nitrogen-containing TiSi compound serves as the outermost layer of the hard coat.

The aforementioned nitrogen-containing TiSi compound may be a compound containing Ti and Si as main components; for example, a nitride (e.g., TiSiN), a carbonitride (e.g., (TiSi)CN), an oxynitride (e.g., (TiSi)ON), or an oxycarbonitride (e.g., (TiSi)CON). Hereinafter, these compounds may be collectively referred to as "nitrogen-containing TiSi compound."

An intermediate layer may be provided between the aforementioned nitrogen-containing TiAl compound coat and the nitrogen-containing TiSi compound film to improve adhesion between these coats. The intermediate layer is preferably a coat formed of a compound similar to the nitrogen-containing TiAl compound, or a coat formed of a compound similar to the nitrogen-containing TiSi compound. The former intermediate layer coat is preferably formed of a nitrogen-containing TiAl compound containing a small amount of B, Si, Cr, Nb, V, or Hf, and the latter intermediate layer coat is preferably formed of a nitrogen-containing TiSi compound containing a small amount of B, Al, Cr, Nb, V, or Hf.

The hard coat employed in the present invention has the aforementioned layer structure; i.e., the hard coat is formed of a composite layer of an outermost layer and an innermost layer which is stacked directly on the surface of the base carbide of a peripheral cutting edge, or the hard coat is formed of a composite layer including an innermost layer, an outermost layer, and one or more alternately stacked layers or an intermediate layer interposed between the innermost and outermost layers, wherein the outermost layer exhibits oxidation resistance and wear resistance higher than those of the innermost layer.

Next will be described the preferred hard coat suitable for use in the nicked carbide end mill of the present invention. The preferred hard coat is a multi-layer hard coat mainly formed of a nitrogen-containing TiAl compound, wherein the proportions of Ti and Al (i.e., main metallic elements of the compound) are varied in that coat.

More specifically, the preferred hard coat is a multi-layer hard coat in which each of the innermost layer and the outermost layer is formed of the above-defined nitrogen-containing TiAl compound (which is represented by the formula $Ti_xAl_{1-x}N$), the innermost layer is formed of titanium-rich $Ti_xAl_{1-x}N$ (i.e., $0.5<x\leq1$), and the outermost layer is formed of aluminum-rich $Ti_xAl_{1-x}N$ (i.e., $0\leq x<0.5$).

In the multi-layer hard coat, a composite layer including the innermost layer and the outermost layer (total thickness: several nanometers to several tens of nanometers) may be periodically stacked, or an intermediate layer formed of TiN or a nitrogen-containing TiAl compound (wherein a portion of metallic Al or Ti is substituted by Cr or Si) may be provided between the innermost layer and the outermost layer. In any case, the innermost layer must be formed of titanium-rich $Ti_xAl_{1-x}N$, and the outermost layer must be formed of aluminum-rich $Ti_xAl_{1-x}N$. In any case, the total thickness of the hard coat is preferably 2 μm to 10 μm.

Next will be described methods for coating the nicked carbide end mill of the present invention with a hard coat, but the present invention is not limited to the below-described coating methods. No particular limitation is imposed on the coating method employed, so long as the aforementioned hard coat can be produced. However, there must be taken into consideration adhesion of the hard coat to the nicked carbide end mill, and securement of matching between layers (including the innermost layer and the outermost layer) in the hard coat.

In consideration of the fatigue strength of a tool, there is preferably employed a physical vapor deposition technique (e.g., arc discharge ion plating or sputtering) which realizes coating at a relatively low temperature and attains residual compressive stress in the coat. In such a case, bias voltage is applied to the nicked carbide end mill.

Specifically, arc discharge ion plating is carried out as follows. When the innermost layer is formed of a coat of a nitrogen-containing TiAl compound (e.g., (TiAl)N, (TiAl)CN, or (TiAlCr)N) and the outermost layer is formed of a coat of a nitrogen-containing TiSi compound (e.g., (TiSi)N, (TiSi)CN, or (TiSiCr)N), arc discharge ion plating is carried out under, for example, the following conditions: the temperature of the nicked carbide end mill which is to be coated is adjusted to about 400° C.; the pressure of reactive gas is regulated to 3.0 Pa; and a relatively low bias voltage (−10 V to −100 V) is applied. This coating method attains good adhesion between the hard coat and the end mill, as well as lattice matching of crystal between layers (including the innermost layer and the outermost layer) at their interfaces.

When the innermost layer of the hard coat has a composition different from that of the outermost layer of the coat, each of the vapor deposition targets having different compositions are employed. In the case of formation of an intermediate layer, the coating is preferably carried out by simultaneously using the targets having different compositions. Thus, the intermediate layer of the hard coat can be provided so as to have an intermediate composition between the compositions of the innermost layer and the outermost layer, and the amount of a specific component of the intermediate layer is readily increased or decreased in a gradual manner.

The carbide end mill of the present invention is intended to be used for high-performance and high-speed rough machining or semi-finishing machining. Therefore, the hard coat exhibiting good adhesion is essential for preventing sudden accidents (e.g., coat peeling). In order to achieve such a purpose, the aforementioned control method of intermediate composition is effective for attaining sufficient lattice matching between intermediate layers.

In the most preferred embodiment of the present invention, there is employed the end mill of the present invention in which the shape of its peripheral cutting edges is optimized; i.e., the phase deviation amounts of wavy peripheral cutting edges or nicked peripheral cutting edges are not uniform. Particularly when chip removal is likely to cause problems, the aforementioned gash-shape carbide end mill is preferably employed. In most cutting conditions, application of the aforementioned hard coat is preferred.

EXAMPLES

The present invention will next be described in more detail by way of examples, which should not be construed as limiting the invention thereto.

Examples are classified into five groups according to their purposes; specifically, the following Example A, Example B, Example C, Example D, and Example E:

Example A

Examples in which the optimal shape of peripheral cutting edges of the end mill of the present invention is confirmed (Examples A1 to A6);

Example B

Examples in which the shape of nicks is optimized in the end mill of the present invention (Examples B1 and B2);

Example C

Examples in which the optimal shape of gashes for the present invention is confirmed (Examples C1 to C4);

Example D

Examples in which the optimal surface treatment for the present invention is confirmed (Examples D1 to D6); and Example E Example in which the cutting method of the present invention is confirmed (Example E1).

In the Examples shown below in tables and descriptions, Examples of each group are classified into Invention Examples, Conventional Examples, and Comparative Examples. Samples in Invention Examples, Conventional Examples, or Comparative Examples of each of the five groups are represented by serial numbers. Specifically, samples of each Example group shown in tables are represented by, for example, "Invention Example A1" or "Comparative Example A1."

Example A1

In Example A1, particularly, the optimal amount of deviation of wavy peripheral cutting edges from the respective reference phases was determined. In Invention Example A1, an end mill having the following wavy peripheral cutting edges was produced. Specifically, a first wavy peripheral cutting edge was considered a reference peripheral cutting edge, and the remaining (second to fourth) peripheral cutting edges were deviated from the respective reference phases of the reference peripheral edge, wherein the distance of the reference phase were obtained by equally quartering the waveform pitch of the reference peripheral cutting edge. In a second wavy peripheral cutting edge, the phase deviation amount was adjusted to 1% of the waveform pitch (i.e., 0.01 mm). In a third wavy peripheral cutting edge, the phase deviation amount was adjusted to 0% of the waveform pitch (i.e., 0 mm). In a fourth wavy peripheral cutting edge, the phase deviation amount was adjusted to 1% of the waveform pitch (i.e., 0.01 mm).

In Invention Example A2, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 0% of the waveform pitch (i.e., 0 mm). In a fourth wavy peripheral cutting edge, the phase deviation amount was adjusted to 2% of the waveform pitch (i.e., 0.02 mm).

In Invention Example A3, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 3% of the waveform pitch (i.e., 0.03 mm). In a fourth wavy peripheral cutting edge, the phase deviation amount was adjusted to 2% of the waveform pitch (i.e., 0.02 mm).

In Invention Example A4, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 5% of the waveform pitch (i.e., 0.05 mm). In a third wavy peripheral cutting edge, the phase deviation amount was adjusted to 3% of the waveform pitch (i.e., 0.03 mm). In a fourth wavy peripheral cutting edge, the phase deviation amount was adjusted to 4% of the waveform pitch (i.e., 0.04 mm).

In Invention Example A5, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 0% of the waveform pitch (i.e., 0 mm). In a fourth wavy peripheral cutting edge, the phase deviation amount was adjusted to 0% of the waveform pitch (i.e., 0 mm).

In Comparative Example A1, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 6% of the waveform pitch (i.e., 0.06 mm). In a third wavy peripheral cutting edge, the phase deviation amount was adjusted to 0% of the waveform pitch (i.e., 0 mm). In a fourth wavy peripheral cutting edge, the phase deviation amount was adjusted to 6% of the waveform pitch (i.e., 0.06 mm).

In Conventional Example A1, there was produced an end mill having wavy peripheral cutting edges of constant phase deviation amount, wherein, in each wavy peripheral cutting edge, the amount of deviation from the respective reference phase (i.e., ¼ of the waveform pitch of the reference peripheral cutting edge) was adjusted to 0%, that means no deviation from the respective reference phase.

In Conventional Example A2, there was produced an end mill having wavy peripheral cutting edges of constant phase deviation amount with different separation angles (i.e., 95°, 85°, 95°, and 85°), wherein, in each wavy peripheral cutting edge, the amount of deviation from the phase (i.e., ¼ of the waveform pitch of the reference peripheral cutting edge) was adjusted to 0%.

In Conventional Example A3, there was produced an end mill in which the amount of deviation from the reference phase in each wavy peripheral cutting edge was determined as in the case of the end mill as described in Patent Document 1. Specifically, a first wavy peripheral cutting edge was considered a reference peripheral cutting edge, and the remaining (second to fourth) peripheral cutting edges were deviated from the above-obtained respective phases. In a second wavy peripheral cutting edge, the phase deviation amount was adjusted to 6% of the waveform pitch (i.e., 0.06 mm). In a third wavy peripheral cutting edge, the phase deviation amount was adjusted to 0% of the waveform pitch (i.e., 0 mm). In a fourth wavy peripheral cutting edge, the phase deviation amount was adjusted to 2% of the waveform pitch (i.e., 0.02 mm).

In each of the end mills of Invention Examples A1 to A5, Comparative Example A1, and Conventional Examples A1 and A3, wavy peripheral cutting edges were formed so as to have the same separation angle.

Each of the thus-produced nine end mills of Example A1 was subjected to a cutting test employing a workpiece (hot-rolled die steel SKD61 having a hardness of HRC 40). For service life evaluation, cutting was carried out under the following conditions: rotational speed: 6,000 rotations/min (cutting speed: 150 m/min), feed rate: 1,600 mm/min (0.06 mm of feed per cutting edge), amount of cutting in axial direction: 4 mm, and amount of cutting in radial direction: 4 mm. For evaluation of each end mill, peripheral cutting edges thereof were observed every 5 m cutting. When neither fracture nor chipping occurred in an end mill until 50 m cutting, the end mill was evaluated as "good," and the wear width of the end mill was measured. When fracture or chipping was observed in peripheral cutting edges of an end mill before 50 m cutting, cutting was stopped upon observation of fracture or chipping, and the cutting length was recorded. The results are shown in Table A1.

TABLE A1

| Sample No. | | Separation of cutting edges | Phase deviation-amount (mm) | | | Phase deviation amount (%) | Cutting length | Wear width | Evaluation |
|---|---|---|---|---|---|---|---|---|---|
| | | | Second wavy peripheral cutting edge | Third wavy peripheral cutting edge | Fourth wavy peripheral cutting edge | | | | |
| Invention Example A | 1 | Equal separation | 0.01 | 0 | 0.01 | 1% | 50 m | 0.09 mm | Good |
| | 2 | Equal separation | 0.02 | 0 | 0.02 | 2% | 50 m | 0.07 mm | Good |
| | 3 | Equal separation | 0.02 | 0.03 | 0.02 | 3% | 50 m | 0.08 mm | Good |
| | 4 | Equal separation | 0.05 | 0.03 | 0.04 | 5% | 50 m | 0.12 mm | Good |
| | 5 | Equal separation | 0.02 | 0 | 0 | 2% | 50 m | 0.07 mm | Good |
| Comparative Example A | 1 | Equal separation | 0.06 | 0 | 0.06 | 6% | 30 m | — | Chipping |
| Conventional Example A | 1 | Equal separation | 0 | 0 | 0 | 0% | 20 m | — | Fracture |
| | 2 | Unequal separation | 0 | 0 | 0 | 0% | 40 m | — | Chipping |
| | 3 | Equal separation | 0.06 | 0 | 0.02 | 6% | 30 m | — | Clipping |

As a result, in the cases of Invention Examples A1 to A5, stable cutting was performed with reduced chattering vibration, and wear width fell within a normal range even after 50 m cutting. Particularly, in the cases of Invention Examples A1 to A3 and A5, wear width was as small as 0.10 mm or less after 50 m cutting. In the cases of Comparative Example A1 and Conventional Example A3, the amount of deviation from the reference phase was large, and thus a large cutting load was applied to a wavy peripheral cutting edge with large phase deviation amount, resulting in occurrence of chipping upon 30 m cutting. In the case of Conventional Example A1, waveform pitches were provided at equal intervals, and thus chattering vibration was increased, and fracture occurred upon 20 m cutting, leading to the end of the service life. In the case of Conventional Example A2 (i.e., unequally-separated product), chipping occurred upon 40 m cutting in a wavy peripheral cutting edge with a groove of small separation angle.

Example A2

In Example A2, end mills having nicked peripheral cutting edges were tested in a manner similar to that described in Example A1. In each end mill, the amount of deviation from the reference phase in a nicked peripheral cutting edge was adjusted in a manner similar to the cases of the samples of Example A1 for comparison of cutting performance between the nicked peripheral cutting edge and a wavy peripheral cutting edge.

In Invention Example A6, an end mill having the following nicked peripheral cutting edges was produced. Specifically, a first nicked peripheral cutting edge was considered a reference peripheral cutting edge, and the remaining (second to fourth) peripheral cutting edges were deviated from the respective reference phases of the reference peripheral cutting edge, wherein the distance of the reference phase is an amount corresponding to a value obtained by equally quartering the nick pitch of the reference peripheral cutting edge. In a second nicked peripheral cutting edge, the phase deviation amount from the reference phase was adjusted to 1% of the nick pitch (i.e., 0.01 mm). In a third nicked peripheral cutting edge, the phase deviation amount from the reference phase was adjusted to 0% of the nick pitch (i.e., 0 mm). In a fourth nicked peripheral cutting edge, the phase deviation amount from the reference phase was adjusted to 1% of the nick pitch (i.e., 0.01 mm).

In Invention Example A7, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm).

In Invention Example A8, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 3% of the nick pitch (i.e., 0.03 mm). In a fourth nicked peripheral cutting edge, the phase deviation amount was adjusted to 2% of the nick pitch (i.e., 0.02 mm).

In Invention Example A9, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 5% of the nick pitch (i.e., 0.05 mm). In a third nicked peripheral cutting edge, the phase deviation amount was adjusted to 3% of the nick pitch (i.e., 0.03 mm). In a fourth nicked peripheral cutting edge, the phase deviation amount was adjusted to 4% of the nick pitch (i.e., 0.04 mm).

In Invention Example A10, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 0% of the nick pitch (i.e., 0 mm).

In Comparative Example A2, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 6% of the nick pitch (i.e., 0.06 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm).

In each of the end mills of Invention Examples A6 to A10, Comparative Example A2, and Conventional Examples A4 and A6, nicked peripheral cutting edges were formed so as to have the same separation angle.

Each of the thus-produced end mills was subjected to a cutting test employing a workpiece (for hot working die steel SKD61 having a hardness of HRC 40) in the same manner as in Example A1. Cutting conditions and evaluation method were the same as those employed in Example A1. The results are shown in Table A2.

TABLE A2

| Sample No. | | Separation of cutting edges | Phase deviation amount (mm) | | | Phase deviation amount (%) | Cutting length | Wear width | Evaluation |
|---|---|---|---|---|---|---|---|---|---|
| | | | Second nicked peripheral cutting edge | Third nicked peripheral cutting edge | Fourth nicked peripheral cutting edge | | | | |
| Invention Example A | 6 | Equal separation | 0.01 | 0 | 0.01 | 1% | 50 m | 0.10 mm | Good |
| | 7 | Equal separation | 0.02 | 0 | 0.02 | 2% | 50 m | 0.08 mm | Good |
| | 8 | Equal separation | 0.02 | 0.03 | 0.02 | 3% | 50 m | 0.09 mm | Good |
| | 9 | Equal separation | 0.05 | 0.03 | 0.04 | 5% | 50 m | 0.12 mm | Good |
| | 10 | Equal separation | 0.02 | 0 | 0 | 2% | 50 m | 0.08 mm | Good |
| Comparative Example A | 2 | Equal separation | 0.06 | 0 | 0.06 | 6% | 25 m | — | Chipping |
| Conventional Example A | 4 | Equal separation | 0 | 0 | 0 | 0% | 15 m | — | Fracture |
| | 5 | Unequal separation | 0 | 0 | 0 | 0% | 35 m | — | Chipping |
| | 6 | Equal separation | 0.06 | 0 | 0.02 | 6% | 25m | — | Chipping | was adjusted to 0% of the nick pitch (i.e., 0 mm). In a fourth nicked peripheral cutting edge, the phase deviation amount was adjusted to 6% of the nick pitch (i.e., 0.06 mm).

In Conventional Example A4, an end mill having nicked peripheral cutting edges of constant phase deviation amount was produced, wherein, in each nicked peripheral cutting edge, the amount of deviation from the reference phase (i.e., ¼ of the nick pitch of the reference peripheral cutting edge) was adjusted to 0%.

In Conventional Example A5, there was produced an end mill having nicked peripheral cutting edges of constant phase deviation amount with different separation angles (i.e., 95°, 85°, 95°, and 85°), wherein, in each nicked peripheral cutting edge, the amount of deviation from the reference phase (i.e., ¼ of the nick pitch of the reference peripheral cutting edge) was adjusted to 0%.

In Conventional Example A6, there was produced an end mill in which the amount of deviation from the reference phase in each nicked peripheral cutting edge was determined as in the case of the end mill as described in Patent Document 1. Specifically, a first nicked peripheral cutting edge was considered a reference peripheral cutting edge, and the remaining (second to fourth) peripheral cutting edges were deviated from the above-obtained respective reference phases. In a second nick peripheral cutting edge, the phase As a result, in the cases of Invention Examples A6 to A10, stable cutting was performed with reduced chattering vibration, and wear width fell within a normal range even after 50 m cutting. Particularly, in the cases of Invention Examples A6 to A8 and A10, similar to the case of Example A1, wear width was as small as 0.10 mm or less after 50 m cutting. However, comparison between the results of Example A1 and Example A2—in which the test was performed under the same conditions—indicated that the wear width of nicked peripheral cutting edge is slightly larger than that of wavy peripheral cutting edge; i.e., wavy peripheral cutting edge is superior to nicked peripheral cutting edge in terms of cutting of a workpiece such as for hot working die steel.

In the cases of Comparative Example A2 and Conventional Example A6, the amount of deviation from the reference phase was large, and thus a large cutting load was applied to a nicked peripheral cutting edge with large phase deviation amount, resulting in occurrence of chipping upon 25 m cutting. In the case of Conventional Example A4, nick pitches were provided at equal intervals, and thus chattering vibration was increased, and fracture occurred upon 15 m cutting, leading to the end of the service life. In the case of Conventional Example A5 (i.e., unequally-separated angles), similar to the case of Example A1, chipping occurred upon 35 m cutting in a nicked peripheral cutting edge with a groove of small separation angle.

Example A3

In Example A3, the end mill of the present invention was employed for high-speed cutting, and the service life of the end mill was compared with that of the end mill tested in Example A1.

In Example A3, an end mill of Invention Example A11 was produced in the same manner as in Invention Example A2 (Example A1); an end mill of Invention Example A12 was produced in the same manner as in Invention Example A3 (Example A1); and an end mill of Invention Example A13 was produced in the same manner as in Invention Example A4 (Example A1).

Each of the end mills was subjected to a cutting test employing a workpiece (die steel SKD61 for hot working having a hardness of HRC 40). For testing, cutting was carried out under the following conditions: rotational speed: 9,000 rotations/min (cutting speed: 226 m/min) (i.e., 1.5 times that in Example A1), feed rate: 2,160 mm/min (0.06 mm of feed per cutting edge), amount of cutting in axial direction: 4 mm, and amount of cutting in radial direction: 4 mm. For evaluation of the end mill, 50 m cutting was performed in a manner similar to that in Example A1. The results are shown in Table A3.

TABLE A3

| Sample No. | | Separation of cutting edges | Phase deviation amount (mm) | | | Phase deviation amount (%) | Cutting length | Wear width |
|---|---|---|---|---|---|---|---|---|
| | | | Second wavy peripheral cutting edge | Third wavy peripheral cutting edge | Fourth wavy peripheral cutting edge | | | |
| Invention Example A | 11 | Equal separation | 0.02 | 0 | 0.02 | 2% | 50 m | 0.1 mm |
| | 12 | Equal separation | 0.02 | 0.03 | 0.02 | 3% | 50 m | 0.1 mm |
| | 13 | Equal separation | 0.05 | 0.03 | 0.04 | 5% | 50 m | 0.14 mm |

As a result, in the cases of Invention Examples A11 to A13, stable cutting was performed, and wear width fell within a normal range even after 50 m cutting; i.e., the same cutting length as in the case of Example A1 was achieved even through high-speed cutting. Particularly, in the cases of Invention Examples A11 and A12, wherein the amount of deviation from the reference phase of the cutting edge fell within a preferred range, wear width was 0.1 mm, which is smaller than that in Invention Example A13.

Example A4

In Example A4, comparison of grinding time upon production was carried out. In the case of production of an unequally-separated product, grinding of edge grooves requires a long grinding time for adjustment of separation angle. In addition, since a large number of portions must be ground for attaining uniform land width, a long grinding time is required. In this Example, particularly, different times for grinding of edge grooves were measured. Specifically, there was measured the time required for grinding of one edge groove for producing the end mill of Invention Example A1 (Example A1) or the end mill of Conventional Example A2 (Example A1) (unequal separation). The results are shown in Table A4.

TABLE A4

| Sample No. | | Separation of cutting edges | Phase deviation amount (mm) | | | Phase deviation amount (%) | Grinding time |
|---|---|---|---|---|---|---|---|
| | | | Second wavy peripheral cutting edge | Third wavy peripheral cutting edge | Fourth wavy peripheral cutting edge | | |
| Invention Example A | 1 | Equal separation | 0.02 | 0 | 0.02 | 2% | 11 minutes |
| Conventional Example A | 2 | Unequal separation | 0 | 0 | 0 | 0% | 15 minutes |

In the case of production of an unequally-separated product, grinding of edge grooves requires a long grinding time for adjustment of the separation angle of a cutting edge. In addition, since a large number of portions must be ground for attaining uniform land width, a long grinding time is required. In the case of Conventional Example A2 (i.e., unequally-separated product), grinding time was prolonged by four minutes (i.e., about 1.4 times) as compared with the case of Invention Example A1.

Example A5

In Example A5, cutting test (groove cutting) was carried out for evaluating chip removal performance. An end mill of Invention Example A13 was produced in the same manner as in Invention Example A1 (Example A1); an end mill of Conventional Example A5 was produced in the same manner as in Conventional Example A1 (Example A1); and an end mill of Conventional Example A6 (i.e., unequally-separated product) was produced in the same manner as in Conventional Example A2 (Example A1). Each of the end mills was tested in terms of feed rate limit by using structural steel as a workpiece. Cutting conditions were as follows: rotational speed: 8,000 rotations/min (cutting speed: 200 m/min), feed rate: 2,000 mm/min (0.06 mm of feed per cutting edge), and amount of cutting in axial direction: 8 mm. For evaluation of each end mill, feed rate was increased by 400 mm/min every 1 m cutting, and the feed rate at which breakage occurred was recorded. When no problems occurred after machining, mark "O" was assigned in the Table A5, whereas when breakage occurred or when fracture or chipping occurred after 1 m cutting at any feed rate, mark "X" was assigned. A sample which attained a feed rate of 3,200 mm/min or higher was evaluated as "good." The results are shown in Table A5.

TABLE A5

| Sample No. | | Separation of cutting edges | Feed rate (mm/min) | | | | Evaluation |
|---|---|---|---|---|---|---|---|
| | | | 2000 | 2400 | 2800 | 3200 | |
| Invention Example A | 14 | Equal separation | O | O | O | O | Good |
| Conventional Example A | 7 | Equal separation | O | O | O | X | Fracture |
| Conventional Example A | 8 | Unequal separation | O | O | X | | Breakage |

As a result, in the case of Conventional Example A8 (i.e., cutting edge with unequally-separated angles), when feed rate is increased for groove cutting, chips become large. When such large chips are jammed in a small edge groove, breakage or fracture occurs in the edge. In the case of Invention Example A14, cutting was performed until feed rate reached 3,200 mm/min without causing any problem. In contrast, in the case of Conventional Example A7, vibration was increased, and fracture occurred when feed rate reached 3,200 mm/min. In the case of Conventional Example A8 (i.e., cutting edge with unequally-separated angles), breakage occurred when feed rate reached 2,800 mm/min. Through observation of the tool thereafter, welding of chips was found in edge grooves having small separation angle, and breakage was found to occur as a result of jamming of chips in edge grooves.

Example A6

In Example A6, peripheral cutting edges having different shapes (i.e., wavy peripheral cutting edge and nicked peripheral cutting edge) were compared with each other by carrying out a cutting test employing an easy-to-weld workpiece (stainless steel SUS304). An end mill of Invention Example A14 was produced in the same manner as in Invention Example A2 (Example A1), and an end mill of Invention Example A15 was produced in the same manner as in Invention Example A7 (Example A2). Each of the end mills was employed for cutting.

For service life testing, cutting was carried out under the following conditions: rotational speed: 5,000 rotations/min (cutting speed: 125 m/min), feed rate: 1,200 mm/min (0.06 mm of feed per cutting edge), amount of cutting in axial direction: 4 mm, and amount of cutting in radial direction: 1 mm. For evaluation of each end mill, peripheral cutting edges thereof were observed every 5 m cutting. When neither fracture nor chipping occurred in an end mill until 30 m cutting, the end mill was evaluated as "good," and the wear width of the end mill was measured. The results are shown in Table A6.

TABLE A6

| Sample No. | | Peripheral cutting edge shape | Phase deviation amount (mm) | | | Phase deviation amount (%) | Cutting length | Wear width | Evaluation |
|---|---|---|---|---|---|---|---|---|---|
| | | | Second wavy (nicked) peripheral cutting edge | Third wavy (nicked) peripheral cutting edge | Fourth wavy (nicked) peripheral cutting edge | | | | |
| Invention Example A | 15 | Wavy peripheral cutting edge | 0.02 | 0 | 0.02 | 2% | 30 m | 0.14 mm | Good |
| | 16 | Nicked peripheral cutting edge | 0.02 | 0 | 0.02 | 2% | 30 m | 0.13 mm | Good |

As a result, in the cases of Invention Examples A15 and A16, wear width fell within a normal range even after 30 m cutting, which indicates that an easy-to-weld workpiece (e.g., stainless steel) can be cut by means of each of the end mills of this invention. However, the wear width of nicked peripheral cutting edges in Invention Example A16 was found to be 0.13 mm, which is slightly smaller than that of wavy peripheral cutting edges in Invention Example A15 (i.e., 0.14 mm). These data show that nicked peripheral cutting edge is superior to wavy peripheral cutting edge in terms of cutting of an easy-to-weld workpiece such as stainless steel.

Example B1

In Example B1, particularly, the optimal amount of deviation of nicked peripheral cutting edges from the respective reference phases was determined. In Invention Examples B1 and B2, Comparative Example B1, and Conventional Examples B1 and B2, end mills, each having four cutting edges, were produced from a carbide base having a Co content of 8 wt. % and a mean WC grain size of 0.8 µm (tool diameter: 8 mm, cutting edge length: 16 mm, helix angle: 45°, total length: 70 mm, shank diameter: 8 mm).

In each of the end mills of Invention Examples B1 and B2, Comparative Example B1, and Conventional Examples B1 and B2, nicks were formed such that nick pitch was 1 mm, the curvature radius R1 of a tool-end-side rounded portion of each nick was 0.025 D (0.2 mm in actual size, the same shall apply hereinafter), the curvature radius R2 of a tool-shank-side rounded portion of each nick was 1.6 times the curvature radius R1 (i.e., 0.32 mm), and the depth of each nick was 0.03 D (0.24 mm). In each end mill, gashes each composed of a plurality of surfaces were formed so as to attain a first gash angle of 25° and a second gash angle of 50°. The bottom end of each nick was connected to the tool-shank-side rounded portion thereof (curvature radius R2) via a straight portion. Each of the end mills (sample) was coated with a hard coat including an intermediate layer formed of TiAlSiN, an innermost layer formed of TiAlN, and an outermost layer formed of TiSiN.

In Invention Example B1, an end mill having the following nicked peripheral cutting edges was produced. Specifically, a first nicked peripheral cutting edge was considered a reference peripheral cutting edge, and the remaining (second to fourth) peripheral cutting edges were deviated from the respective reference phases of the reference cutting edge, wherein the distance of the reference phase is an amount corresponding to a value obtained by equally quartering the nick pitch of the reference peripheral cutting edge. In a second nicked peripheral cutting edge, the phase deviation amount was adjusted to 1% of the nick pitch (i.e., 0.01 mm). In a third nicked peripheral cutting edge, the phase deviation amount was adjusted to 0% of the nick pitch (i.e., 0 mm). In a fourth nicked peripheral cutting edge, the phase deviation amount was adjusted to 1% of the nick pitch (i.e., 0.01 mm).

In Invention Example B2, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm).

In Invention Example B3, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 3% of the nick pitch (i.e., 0.03 mm). In a fourth nicked peripheral cutting edge, the phase deviation amount was adjusted to 2% of the nick pitch (i.e., 0.02 mm).

In Invention Example B4, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 5% of the nick pitch (i.e., 0.05 mm). In a third nicked peripheral cutting edge, the phase deviation amount was adjusted to 3% of the nick pitch (i.e., 0.03 mm). In a fourth nicked peripheral cutting edge, the phase deviation amount was adjusted to 4% of the nick pitch (i.e., 0.04 mm).

In Invention Example B5, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 0% of the nick pitch (i.e., 0 mm).

In Comparative Example B1, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 0% of the nick pitch (i.e., 0 mm). In a fourth nicked peripheral cutting edge, the phase deviation amount was adjusted to 6% of the nick pitch (i.e., 0.06 mm).

In Conventional Example B1, there was produced an end mill having nicked peripheral cutting edges of constant phase deviation amount, wherein, in each nicked peripheral cutting edge, the amount of deviation from the reference phase (i.e., ¼ of the nick pitch of the reference peripheral cutting edge) was adjusted to 0%.

In Conventional Example B2, there was produced an end mill having nicked peripheral cutting edges of constant phase deviation amount with different separation angles (i.e., 95°, 85°, 95°, and 85°), wherein, in each nicked peripheral cutting edge, the amount of deviation from the reference phase (i.e., ¼ of the nick pitch of the reference peripheral cutting edge) was adjusted to 0%.

In Conventional Example B3, there was produced an end mill in which the amount of deviation from the reference phase in each nicked peripheral cutting edge was determined as in the case of the end mill as described in Patent Document 1. Specifically, a first nicked peripheral cutting edge was considered a reference peripheral cutting edge, and the remaining (second to fourth) peripheral cutting edges were deviated from the above-obtained respective reference phases. In a second nick peripheral cutting edge, the phase deviation amount was adjusted to 6% of the nick pitch (i.e., 0.06 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm).

In each of the end mills of Invention Examples B1 to B5, Comparative Example B1, and Conventional Examples B1 and B3, nicked peripheral cutting edges were formed so as to have the same separation angle.

Each of the end mills was subjected to a cutting test (service life test) employing a workpiece (die steel SKD61 for hot working having a hardness of HRC 40). Specifically, cutting was carried out under the following conditions: cutting speed: 150 m/min (rotational speed: 6,000 rotations/min), which is 1.5 times the cutting speed in conventional high-speed cutting (i.e., 100 m/min), feed rate: 1,600 mm/min (0.06 mm of feed per cutting edge), amount of cutting in axial direction: 4 mm, and amount of cutting in radial direction: 4 mm.

For evaluation of each end mill, peripheral cutting edges thereof were observed every 5 m cutting. When neither fracture nor chipping occurred in an end mill until 50 m cutting, the end mill was evaluated as "good," and the wear width of the end mill was measured. When fracture or chipping was observed in peripheral cutting edges of an end mill before 50 m cutting, cutting was stopped upon observation of fracture or chipping, and the cutting length was recorded. The results are shown in Table B1.

TABLE B1

| Sample No. | | Separation of cutting edges | Phase deviation amount (mm) | | | Phase deviation amount (%) | Cutting length (m) | Wear width (mm) | Evaluation |
|---|---|---|---|---|---|---|---|---|---|
| | | | Second nicked peripheral cutting edge | Third nicked peripheral cutting edge | Fourth nicked peripheral cutting edge | | | | |
| Invention Example B | 1 | Equal separation | 0.01 | 0 | 0.01 | 1 | 50 | 0.1 | Good |
| | 2 | Equal separation | 0.02 | 0 | 0.02 | 2 | 50 | 0.08 | Good |
| | 3 | Equal separation | 0.02 | 0.03 | 0.02 | 3 | 50 | 0.09 | Good |
| | 4 | Equal separation | 0.05 | 0.03 | 0.04 | 5 | 50 | 0.12 | Good |
| | 5 | Equal separation | 0.02 | 0 | 0 | 2 | 50 | 0.08 | Good |
| Comparative Example B | 1 | Equal separation | 0.06 | 0 | 0.06 | 6 | 25 | — | Chipping |
| Conventional Example B | 1 | Equal separation | 0 | 0 | 0 | 0 | 15 | — | Fracture |
| | 2 | Unequal separation | 0 | 0 | 0 | 0 | 35 | — | Chipping |
| | 3 | Equal separation | 0.06 | 0 | 0.02 | 6 | 25 | — | Chipping |

As a result, in the cases of Invention Examples B1 to B5, stable cutting was performed with reduced chattering vibration, and wear width fell within a normal range even after 50 m cutting. Particularly, in the cases of Invention Examples B1 to B3 and B5, wear width was as small as 0.10 mm or less after 50 m cutting. In the cases of Comparative Example B1 and Conventional Example B3, the amount of deviation from the reference phase was large, and thus a large cutting load was applied to a nicked peripheral cutting edge with large phase deviation amount, resulting in occurrence of chipping upon 25 m cutting. In the case of Conventional Example B1, nick pitches were provided at equal intervals, and thus chattering vibration was increased, and fracture occurred upon 15 m cutting, leading to the end of the service life. In the case of Conventional Example B2 (i.e., cutting edge with unequally-separated angles), chipping occurred upon 35 m cutting in a nicked peripheral cutting edge with a groove of small separation angle.

Example B2

In Example B2, particularly, the optimal shape of nicked peripheral cutting edges was determined. In Invention Examples B6 to B23, Comparative Examples B2 and B3, and Conventional Examples B4 to B7, end mills each having four cutting edges were produced from a carbide base having a Co content of 8 wt. % and a mean WC grain size of 0.8 µm (tool diameter: 10 mm, cutting edge length: 20 mm, helix angle: 45°, total length: 90 mm, shank diameter: 10 mm).

In Example B2, each end mill was produced so as to have the following nicked peripheral cutting edges. Specifically, a first nicked peripheral cutting edge was considered a reference peripheral cutting edge, and the remaining (second to fourth) peripheral cutting edges were deviated from the respective reference phases of the reference peripheral cutting edge, wherein the distance of the reference phase is a value obtained by equally quartering the nick pitch of the reference peripheral cutting edge. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm). Each end mill (sample) was coated with a hard coat including an intermediate layer formed of TiAlSiN, an innermost layer formed of TiAlN, and an outermost layer formed of TiSiN.

Nicked carbide end mills of Invention Examples B and Comparative Examples B were produced by varying the curvature radius R1 of a tool-end-side rounded portion of each nick, the curvature radius R2 of a tool-shank-side rounded portion of each nick, the depth of each nick, and the shape of a portion connecting the bottom end of each nick and the tool-shank-side rounded portion of the nick. Nicked carbide end mills of Conventional Examples B were produced so as to have shapes as described in Patent Documents 3 and 4.

As shown in Table B2, end mills of Invention Examples B6, B7, B8, and B21 were produced by varying the shape of a portion connecting the bottom end of each nick and the tool-shank-side rounded portion of the nick, wherein the curvature radius R1 of a tool-end-side rounded portion of each nick was adjusted to 0.02 D (0.2 mm in actual size, the same shall apply hereinafter), the curvature radius R2 of a tool-shank-side rounded portion of each nick was adjusted to 1.7 times the curvature radius R1 (0.34 mm), and the depth of each nick was adjusted to 0.025 D (0.25 mm).

End mills of Invention Examples B9 to B20 and B23 were produced such that the bottom end of each nick was connected to the tool-shank-side rounded portion (curvature radius R2) of the nick via a straight portion. In Invention Example B9, the curvature radius R1 of a tool-end-side rounded portion of each nick was adjusted to 0.01 D (0.1 mm), the curvature radius R2 of a tool-shank-side rounded portion of each nick was adjusted to 1.6 times the curvature radius R1 (0.16 mm), and the depth of each nick was adjusted to 0.025 D (0.25 mm).

In Invention Example B10, the curvature radius R1 of a tool-end-side rounded portion of each nick was adjusted to 0.03 D (0.3 mm), the curvature radius R2 of a tool-shank-side rounded portion of each nick was adjusted to 1.6 times the curvature radius R1 (0.48 mm), and the depth of each nick was adjusted to 0.025 D (0.25 mm).

In Invention Example B11, the curvature radius R1 of a tool-end-side rounded portion of each nick was adjusted to 0.02 D (0.2 mm), the curvature radius R2 of a tool-shank-side rounded portion of each nick was adjusted to 1.5 times the curvature radius R1 (0.3 mm), and the depth of each nick was adjusted to 0.025 D (0.25 mm).

In Invention Example B12, the curvature radius R1 of a tool-end-side rounded portion of each nick was adjusted to 0.02 D (0.2 mm), the curvature radius R2 of a tool-shank-side rounded portion of each nick was adjusted to twice the curvature radius R1 (0.4 mm), and the depth of each nick was adjusted to 0.025 D (0.25 mm).

In Invention Example B13, the curvature radius R1 of a tool-end-side rounded portion of each nick was adjusted to 0.02 D (0.2 mm), the curvature radius R2 of a tool-shank-side rounded portion of each nick was adjusted to 1.7 times the curvature radius R1 (0.34 mm), and the depth of each nick was adjusted to 0.01 D (0.1 mm).

In Invention Example B14, the curvature radius R1 of a tool-end-side rounded portion of each nick was adjusted to 0.02 D (0.2 mm), the curvature radius R2 of a tool-shank-side rounded portion of each nick was adjusted to 1.7 times the curvature radius R1 (0.34 mm), and the depth of each nick was adjusted to 0.05 D (0.5 mm).

In Invention Example B15, the curvature radius R1 of a tool-end-side rounded portion of each nick was adjusted to 0.007 D (0.07 mm), the curvature radius R2 of a tool-shank-side rounded portion of each nick was adjusted to 1.7 times the curvature radius R1 (0.12 mm), and the depth of each nick was adjusted to 0.025 D (0.25 mm).

In Invention Example B16, the curvature radius R1 of a tool-end-side rounded portion of each nick was adjusted to 0.033 D (0.33 mm), the curvature radius R2 of a tool-shank-side rounded portion of each nick was adjusted to 1.6 times the curvature radius R1 (0.52 mm), and the depth of each nick was adjusted to 0.025 D (0.25 mm).

In Invention Example B17, the curvature radius R1 of a tool-end-side rounded portion of each nick was adjusted to 0.02 D (0.2 mm), the curvature radius R2 of a tool-shank-side rounded portion of each nick was adjusted to 1.3 times the curvature radius R1 (0.26 mm), and the depth of each nick was adjusted to 0.025 D (0.25 mm).

In Invention Example B18, the curvature radius R1 of a tool-end-side rounded portion of each nick was adjusted to 0.02 D (0.2 mm), the curvature radius R2 of a tool-shank-side rounded portion of each nick was adjusted to 2.5 times the curvature radius R1 (0.5 mm), and the depth of each nick was adjusted to 0.025 D (0.25 mm).

In Invention Example B19, the curvature radius R1 of a tool-end-side rounded portion of each nick was adjusted to 0.02 D (0.2 mm), the curvature radius R2 of a tool-shank-side rounded portion of each nick was adjusted to 1.7 times the curvature radius R1 (0.34 mm), and the depth of each nick was adjusted to 0.008 D (0.08 mm).

In Invention Example B20, the curvature radius R1 of a tool-end-side rounded portion of each nick was adjusted to 0.02 D (0.2 mm), the curvature radius R2 of a tool-shank-side rounded portion of each nick was adjusted to 1.7 times the curvature radius R1 (0.34 mm), and the depth of each nick was adjusted to 0.07 D (0.7 mm).

In Invention Example B21, the curvature radius R1 of a tool-end-side rounded portion of each nick was adjusted to 0.02 D (0.2 mm), the curvature radius R2 of a tool-shank-side rounded portion of each nick was adjusted to 1.7 times the curvature radius R1 (0.34 mm), and the depth of each nick was adjusted to 0.025 D (0.25 mm). Furthermore, gashes each composed of a plurality of surfaces were formed so as to attain a first gash angle of 20° and a second gash angle of 45°.

In Invention Example B22, the bottom end of each nick was connected to the tool-shank-side rounded portion (curvature radius R2) of the nick via a concave arc portion, wherein the curvature radius R1 of a tool-end-side rounded portion of each nick was adjusted to 0.01 D (0.1 mm), the curvature radius R2 of a tool-shank-side rounded portion of each nick was adjusted to 1.3 times the curvature radius R1 (0.13 mm), and the depth of each nick was adjusted to 0.025 D (0.25 mm).

In Comparative Example B2, an end mill was produced in the same manner as in Invention Example 6, except that the curvature radius R2 of a tool-shank-side rounded portion of each nick was adjusted to be equal to the curvature radius R1 of a tool-end-side rounded portion of each nick (i.e., 0.025 D (0.25 mm)). In Comparative Example 3, an end mill was produced in the same manner as in Invention Example 6, except that the curvature radius R1 of a tool-end-side rounded portion of each nick was adjusted to 0.034 D (0.34 mm), and the curvature radius R2 of a tool-shank-side rounded portion of each nick was adjusted to 0.2 mm; i.e., the curvature radius R2 was adjusted so as to be smaller than the curvature radius R1 of the tool-end-side rounded portion.

In Conventional Example B4, an end mill was produced such that a portion connecting each nick and a corresponding peripheral cutting edge portion had a sharp edge shape (i.e., the nick shape described in Patent Document 3). FIG. 19 shows the nick shape. The end mill was produced in the same manner as in Invention Example 6, except that rounded portions were not provided on the tool end side and the tool shank side of each nick.

In Conventional Example B5, an end mill was produced such that each nick had the shape shown in FIG. 19 wherein a rounded portion may be provided on the nick (see FIG. 20) as described in Patent Document 3. The end mill was produced in the same manner as in Conventional Example 4, except that the curvature radius R1 of a tool-end-side rounded portion of each nick was adjusted to 0.005 D (0.05 mm), and the curvature radius R2 of a tool-shank-side rounded portion of each nick was adjusted to be equal to the curvature radius R1 (i.e., 0.05 mm).

In Conventional Example B6, an end mill was produced such that each nick was formed to attain the shape described in Patent Document 4, in which a connection portion between each nick and a corresponding peripheral cutting edge has a curvature radius smaller than that of a concave arc portion forming the nick, and the curvature radius is made equal between the tool end side and the tool shank side (the nick shape is shown in FIG. 21). Specifically, the end mill was produced in the same manner as in Invention Example B6, except that each nick was connected to a corresponding peripheral cutting edge via a concave arc portion; the curvature radius R1 of a tool-end-side rounded portion of each nick was adjusted to 0.02 D (0.2 mm); and the curvature radius R2 of a tool-shank-side portion of each nick was adjusted to be equal to the curvature radius R1 of the tool-end-side rounded portion.

In Conventional Example B7, an end mill was produced so as to have the shape of a conventional nicked carbide end mill, in which the bottom end of each nick was connected to a tool-shank-side rounded portion via a curve portion concaved toward the nick. Specifically, the end mill was produced in the same manner as in Invention Example B6, except that rounded portions were not provided on the tool end side and the tool shank side of each nick.

Figure 18:
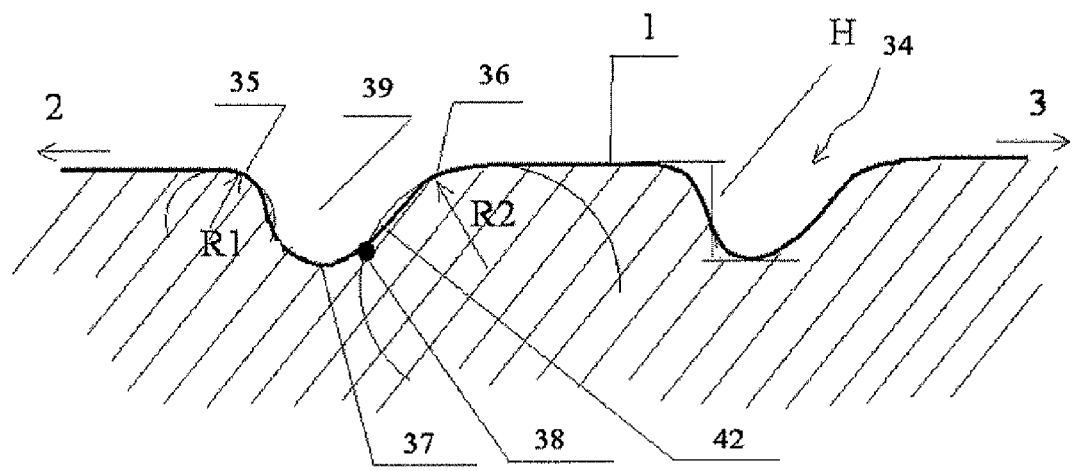
FIG. 18 shows a conventional nicked carbide end mill in which the bottom end of each nick is connected to a tool-shank-side rounded portion via a curve portion convexed toward the direction opposite the nick groove.

In Table B2, "straight connection" refers to the shape of each nick in which the bottom end of the nick is connected to the tool-shank-side rounded portion thereof (curvature radius R2) via a straight portion; "convex curve" refers to the shape of each nick in which the bottom end of the nick is connected to the tool-shank-side rounded portion thereof (curvature radius R2) via a curve portion convexed toward the nick; "straight convex curve" refers to the shape of each nick in which the bottom end of the nick is connected to the tool-shank-side rounded portion thereof (curvature radius R2) via a straight portion and a curve portion convexed toward the nick; and "concave arc" refers to the shape of each nick which is shown in FIG. 18 (conventional example), in which the bottom end of the nick is connected to the tool-shank-side rounded portion thereof (curvature radius R2) via a curve or arc portion concaved toward the nick.

The thus-produced end mills (samples) were subjected to a cutting test under the same conditions. A stainless steel SUS304 block material was provided as a workpiece. Cutting was carried out under the following conditions: rotational speed of the nicked carbide end mill: 4,000 rotations/min (cutting speed: 120 m/min), amount of cutting in axial direction: 10 mm, and amount of cutting in radial direction: 4 mm. A water-soluble lubricant was employed for cutting.

In the case of a conventional nicked carbide end mill of this type, an average feed rate for securing an average surface roughness is about 500 ram/min. Therefore, in order to evaluate the machining performance of the end mill of the present invention, feed rate was gradually increased from 500 mm/min (feed rate per cutting edge: 0.03 mm/min) for investigation of feed rate limit. Thus, when a feed rate of 1,000 mm/min or higher is attained, and no problem arises in terms of occurrence of chipping or impairment of surface roughness, the end mill is regarded as achieving high-performance machining (i.e., machining performance is twice or more that of a conventional end mill).

In evaluation of each end mill, cutting was stopped when a problem (e.g., chipping) occurred or the average roughness Ra of the machined surface of a workpiece reached 4 μm or more, and the feed rate at the time of stopping was recorded as feed rate limit (mm/min).

In the case where a problem (e.g., chipping) did not occur in an end mill, and the average roughness Ra of the machined surface of a workpiece was 4 μm or less at the time when the feed rate limit was 1,000 mm/min, the end mill was evaluated as "good" and by rating "BB." In the case where a problem (e.g., chipping) did not occur in an end mill, and the average roughness Ra of the machined surface of a workpiece was 4 μm or less at the time when the feed rate limit was 1,500 mm/min, the end mill was evaluated as "good high-rate feed" and by rating "AA." In the case where chipping occurred in an end mill, or the average roughness Ra of the machined surface of a workpiece exceeded 4 μm at the time when the feed rate limit was less than 1,000 mm/min, the average machined surface roughness Ra was recorded thereupon, and the end mill was evaluated by rating "CC." Table B2 shows the specifications of the end mills samples tested and the results of the test.

TABLE B2

| Sample No. | | R1 (mm) | R2 (mm) | Shape of a portion connecting the bottom end of each nick and a tool-shank-side rounded portion of the nick | Depth of nick (mm) | Feed rate limit (mm/min) | Machined surface roughness Ra at feed rate limit (μm) | Cause of stopping at feed rate limit | Evaluation |
|---|---|---|---|---|---|---|---|---|---|
| Invention Example | 6 | 0.2 | 0.34 | Straight connection | 0.25 | 2000 | 1.28 | Good high-rate feed | AA |
| | 7 | 0.2 | 0.34 | Convex curve | 0.25 | 1800 | 1.12 | Good high-rate feed | AA |
| | 8 | 0.2 | 0.34 | Straight + convex curve | 0.25 | 1400 | 1.33 | Good high-rate feed | AA |
| | 9 | 0.1 | 0.16 | Straight connection | 0.25 | 1600 | 1.42 | Good high-rate feed | AA |
| | 10 | 0.3 | 0.48 | Straight connection | 0.25 | 1700 | 1.57 | Good high-rate feed | AA |
| | 11 | 0.2 | 0.3 | Straight connection | 0.25 | 1800 | 1.31 | Good high-rate feed | AA |
| | 12 | 0.2 | 0.4 | Straight connection | 0.25 | 1700 | 1.43 | Good high-rate feed | AA |
| | 13 | 0.2 | 0.34 | Straight connection | 0.1 | 1500 | 2.02 | Good high-rate feed | AA |
| | 14 | 0.2 | 0.34 | Straight connection | 0.5 | 1700 | 1.64 | Good high-rate feed | AA |
| | 15 | 0.07 | 0.12 | Straight connection | 0.25 | 1400 | 2.74 | Good | BB |
| | 16 | 0.33 | 0.52 | Straight connection | 0.25 | 1300 | 2.85 | Good | BB |
| | 17 | 0.2 | 0.26 | Straight connection | 0.25 | 1200 | 3.51 | Good | BB |
| | 18 | 0.2 | 0.5 | Straight connection | 0.25 | 1300 | 2.92 | Good | BB |
| | 19 | 0.2 | 0.34 | Straight connection | 0.08 | 1200 | 3.21 | Good | BB |
| | 20 | 0.2 | 0.34 | Straight connection | 0.7 | 1300 | 3.14 | Good | BB |
| | 21 | 0.2 | 0.34 | Concave arc | 0.25 | 1100 | 3.38 | Good | BB |
| | 22 | 0.1 | 0.13 | Concave arc | 0.25 | 1100 | 3.46 | Good | BB |
| | 23 | 0.2 | 0.34 | Straight connection | 0.25 | 2200 | 1.25 | Good high-rate feed | AA |
| Comparative Example | 2 | 0.2 | 0.2 | Straight connection | 0.25 | 800 | 4.82 | Occurrence of chipping | CC |
| | 3 | 0.34 | 0.2 | Straight connection | 0.25 | 500 | 4.58 | Impairment of machined surface | CC |
| Conventional Example | 4 | 0 | 0 | Straight connection | 0.25 | 500 | 4.54 | Occurrence of chipping | CC |
| | 5 | 0.05 | 0.05 | Straight connection | 0.25 | 700 | 4.26 | Occurrence of chipping | CC |
| | 6 | 0.2 | 0.2 | Concave arc | 0.25 | 800 | 5.18 | Occurrence of chipping | CC |
| | 7 | 0 | 0 | Concave arc | 0.25 | 400 | 4.99 | Occurrence of chipping | CC |

As a result, in the cases of Invention Examples B6 to B23, neither chipping nor fracture occurred, and the average surface roughness Ra was 4 μm or less at the time when the feed rate limit was 1,000 mm/min; i.e., high-feed-rate machining was achieved. Particularly, in the cases of Invention Examples B6 to B14 and B23, no problem (e.g., chipping) occurred, and the average machined surface roughness Ra was 2.0 μm or less at the time when the feed rate limit was 1,500 mm/min; i.e., high performance at high feed rate was achieved, and surface machining with high accuracy was secured. Furthermore, in the case of Invention Example B23, in which each gash was composed of a plurality of surfaces, the best result was obtained (i.e., feed rate limit of 2,200 mm/min).

The data of Invention Examples B6 to B8 and B21 indicate that feed rate limit is considerably varied with the shape of a portion connecting the bottom end of each nick and a tool-shank-side rounded portion (curvature radius R2) of the nick, and the best result is obtained by connecting the bottom end of each nick to a tool-shank-side rounded portion (curvature radius R2) of the nick via a straight portion.

In the case of Comparative Example B2, chipping occurred at the time when the feed rate was 800 mm/min. This indicates that strength becomes insufficient when the curvature radius R1 of a tool-end-side rounded portion of each nick is equal to the curvature radius R2 of a tool-shank-side rounded portion of the nick, and the curvature radius R2 is as small as 0.2 mm. In the case of Comparative Example B3, line-shaped marks were formed on the machined surface of a workpiece after cutting at a feed rate of 500 mm/min, and the average surface roughness Ra exceeded 4 µm (i.e., 4.58 µm). This indicates that when the curvature radius of a tool-end-side rounded portion of each nick is greater than that of a tool-shank-side rounded portion of the nick, a force of pressing the machining surface to the tool-shank-side rounded portion becomes large, and thus line-shaped marks are formed on the machined surface, resulting in large average surface roughness Ra.

In the case of Conventional Example B4, chipping occurred upon machining at a feed rate of 500 mm/min, and the average surface roughness Ra became 4.54 µm. In the case of Conventional Example B7, chipping occurred at a feed rate of 400 mm/min, and the average surface roughness Ra became 4.99 µm. This indicates when rounded portions are not provided on the tool end side and the tool shank side of each nick, strength is reduced, and chipping occurs upon high-feed-rate machining.

In the case of Conventional Example B5, in which each nick was formed to have the same shape as in Conventional Example B4, and rounded portions were provided on the tool end side and tool shank side of each nick, chipping occurred upon machining at a feed rate of 700 mm/min. In the case of Conventional Example B6, chipping occurred on the tool shank side of nicks upon machining at a feed rate of 800 mm/min. This indicates that when the curvature radius R1 of a tool-end-side rounded portion of each nick is equal to the curvature radius R2 of a tool-shank-side rounded portion of the nick, strength is not enough, and when a portion connecting each nick and a corresponding peripheral cutting edge has a concave shape, strength of the peripheral cutting edge is further reduced, and chipping occurs.

As is clear from the data of Example B1 and Example 32, chattering vibration is reduced and chipping resistance is improved by a synergistic effect of optimal phase deviation amount and nick shape, and thus high-performance machining is reliably performed through high-speed cutting. It was also found that cutting at a speed considerably higher than a conventional cutting speed requires provision of rounded portions on the tool end side and the tool shank side of each nick, as well as optimization of the shape of each nick.

Example C1

In Example C1, the shape of gashes suitable for the carbide end mill of the present invention (i.e., the end mill having second and third gash surfaces) was determined. The end mill of the present invention was compared with a conventional carbide end mill having no third gash surface, a carbide end mill described in Patent Document 5 in which gash notch angle is specified, or a carbide end mill described in Patent Document 6 in which the angle of a gash provided on the peripheral side of the end mill is rendered larger than the angle of a gash provided on the side toward the rotational center of the end mill.

In Invention Examples C1 to C12, Conventional Examples C1 to C3, and Comparative Examples C1 to C6, end mills, each having four wavy peripheral cutting edges, were produced from a carbide base having a Co content of 8 wt.% and a mean WC grain size of 0.8 µm (tool diameter: 8 mm, cutting edge length: 16 mm, total length: 70 mm, shank diameter: 8 mm, waveform pitch: 1 mm, helix angle: 45°). Each of the end mills (samples) was coated with a hard coat formed of an Si-containing (TiAl)N compound.

In Example C1, each end mill was produced so as to have the following wavy peripheral cutting edges. Specifically, a first wavy peripheral cutting edge was considered a reference peripheral cutting edge, and the remaining (second to fourth) peripheral cutting edges were deviated from the respective reference phases of the reference peripheral cutting edge, wherein the distance of the reference phase is a value obtained by equally quartering the waveform pitch of the reference peripheral cutting edge. In a second wavy peripheral cutting edge, the phase deviation amount was adjusted to 2% of the waveform pitch (i.e., 0.02 mm). In a third wavy peripheral cutting edge, the phase deviation amount was adjusted to 0% of the waveform pitch (i.e., 0 mm). In a fourth wavy peripheral cutting edge, the phase deviation amount was adjusted to 2% of the waveform pitch (i.e., 0.02 mm).

In Invention Examples C1 to C5 and Comparative Examples C1 and C2, a second gash angle was adjusted to 50°, and the length of a connection portion 58 between a second gash surface and a third gash surface was adjusted to 9% of the tool diameter (i.e., 0.72 mm) as measured from the tool rotation axis. In Invention Examples C1 to C5, first gash angles were adjusted to 15°, 20°, 25°, 30°, and 35°, respectively, and, in Comparative Examples C1 and C2, first gash angles were adjusted to 10° and 40°, respectively.

In Invention Examples C6 to C9 and Comparative Examples C3 and C4, a first gash angle was adjusted to 25°, and the length of a connection portion 58 between a second gash surface and a third gash surface was adjusted to 9% of the tool diameter (i.e., 0.72 mm) as measured from the tool rotation axis. In Invention Examples C6 to C9, second gash angles were adjusted to 40°, 45°, 55°, and 60°, respectively, and, in Comparative Examples C3 and C4, second gash angles were adjusted to 35° and 65°, respectively.

In Invention Examples C10 to C12 and Comparative Examples C5 and C6, a first gash angle was adjusted to 25°, and a second gash angle was adjusted to 50°. In Invention Examples C10 to C12, the length of a connection portion 58 between a second gash surface and a third gash surface was respectively adjusted to 5%, 10%, and 15% of the tool diameter as measured from the tool rotation axis, and in Comparative Examples C5 and C6, the length of a connection portion 58 between a second gash surface and a third gash surface was respectively adjusted to 0% and 3% of the tool diameter as measured from the tool rotation axis.

In Conventional Example C1, an end mill having a first gash angle of 25° and having no third gash surface was produced. In Conventional Example C2, an end mill was produced so as to have the same specification as described in Patent Document 6, in which the length of a connection portion 58 between a second gash surface and a third gash surface was adjusted to 20% of the tool diameter (i.e., 1.6 mm) as measured from the tool rotation axis, a first gash angle was adjusted to 25°, and a second gash angle was adjusted to 50°. In Conventional Example C3, an end mill was produced so as to have the same specification as shown in FIG. 1 of Patent Document 5, in which the length of a connection portion 58 between a second gash surface and a third gash surface was adjusted to 23.5% of the tool diameter (i.e., 1.76 mm) as measured from the tool rotation axis, a first gash angle was adjusted to 25°, and a second gash angle was adjusted to 50°.

In Example C1, each of the above-produced 21 end mills was employed for machining of pre-hardened steel having a hardness of HRC 40 (i.e., workpiece) so as to form a concave portion (50 mm in width, 50 mm in length, 24 mm in depth). For comparison of the end mills, each end mill was tested through machining of the workpiece by a cutting process including a step of oblique cutting until a depth of 8 mm, and a subsequent step of lateral-feed machining until a width of 50 mm and a length of 50 mm, which process was performed thrice until a depth of 24 mm.

In the case of conventional end mills, a cutting speed of 100 m/min is enough for high-speed cutting of a workpiece having a hardness of HRC 40. In contrast, in Example C1, cutting was carried out under the following conditions: rotational speed: 6,000 rotations/min (cutting speed: 150 m/min), feed rate: 1,920 mm/min (0.08 mm of feed per cutting edge), amount of cutting in axial direction: 8 mm, amount of cutting in radial direction: 2 mm, feed rate upon oblique cutting: 1,200 mm/min, and tilt angle: 10°.

When one concave portion having the aforementioned dimensions was formed by means of an end mill, the end mill was evaluated as "good." When fracture was observed in an end mill after machining, or breakage was observed in an end mill during machining, these observations were recorded. The results are shown in Table C1.

fracture occurred in the vicinity of end cutting edges during lateral-feed machining. In the case of Comparative Example C3, due to a small second gash angle of 35°, chips were difficult to be removed through peripheral cutting edge grooves, and jamming of chips occurred, resulting in fracture of peripheral cutting edges during lateral-feed machining. In the case of Comparative Example C4, due to a large second gash angle of 65°, rigidity became insufficient, and large fracture occurred in peripheral cutting edges and end cutting edges during lateral-feed machining. In the cases of Comparative Examples C5 and C6, due to a shorter length of a connection portion between a second gash surface and a third gash surface, rigidity was reduced in the vicinity of the center of the tool axis of end cutting edges, resulting in fracture after machining.

Example C2

In Example C2, the optimal amount of deviation of the reference phase was determined. In Invention Examples C13 to C17, Conventional Examples C4 to C7, and Comparative Example C7, end mills were produced such that a first gash angle was 25°, a second gash angle was 50°, and the length 58

TABLE C1

| Sample No. | | First gash angle (°) | Second gash angle (°) | Length of connection portion (mm) | Percentage (%) | Wear width (mm) | Evaluation |
|---|---|---|---|---|---|---|---|
| Invention | 1 | 15 | 50 | 0.72 | 9 | 0.05 | Good |
| Example C | 2 | 20 | 50 | 0.72 | 9 | 0.04 | Good |
| | 3 | 25 | 50 | 0.72 | 9 | 0.03 | Good |
| | 4 | 30 | 50 | 0.72 | 9 | 0.04 | Good |
| | 5 | 35 | 50 | 0.72 | 9 | 0.05 | Good |
| | 6 | 25 | 40 | 0.72 | 9 | 0.06 | Good |
| | 7 | 25 | 45 | 0.72 | 9 | 0.05 | Good |
| | 8 | 25 | 55 | 0.72 | 9 | 0.04 | Good |
| | 9 | 25 | 60 | 0.72 | 9 | 0.06 | Good |
| | 10 | 25 | 50 | 0.4 | 5 | 0.08 | Good |
| | 11 | 25 | 50 | 0.8 | 10 | 0.05 | Good |
| | 12 | 25 | 50 | 1.2 | 15 | 0.06 | Good |
| Conventional | 1 | 25 | — | — | — | — | Breakage |
| Example C | 2 | 25 | 50 | 1.6 | 20 | — | Fracture |
| | 3 | 25 | 50 | 1.76 | 23.5 | — | Fracture |
| Comparative | 1 | 10 | 50 | 0.72 | 9 | — | Fracture |
| Example C | 2 | 40 | 50 | 0.72 | 9 | — | Fracture |
| | 3 | 25 | 35 | 0.72 | 9 | — | Fracture |
| | 4 | 25 | 65 | 0.72 | 9 | — | Fracture |
| | 5 | 25 | 50 | 0 | 0 | — | Fracture |
| | 6 | 25 | 50 | 0.24 | 3 | — | Fracture |

As a result, in the cases of Invention Examples C1 to C12, jamming of chips did not occur, and both oblique cutting and lateral-feed machining were stably performed. In contrast, in the case of Conventional Example C1, due to the absence of a third gas surface, chip pockets of end cutting edges became small, and jamming of chips occurred, resulting in breakage during oblique cutting immediately after initiation of machining. In the cases of Conventional Examples C2 and C3, one concave portion was formed through machining, but a longer length 58 of a connection portion between a second gash surface and a third gash surface causes jamming of chips, resulting in large fracture in the vicinity of the tool rotation axis of end cutting edges.

In the case of Comparative Example C1, due to a small first gash angle of 10°, chip pockets of end cutting edges became small, and jamming of chips occurred, resulting in breakage during oblique cutting immediately after initiation of machining. In the case of Comparative Example C2, due to a large first gash angle of 40°, rigidity became insufficient, and large of a central connection portion was 9% of the tool diameter (i.e., 0.72 mm) as measured from the tool rotation axis.

In Invention Example C13, an end mill having the following wavy peripheral cutting edges was produced. Specifically, a first wavy peripheral cutting edge was considered a reference peripheral cutting edge, and the remaining (second to fourth) peripheral cutting edges were deviated from the respective reference phases of the reference peripheral cutting edge, wherein the distance of the reference phase is an amount corresponding to a value obtained by equally quartering the waveform pitch of the reference peripheral cutting edge. In a second wavy peripheral cutting edge, the phase deviation amount was adjusted to 1% of the waveform pitch (i.e., 0.01 mm). In a third wavy peripheral cutting edge, the phase deviation amount was adjusted to 1% of the waveform pitch (i.e., 0.01 mm). In a fourth wavy peripheral cutting edge, the phase deviation amount was adjusted to 0% of the waveform pitch (i.e., 0 mm).

In Invention Example C14, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 2%, of the waveform pitch (i.e., 0.02 mm). In a fourth wavy peripheral cutting edge, the phase deviation amount was adjusted to 0% of the waveform pitch (i.e., 0 mm).

In Invention Example C15, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 2% of the waveform pitch (i.e., 0.02 mm). In a fourth wavy peripheral cutting edge, the phase deviation amount was adjusted to 3% of the waveform pitch (i.e., 0.03 mm).

In Invention Example C16, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 5% of the waveform pitch (i.e., 0.05 mm). In a third wavy peripheral cutting edge, the phase deviation amount was adjusted to 4% of the waveform pitch (i.e., 0.04 mm). In a fourth wavy peripheral cutting edge, the phase deviation amount was adjusted to 3% of the waveform pitch (i.e., 0.03 mm).

In Invention Example C17, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 0% of the waveform pitch (i.e., 0 mm). In a fourth wavy peripheral cutting edge, the phase deviation amount was adjusted to 0% of the waveform pitch (i.e., 0 mm).

In Conventional Example C4, there was produced an end mill having wavy peripheral cutting edges without deviation from the reference phase. In Conventional Example C5, there was produced an end mill having wavy peripheral cutting edges with different separation angles (i.e., 85°, 95°, 85°, and 95°) and without deviation from the reference phase.

In Conventional Example C6, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 6% of the waveform pitch (i.e., 0.06 mm). In a third wavy peripheral cutting edge, the phase deviation amount was adjusted to 2% of the waveform pitch (i.e., 0.02 mm). In a fourth wavy peripheral cutting edge, the phase deviation amount was adjusted to 0% of the waveform pitch (i.e., 0 mm).

In Conventional Example C7, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 6% of the waveform pitch (i.e., 0.06 mm). In a third wavy peripheral cutting edge, the phase deviation amount was adjusted to 2% of the waveform pitch (i.e., 0.02 mm). In a fourth wavy peripheral cutting edge, the phase deviation amount was adjusted to 0% of the waveform pitch (i.e., 0 mm).

In Comparative Example C7, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 6% of the waveform pitch (i.e., 0.06 mm). In a third wavy peripheral cutting edge, the phase deviation amount was adjusted to 6% of the waveform pitch (i.e., 0.06 mm). In a fourth wavy peripheral cutting edge, the phase deviation amount was adjusted to 0% of the waveform pitch (i.e., 0 mm).

In Invention Examples C13 to C17, Conventional Examples C4 to C6, and Comparative Example C7, end mills were produced from a carbide base having a Co content of 8 wt. % and a mean WC grain size of 0.8 µm. In Conventional Example C7, an end mill was produced from a high-speed tool steel base. Each of the end mills was produced so as to have four wavy peripheral cutting edges (tool diameter: 8 mm, cutting edge length: 16 mm, total length: 70 mm, shank diameter: 8 mm, waveform pitch: 1 mm, helix angle: 45°). Each of the end mills (samples) was coated with a hard coat formed of an Si-containing (TiAl)N compound.

The type of a workpiece, cutting conditions, and the shape of machining were the same as in Example C1, and evaluation of each end mill was carried out in the same manner as in Example C1. Specifically, after formation of one concave portion through machining, the wear width of end cutting edges was measured and recorded. In Conventional Example C7, in which the end mill was produced from high-speed tool steel, cutting was performed under much milder conditions than those employed for testing of a carbide end mill; i.e., rotational speed: 1,200 rotations/min (cutting speed: 30 m/min), feed rate: 150 mm/min (0.03 mm of feed per cutting edge), amount of cutting in axial direction: 8 mm, amount of cutting in radial direction: 2 mm, feed rate upon oblique cutting: 70 mm/min, and tilt angle: 10°. The results are shown in Table C2.

TABLE C2

| | | | Phase deviation amount (mm) | | | | | |
|---|---|---|---|---|---|---|---|---|
| Sample No. | | Base of end mill | Separation of cutting edges | Second wavy peripheral cutting edge | Third wavy peripheral cutting edge | Fourth wavy peripheral cutting edge | Phase deviation amount (%) | Wear width (mm) | Evaluation |
| Invention Example C | 13 | Carbide | Equal separation | 0.01 | 0.01 | 0 | 1 | 0.1 | Good |
| | 14 | Carbide | Equal separation | 0.02 | 0.02 | 0 | 2 | 0.08 | Good |
| | 15 | Carbide | Equal separation | 0.02 | 0.02 | 0.03 | 3 | 0.09 | Good |
| | 16 | Carbide | Equal separation | 0.05 | 0.04 | 0.03 | 5 | 0.12 | Good |
| | 17 | Carbide | Equal separation | 0.02 | 0 | 0 | 2 | 0.08 | Good |
| Conventional Example C | 4 | Carbide | Equal separation | 0 | 0 | 0 | 0 | — | Fracture |
| | 5 | Carbide | Unequal separation | 0 | 0 | 0 | 0 | — | Chipping |
| | 6 | Carbide | Equal separation | 0.06 | 0.02 | 0 | 6 | — | Chipping |
| | 7 | High-speed tool steel | Equal separation | 0.06 | 0.02 | 0 | 6 | — | Breakage |
| Comparative Example C | 7 | Carbide | Equal separation | 0.06 | 0.06 | 0 | 6 | — | Chipping |

As a result, in the cases of Invention Examples C13 to C17, one concave portion was formed through stable machining. Particularly, when the amount of deviation from the reference phase was 1 to 3%, wear width was as small as 0.1 mm or less.

In the case of Conventional Example C4, although gashes were formed to have an optimal shape, chattering vibration occurred during lateral-feed machining, and fracture occurred in end cutting edges after formation of one concave portion of the work through machining. In the case of Conventional Example C5, chattering vibration was reduced by unequal separation, and one concave portion was formed through machining. However, chips generated by end cutting edges during oblique cutting were jammed in small grooves of peripheral cutting edges, resulting in occurrence of chipping.

In the case of Conventional Example C6, the amount of deviation from the reference phase was as large as 6%, and thus chipping occurred in peripheral cutting edges to which the heaviest load was held. In the case of Conventional Example C7, the end mill, which was produced from high-speed tool steel, exhibited low tool rigidity, and breakage occurred during oblique cutting immediately after initiation of cutting. In the case of Comparative Example C7, similar to the case of Conventional Example C6, the amount of deviation from the reference phase was as large as 6%, and thus chipping occurred in peripheral cutting edges to which the heaviest load was held.

Example C3

In Example C3, end mills of Invention Example and Conventional Examples were tested to investigate feed rate limit. An end mill of Invention Example C18 was produced in the same manner as in Invention Example C3 (Example C1); an end mill of Conventional Example C8 was produced in the same manner as in Conventional Example C3 (Example C1); and an end mill of Conventional Example C9 (i.e., unequally-separated product) was produced in the same manner as in Conventional Example C5 (Example C2). Each of the end mills was tested to investigate feed rate limit by using structural steel as a workpiece.

In Invention Example C18 and Conventional Examples C8 and C9, end mills, each having four wavy peripheral cutting edges, were produced from a carbide base having a Co content of 8 wt. % and a mean WC grain size of 0.8 μm (tool diameter: 8 mm, cutting edge length: 16 mm, total length: 70 mm, shank diameter: 8 mm, waveform pitch: 1 mm, helix angle: 45°). Each of the end mills (samples) was coated with a hard coat formed of an Si-containing (TiAl)N compound. Cutting conditions were as follows: rotational speed: 8,000 rotations/min (cutting speed: 200 m/min), feed rate: 2,800 mm/min (0.09 mm of feed per cutting edge), and amount of cutting in axial direction: 4 mm.

For evaluation of each end mill, feed rate was increased by 350 mm/min every 1 m cutting, and the feed rate at which breakage occurred was recorded. When no problems occurred after machining, rating "O" was assigned, whereas when breakage occurred or when fracture or chipping occurred after 1 m cutting at any feed rate, rating "X" was assigned. An end mill which did not cause any problem through cutting at a feed rate of 4,200 ram/min or higher was evaluated as "good." The results are shown in Table C3.

TABLE C3

| Sample No. | | Separation of cutting edges | First gash angle (°) | Second gash angle (°) | Percentage (%) | Phase deviation amount (%) | Feed rate (mm/min) | | | | | Evaluation |
|---|---|---|---|---|---|---|---|---|---|---|---|---|
| | | | | | | | 2800 | 3150 | 3500 | 3850 | 4200 | |
| Invention Example C | 18 | Equal separation | 25 | 50 | 9 | 2 | O | O | O | O | O | Good |

TABLE C3-continued

| Sample No. | | Separation of cutting edges | First gash angle (°) | Second gash angle (°) | Percentage (%) | Phase deviation amount (%) | Feed rate (mm/min) | | | | | Evaluation |
|---|---|---|---|---|---|---|---|---|---|---|---|---|
| | | | | | | | 2800 | 3150 | 3500 | 3850 | 4200 | |
| Conventional Example C | 8 | Equal separation | 25 | 50 | 23.5 | 2 | X | | | | | Fracture |
| | 9 | Unequal separation | 25 | 50 | 9 | 0 | ○ | X | | | | Breakage |

As a result, in the case of Invention Example C18, cutting was performed until feed rate reached 4,200 mm/min without causing any problem. In contrast, in the case of Conventional Example C8, fracture occurred when feed rate reached 2,800 mm/min, and, in the case of Conventional Example C9, breakage occurred when feed rate reached 3,150 mm/min. Thus, the end mill according to the present invention realized machining at a feed rate 1.5 times or more that in the case of a conventional end mill.

Example C4

In Example C4, similar to the case of Example C2, the optimal amount of deviation of the reference phase was determined in nicked peripheral cutting edges. In Invention Examples C19 to C23, Conventional Examples C10 to C13, and Comparative Example C8, each of the end mills was produced such that a first gash angle was 25°, a second gash angle was 50°, and the length of a central connection portion was 9% of the tool diameter (i.e., 0.72 mm) as measured from the tool rotation axis.

In Invention Example C19, an end mill having the following nicked peripheral cutting edges was produced. Specifically, a first nicked peripheral cutting edge was considered a reference peripheral cutting edge, and the remaining (second to fourth) peripheral cutting edges were deviated from the respective reference phases of the reference peripheral cutting edge, wherein the distance of the reference phase is an amount corresponding to a value obtained by equally quartering the nick pitch of the reference peripheral cutting edge. In a second nicked peripheral cutting edge, the phase deviation amount was adjusted to 1% of the nick pitch (i.e., 0.01 mm). In a third nicked peripheral cutting edge, the phase deviation amount was adjusted to 1% of the nick pitch (i.e., 0.01 mm). In a fourth nicked peripheral cutting edge, the phase deviation amount was adjusted to 0% of the nick pitch (i.e., 0 mm).

In Invention Example C20, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 2% of the nick pitch (i.e., 0.02 mm). In a fourth nicked peripheral cutting edge, the phase deviation amount was adjusted to 0% of the nick pitch (i.e., 0 mm).

In Invention Example C21, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 2% of the nick pitch (i.e., 0.02 mm). In a fourth nicked peripheral cutting edge, the phase deviation amount was adjusted to 3% of the nick pitch (i.e., 0.03 mm).

In Invention Example C22, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 5% of the nick pitch (i.e., 0.05 mm). In a third nicked peripheral cutting edge, the phase deviation amount was adjusted to 4% of the nick pitch (i.e., 0.04 mm). In a fourth nicked peripheral cutting edge, the phase deviation amount was adjusted to 3% of the nick pitch (i.e., 0.03 mm).

In Invention Example C23, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 0% of the nick pitch (i.e., 0 mm).

In Conventional Example C10, an end mill having nicked peripheral cutting edges without deviation from the reference phase was produced.

In Conventional Example C11, an end mill having nicked peripheral cutting edges with different separation angles (i.e., 85°, 95°, 85°, and 95°) and without deviation from the reference phase was produced.

In Conventional Example C12, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 2% of the nick pitch (i.e., 0.02 mm). In a fourth nicked peripheral cutting edge, the phase deviation amount was adjusted to 0% of the nick pitch (i.e., 0 mm).

In Conventional Example C13, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 2% of the nick pitch (i.e., 0.02 mm). In a fourth nicked peripheral cutting edge, the phase deviation amount was adjusted to 0% of the nick pitch (i.e., 0 mm).

In Comparative Example C8, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 6% of the nick pitch (i.e., 0.06 mm). In a fourth nicked peripheral cutting edge, the phase deviation amount was adjusted to 0% of the nick pitch (i.e., 0 mm).

In Invention Examples C19 to C23, Conventional Examples C10 to C12, and Comparative Example C8, end mills were produced from a carbide base having a Co content of 8 wt. % and a mean WC grain size of 0.8 µm. In Conventional Example C13, an end mill was produced from a high-speed tool steel base. Each of the end mills was produced so as to have four nicked peripheral cutting edges (tool diameter: 8 mm, cutting edge length: 16 mm, total length: 70 mm, shank diameter: 8 mm, nick pitch: 1 mm, helix angle: 45°). Each of the end mills (samples) was coated with a hard coat formed of an Si-containing (TiAl)N compound.

The type of a workpiece, cutting conditions, and the shape of machining were the same as in Example C1, and evaluation of each end mill was carried out in the same manner as in Example C1. Specifically, after formation of one concave portion through machining, the wear width of end cutting edges was measured and recorded. In Conventional Example C13, in which the end mill was produced from high-speed tool steel, cutting was performed under much milder conditions than those employed for testing of a carbide end mill; i.e., rotational speed: 1,200 rotations/min (cutting speed: 30 m/min), feed rate: 150 mm/min (0.03 mm of feed per cutting edge), amount of cutting in axial direction: 8 mm, amount of cutting in radial direction: 2 mm, feed rate upon oblique cutting: 70 mm/min, and tilt angle: 10°. The results are shown in Table C4.

The results of Example C4 are as follows. In the cases of Invention Examples C19 to C23, one concave portion was formed through stable machining. Particularly, when the amount of deviation from the reference phase was 1 to 3%, wear width was as small as 0.1 mm or less. In the case of Conventional Example C10, although gashes were formed to have an optimal shape, chattering vibration occurred during lateral-feed machining, and fracture occurred in end cutting edges after formation of one concave portion through machining of peripheral cutting edges. In the case of Conventional Example C11, chattering vibration was reduced by unequal separation, and one concave portion was formed through machining. However, chips generated by end cutting edges during oblique cutting were jammed in small grooves of peripheral cutting edges, resulting in occurrence of chipping.

In the case of Conventional Example C12, the amount of deviation from the reference phase was as large as 6%, and thus chipping occurred in peripheral cutting edges to which the heaviest load was held. In the case of Conventional Example C13, the end mill, which was produced from high-speed tool steel, exhibited low tool rigidity, and breakage occurred during oblique cutting immediately after initiation of cutting. In the case of Comparative Example C10, similar to the case of Conventional Example C12, the amount of deviation from the reference phase was as large as 6%, and thus chipping occurred in peripheral cutting edges to which the heaviest load was held. The results obtained in the cases of carbide end mills having nicked peripheral cutting edges were almost the same as those obtained in the cases of end mills having wavy peripheral cutting edges (Example C2).

Examples D shown below in tables are classified into Invention Examples, Conventional Examples, and Comparative Examples, and samples in Invention Examples, Conventional Examples, or Comparative Examples are represented by serial numbers. In the below-described Tables D1, D2, and D3, the composition of an innermost layer, an outermost layer, or an intermediate layer forming a hard coat is represented by atomic % (inside of parenthesis) or atomic proportion (outside of parenthesis). For example, the composition of an innermost layer forming a hard coat of sample No. 1 shown below in Table D1 is represented by the following formula: (Ti45-Al55)N. This representation refers to a compound containing Ti45-Al55 (i.e., Ti (45 atomic %)-Al (55 atomic %)) and N in atomic proportions of 1:1.

TABLE C4

| Sample No. | | Base of end mill | Separation of cutting edges | Second nicked peripheral cutting edge | Third nicked peripheral cutting edge | Fourth nicked peripheral cutting edge | Phase deviation amount (%) | Wear width (mm) | Evaluation |
|---|---|---|---|---|---|---|---|---|---|
| Invention Example C | 19 | Carbide | Equal separation | 0.01 | 0.01 | 0 | 1 | 0.1 | Good |
| | 20 | Carbide | Equal separation | 0.02 | 0.02 | 0 | 2 | 0.09 | Good |
| | 21 | Carbide | Equal separation | 0.02 | 0.02 | 0.03 | 3 | 0.09 | Good |
| | 22 | Carbide | Equal separation | 0.05 | 0.04 | 0.03 | 5 | 0.14 | Good |
| | 23 | Carbide | Equal separation | 0.02 | 0 | 0 | 2 | 0.08 | Good |
| Conventional Example C | 10 | Carbide | Equal separation | 0 | 0 | 0 | 0 | — | Fracture |
| | 11 | Carbide | Unequal separation | 0 | 0 | 0 | 0 | — | Chipping |
| | 12 | Carbide | Equal separation | 0.06 | 0.02 | 0 | 6 | — | Chipping |
| | 13 | High-speed tool steel | Equal separation | 0.06 | 0.02 | 0 | 6 | — | Breakage |
| Comparative Example C | 8 | Carbide | Equal separation | 0.06 | 0.06 | 0 | 6 | — | Chipping |

Example D1

In Example D1, particularly, the optimal amount of deviation of wavy peripheral cutting edges from the respective reference phases was determined in various end mills coated by different surface treatments.

In Invention Examples D1 to D12, Comparative Examples D1 and D2, and Conventional Examples D1 to D3, end mills, each having four wavy peripheral cutting edges, were produced from a carbide base having a Co content of 8 wt % and a mean WC grain size of 0.8 (tool diameter: 8 mm, cutting edge length: 16 mm, total length: 70 mm, shank diameter: 8 mm, waveform pitch: 1 mm, helix angle: 45°). Each of the end mills was subjected to a cutting test. In Conventional Example D4, an end mill having four wavy peripheral cutting edges was produced from high-speed tool steel (tool diameter: 8 mm, cutting edge length: 16 mm, total length: 70 mm, shank diameter: 8 mm, waveform pitch: 1 mm, helix angle: 45°). The end mill was also subjected to a cutting test.

In Invention Examples D1 to D5, Comparative Example D1, and Conventional Examples D1 to D4, in order to evaluate the shape effect of wavy peripheral cutting edges of the end mills, all the end mills of these Examples were subjected to the same surface treatment (i.e., coating with a hard coat including a TiAlN innermost layer and a TiSiN outermost layer), except for the end mill of Invention Example D4, in which a TiAlSiN intermediate layer was employed. In each of these Examples, the hard coat was formed of a composite layer through arc discharge ion plating. In Comparative Example D2, surface treatment was not applied.

In Invention Example D1, an end mill having the following wavy peripheral cutting edges was produced. Specifically, a first wavy peripheral cutting edge was considered a reference peripheral cutting edge, and the remaining (second to fourth) peripheral cutting edges were deviated from the respective reference phases of the reference peripheral cutting edge, wherein the distance of the reference phase is an amount corresponding to a value obtained by equally quartering the waveform pitch of the reference peripheral cutting edge. In a second wavy peripheral cutting edge, the phase deviation amount was adjusted to 1% of the waveform pitch (i.e., 0.01 mm). In a third wavy peripheral cutting edge, the phase deviation amount was adjusted to 0% of the waveform pitch (i.e., 0 mm). In a fourth wavy peripheral cutting edge, the phase deviation amount was adjusted to 1% of the waveform pitch (i.e., 0.01 mm).

In Invention Example D2, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 0% of the waveform pitch (i.e., 0 mm). In a fourth wavy peripheral cutting edge, the phase deviation amount was adjusted to 2% of the waveform pitch (i.e., 0.02 mm).

In Invention Example D3, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 3% of the waveform pitch (i.e., 0.03 mm). In a fourth wavy peripheral cutting edge, the phase deviation amount was adjusted to 2% of the waveform pitch (i.e., 0.02 mm).

In Invention Example D4, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 5% of the waveform pitch (i.e., 0.05 mm). In a third wavy peripheral cutting edge, the phase deviation amount was adjusted to 3% of the waveform pitch (i.e., 0.03 mm). In a fourth wavy peripheral cutting edge, the phase deviation amount was adjusted to 4% of the waveform pitch (i.e., 0.04 mm).

In Invention Example D5, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 2% of the waveform pitch (i.e., 0.02 mm). In a third wavy peripheral cutting edge, the phase deviation amount was adjusted to 0% of the waveform pitch (i.e., 0 mm). In a fourth wavy peripheral cutting edge, the phase deviation amount was adjusted to 0% of the waveform pitch (i.e., 0 mm).

In Invention Examples D6 to D12, the phase deviation amount (%) of wavy peripheral cutting edges of each example was adjusted to fall within a preferred range of the present invention (i.e., 2% to 3%), and the end mills of these Examples were subjected to different surface treatments (i.e., coating with different hard coats). The thus-treated end mills were subjected to a cutting test. In each of the surface treatments, a hard coat was formed of a composite layer through arc discharge ion plating. The composite layer were formed with layer selected from an innermost layer, an outermost layer, and an intermediate layer as shown in Table D1. A hard coat having no intermediate layer in Table D1, two-layer hard coat was formed of an innermost layer and an outermost layer having the compositions shown in Table D1, or stacked layers of the coat were formed by repeating the aforementioned compositions wherein at least the innermost layer and the outermost layer have the compositions shown in Table D1.

In Comparative Example D1, an end mill having the following wavy peripheral cutting edges was produced. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 6% of the waveform pitch (i.e., 0.06 mm). In a third wavy peripheral cutting edge, the phase deviation amount was adjusted to 0% of the waveform pitch (i.e., 0 mm). In a fourth wavy peripheral cutting edge, the phase deviation amount was adjusted to 6% of the waveform pitch (i.e., 0.06 mm). In Comparative Example D2, an end mill was produced in the same manner as in Invention Example D2.

In Conventional Example D1, there was produced an end mill having wavy peripheral cutting edges of constant phase deviation amount, wherein, in each wavy peripheral cutting edge, the amount of deviation from the reference phase (i.e., ¼ of the waveform pitch of the reference peripheral cutting edge) was adjusted to 0%.

In Conventional Example D2, there was produced an end mill having wavy peripheral cutting edges of constant phase deviation amount with different separation angles (i.e., 95°, 85°, 95°, and 85°), wherein, in each wavy peripheral cutting edge, the amount of deviation from the reference phase (i.e., ¼ of the waveform pitch of the reference peripheral cutting edge) was adjusted to 0%.

In Conventional Example D3, as described in Patent Document 2, a hard coated end mill employed for a cutting test (phase deviation amount: 6%) was produced from high-speed tool steel. Specifically, a first wavy peripheral cutting edge was considered a reference peripheral cutting edge, and the remaining (second to fourth) peripheral cutting edges were deviated from the above-obtained respective reference phases. In a second wavy peripheral cutting edge, the phase deviation amount was adjusted to 6% of the waveform pitch (i.e., 0.06 mm). In a third wavy peripheral cutting edge, the phase deviation amount was adjusted to 0% of the waveform pitch (i.e., 0 mm). In a fourth wavy peripheral cutting edge, the phase deviation amount was adjusted to 2% of the waveform pitch (i.e., 0.02 mm).

In Conventional Example D4, an end mill was produced from high-speed tool steel in the same manner as in Conventional Example D3. Each of these end mills produced from high-speed tool steel was coated with a hard coat according to the present invention, and the thus-coated end mill was compared (for evaluation) with a hard coat-coated carbide end mill.

In each of the end mills of Invention Examples D1 to D12, Comparative Example D1 and D2, and Conventional Examples D1, D3, and D4, wavy peripheral cutting edges were formed so as to have the same separation angle.

Each of the thus-produced 16 end mills of Example D1 (exclusive of the end mill of Conventional Example D4 produced from high-speed tool steel) was subjected to a cutting test employing a workpiece (die steel SKD61 for hot working having a hardness of HRC 40). Cutting was carried out under the following conditions: rotational speed: 6,000 rotations/min (cutting speed: 150 m/min), feed rate: 1,600 mm/min (0.06 mm of feed per cutting edge), amount of cutting in axial direction: 4 mm, and amount of cutting in radial direction: 4 mm. For evaluation of each end mill, peripheral cutting edges thereof were observed every 5 m cutting, and wear width was recorded.

When wear width was 0.15 mm or less, and none of breakage, fracture, and chipping occurred in an end mill until 50 m cutting, the end mill was evaluated as "good." When the wear width of peripheral cutting edges of an end mill exceeded 0.15 mm until 50 m cutting, cutting was stopped upon observation of the wear, and the cutting length and the wear width were recorded. When breakage, fracture, or chipping was observed in peripheral cutting edges, cutting was stopped upon observation of breakage, fracture or chipping, and then cutting length was recorded.

In Conventional Example D4, in which the end mill was produced from high-speed tool steel, cutting was performed under much milder conditions than those employed for testing of a carbide end mill; i.e., rotational speed: 1,200 rotations/min (cutting speed: 30 m/min), feed rate: 150 mm/min (0.03 mm of feed per cutting edge), amount of cutting in axial direction: 4 mm, and amount of cutting in radial direction: 4 mm. The results are shown in Table D1.

TABLE D1

| Sample No. | | Base of end mill | Separation of cutting edges | Phase deviation amount (mm) Second wpce | Third wpce | Fourth wpce | Phase deviation amount (%) | Type of surface treatment Innermost layer |
|---|---|---|---|---|---|---|---|---|
| Invention Example D | 1 | Carbide | Equal separation | 0.01 | 0 | 0.01 | 1% | (Ti45—Al55)N |
| | 2 | Carbide | Equal separation | 0.02 | 0 | 0.02 | 2% | (Ti45—Al55)N |
| | 3 | Carbide | Equal separation | 0.02 | 0.03 | 0.02 | 3% | (Ti45—Al55)N |
| | 4 | Carbide | Equal separation | 0.05 | 0.03 | 0.04 | 5% | (Ti45—Al55)N |
| | 5 | Carbide | Equal separation | 0.02 | 0 | 0 | 2% | (Ti45—Al55)N |
| | 6 | Carbide | Equal separation | 0.02 | 0 | 0.02 | 2% | (Ti45—Al55)N |
| | 7 | Carbide | Equal separation | 0.02 | 0 | 0.02 | 2% | (Ti40—Al55—Si5)N |
| | 8 | Carbide | Equal separation | 0.02 | 0 | 0.02 | 2% | (Ti45—Al55)N |
| | 9 | Carbide | Equal separation | 0.02 | 0 | 0.02 | 2% | (Ti45—Al55)N |
| | 10 | Carbide | Equal separation | 0.02 | 0 | 0.02 | 2% | (Ti40—Al55—Si5)N |
| | 11 | Carbide | Equal separation | 0.02 | 0.03 | 0.02 | 3% | (Ti60—Al40)N |
| | 12 | Carbide | Equal separation | 0.02 | 0 | 0 | 2% | (Ti70—Al30)N |
| Comparative Example D | 1 | Carbide | Equal separation | 0.06 | 0 | 0.06 | 6% | (Ti45—Al55)N |
| | 2 | Carbide | Equal separation | 0.02 | 0 | 0.02 | 2% | — |
| Conventional Example D | 1 | Carbide | Equal separation | 0 | 0 | 0 | 0% | (Ti45—Al55)N |
| | 2 | Carbide | Unequal separation | 0 | 0 | 0 | 0% | (Ti45—Al55)N |
| | 3 | Carbide | Equal separation | 0.06 | 0 | 0.02 | 6% | (Ti45—Al55)N |

TABLE D1-continued

| | | | | | | | |
|---|---|---|---|---|---|---|---|
| 4 | High-speed tool steel | Equal separation | 0.06 | 0 | 0.02 | 6% | (Ti45—Al55)N |

| | | Type of surface treatment | | | | |
|---|---|---|---|---|---|---|
| Sample No. | | Outermost layer | Intermediate layer | Cutting length | Wear width (mm) | Evaluation |
| Invention Example D | 1 | (Ti80—Si20)N | — | 50 m | 0.09 | Good |
| | 2 | (Ti80—Si20)N | — | 50 m | 0.07 | Good |
| | 3 | (Ti80—Si20)N | — | 50 m | 0.08 | Good |
| | 4 | (Ti80—Si20)N | (Ti45—Al50—Si5)N | 50 m | 0.12 | Good |
| | 5 | (Ti80—Si20)N | — | 50 m | 0.07 | Good |
| | 6 | (Al60Cr37Si3)N | (Al70—Cr30)N | 50 m | 0.07 | Good |
| | 7 | (Ti40—Al55—Si5)N | (Ti80—Si20)N | 50 m | 0.07 | Good |
| | 8 | (Al70—Cr30)N | — | 50 m | 0.08 | Good |
| | 9 | (Al70—Cr30)O | (Al70—Cr30)O | 50 m | 0.09 | Good |
| | 10 | (Cr92—Si3—B5)N | — | 50 m | 0.1 | Good |
| | 11 | (Ti40—Al60)N | — | 50 m | 0.09 | Good |
| | 12 | (Ti30—Al70)N | (Ti40—Al55—Si5)N | 50 m | 0.1 | Good |
| Comparative Example D | 1 | (Ti80—Si20)N | — | 30 m | — | Chipping |
| | 2 | — | — | 20 m | 0.17 | Large wear |
| Conventional Example D | 1 | (Ti80—Si20)N | — | 20 m | — | Fracture |
| | 2 | (Ti80—Si20)N | — | 40 m | — | Chipping |
| | 3 | (Ti80—Si20)N | — | 30 m | — | Chipping |
| | 4 | (Ti80—Si20)N | — | 10 m | — | Breakage |

Note:
"wpce" represents "wavy peripheral cutting edge."

As a result, in the cases of Invention Examples D1 to D5, stable cutting was performed with reduced chattering vibration, and wear width fell within a normal range even after 50 m cutting. Particularly, in the cases of Invention Examples D1 to D3 and D5, wear width was as small as 0.10 mm or less after 50 m cutting. When the phase deviation amount is 5% as in the case of Invention Example D5, the amount of wear relatively increases to some extent, but this does not cause any problem.

In the cases of Comparative Example D1 and Conventional Example D3, the amount of deviation from the reference phase was large, and thus a large cutting load was applied to a wavy peripheral cutting edge with large phase deviation amount, resulting in occurrence of chipping upon 30 m cutting, in spite of coating with a hard coat. As is clear from the data of these Examples, in a carbide end mill, the phase deviation amount must be limited to at most 5%.

In the case of Comparative Example D2, stable cutting was performed with no chattering vibration. However, due to no surface treatment, wear width exceeded 0.15 mm (i.e., 0.17 mm) upon 20 m cutting, and cutting was then stopped. In the case of Conventional Example D1, waveform pitches were provided at equal intervals, and thus chattering vibration was increased, and fracture occurred upon 20 m cutting, leading to the end of the service life. In the case of Conventional Example D2 (i.e., cutting edge with unequally-separated angles), chipping occurred upon 40 m cutting in a wavy peripheral cutting edge with a groove of small separation angle.

In the case of Conventional Example D4, the end mill was produced from high-speed tool steel, which is inferior to carbide in terms of thermal resistance and wear resistance. Therefore, the end mill encountered in cutting a material having a hardness of 40 HRC or higher, and breakage occurred in the end mill upon 10 m cutting, although it was coated with a hard coat.

In the cases of Invention Examples D6 to D12 (phase deviation amount is within 2% to 3%, and various types of surface treatment), no problems occurred until 50 m cutting, and wear width was 0.10 mm or less; i.e., satisfactory results were obtained.

Example D2

In Invention Example D13, an end mill having the following nicked peripheral cutting edges was produced. Specifically, a first nicked peripheral cutting edge was considered a reference peripheral cutting edge, and the remaining (second to fourth) peripheral cutting edges were deviated from the respective reference phases of the reference peripheral cutting edge, wherein the distance of the reference phase is an amount corresponding to a value obtained by equally quartering the nick pitch of the reference peripheral cutting edge. In a second nicked peripheral cutting edge, the phase deviation amount was adjusted to 1% of the nick pitch (i.e., 0.01 mm). In a third nicked peripheral cutting edge, the phase deviation amount was adjusted to 0% of the nick pitch (i.e., 0 mm). In a fourth nicked peripheral cutting edge, the phase deviation amount was adjusted to 1% of the nick pitch (i.e., 0.01 mm).

In Invention Example D14, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm).

In Invention Example D15, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 3% of the nick pitch (i.e., 0.03 mm). In a fourth nicked peripheral cutting edge, the phase deviation amount was adjusted to 2% of the nick pitch (i.e., 0.02 mm).

In Invention Example D16, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 5% of the nick pitch (i.e., 0.05 mm). In a third nicked peripheral cutting edge, the phase deviation amount was adjusted to 3% of the nick pitch (i.e., 0.03 mm). In a fourth nicked peripheral cutting edge, the phase deviation amount was adjusted to 4% of the nick pitch (i.e., 0.04 mm).

In Invention Example D17, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 2% of the nick pitch (i.e., 0.02 mm). In a third nicked peripheral cutting edge, the phase deviation amount was adjusted to 0% of the nick pitch (i.e., 0 mm). In a fourth nicked peripheral cutting edge, the phase deviation amount was adjusted to 0% of the nick pitch (i.e., 0 mm).

In Comparative Example D3, an end mill having the following nicked peripheral cutting edges was produced. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 0% of the nick pitch (i.e., 0 mm). In a fourth nicked peripheral cutting edge, the phase deviation amount was adjusted to 6% of the nick pitch (i.e., 0.06 mm).

In Conventional Example D5, there was produced an end mill having nicked peripheral cutting edges of constant phase deviation amount, wherein, in each nicked peripheral cutting edge, the amount of deviation from the reference phase (i.e., ¼ of the nick pitch of the reference peripheral cutting edge) was adjusted to 0%.

In Conventional Example D6, there was produced an end mill having nicked peripheral cutting edges of constant phase deviation amount with different separation angles (i.e., 95°, 85°, 95°, and 85°), wherein, in each nicked peripheral cutting edge, the amount of deviation from the reference phase (i.e., ¼ of the nick pitch of the reference peripheral cutting edge) was adjusted to 0%.

In Conventional Example D7, as described in Patent Document 2, a hard coated end mill employed for a cutting test (phase deviation amount: 6%) was produced from high-speed tool steel. Specifically, a first nicked peripheral cutting edge was considered a reference peripheral cutting edge, and the remaining (second to fourth) peripheral cutting edges were deviated from the above-obtained respective reference phases. In a second nicked peripheral cutting edge, the phase deviation amount was adjusted to 6% of the nick pitch (i.e., 0.06 mm). In a third nicked peripheral cutting edge, the phase deviation amount was adjusted to 0% of the nick pitch (i.e., 0 mm). In a fourth nicked peripheral cutting edge, the phase deviation amount was adjusted to 2% of the nick pitch (i.e., 0.02 mm).

In each of the end mills of Invention Examples D13 to D17, Comparative Example D3, and Conventional Examples D5 and D7, nicked peripheral cutting edges were formed so as to have the same separation angle.

In Invention Examples D18 to D24, the phase deviation amount (%) of nicked peripheral cutting edges was adjusted to fall within a preferred range of the present invention (i.e., 2% to 3%), and the end mills of these Examples were subjected to different surface treatments (i.e., coating with different hard coats). The thus-treated end mills were subjected to a cutting test. For comparison between the results of the end mills having nicked peripheral cutting edges and those of the end mills having wavy peripheral cutting edges, the phase deviation amount of the both type of the peripheral cutting edges and the type of surface treatment were same.

Specifically, in a surface treatment process, both of an end mill having nicked peripheral cutting edges and an end mill having wavy peripheral cutting edges whose phase deviation amount were equal, were placed in the same arc discharge ion plating furnace under the different coating condition to coat the end mill with a composite layer. The phase deviation amount of nicked peripheral cutting edges and the type of surface treatment are shown in Table D2.

In Example D2, similar to the case of Example D1, each end mill was subjected to a cutting test employing a workpiece (die steel SKD61 for hot working having a hardness of HRC 40). Cutting conditions and evaluation method were the same as those employed in Example D1. The results (cutting length, wear width of peripheral cutting edge, and evaluation) are shown in Table D2.

When none of breakage, fracture, and chipping occurred in peripheral cutting edges, etc. of an end mill until 50 m cutting, the end mill was evaluated as "good," and the wear width of the end mill was measured. When breakage, fracture, or chipping was observed in peripheral cutting edges of an end mill before 50 m cutting, cutting was stopped upon observation of breakage, fracture, or chipping, and the cutting length was recorded. The results are shown in Table D2.

TABLE D2

| Sample No. | | Separation of cutting edges | Phase deviation amount (mm) | | | Phase deviation amount (%) | Type of surface treatment Innermost layer |
|---|---|---|---|---|---|---|---|
| | | | Second npce | Third npce | Fourth npce | | |
| Invention Example D | 13 | Equal separation | 0.01 | 0 | 0.01 | 1% | (Ti45—Al55)N |
| | 14 | Equal separation | 0.02 | 0 | 0.02 | 2% | (Ti45—Al55)N |
| | 15 | Equal separation | 0.02 | 0.03 | 0.02 | 3% | (Ti45—Al55)N |
| | 16 | Equal separation | 0.05 | 0.03 | 0.04 | 5% | (Ti45—Al55)N |

TABLE D2-continued

|  | | | | | | | |
|---|---|---|---|---|---|---|---|
| | 17 | Equal separation | 0.02 | 0 | 0 | 2% | (Ti45—Al55)N |
| | 18 | Equal separation | 0.02 | 0 | 0.02 | 2% | (Ti45—Al55)N |
| | 19 | Equal separation | 0.02 | 0 | 0.02 | 2% | (Ti40—Al55—Si5)N |
| | 20 | Equal separation | 0.02 | 0 | 0.02 | 2% | (Ti45—Al55)N |
| | 21 | Equal separation | 0.02 | 0 | 0.02 | 2% | (Ti45—Al55)N |
| | 22 | Equal separation | 0.02 | 0 | 0.02 | 2% | (Ti40—Al55—Si5)N |
| | 23 | Equal separation | 0.02 | 0.03 | 0.02 | 3% | (Ti60—Al40)N |
| | 24 | Equal separation | 0.02 | 0 | 0 | 2% | (Ti70—Al30)N |
| Comparative Example D | 3 | Equal separation | 0.06 | 0 | 0.06 | 6% | (Ti45—Al55)N |
| Conventional Example D | 5 | Equal separation | 0 | 0 | 0 | 0% | (Ti45—Al55)N |
| | 6 | Unequal separation | 0 | 0 | 0 | 0% | (Ti45—Al55)N |
| | 7 | Equal separation | 0.06 | 0 | 0.02 | 6% | (Ti45—Al55)N |

| | Sample No. | Type of surface treatment | | Cutting length | Wear width (mm) | Evaluation |
|---|---|---|---|---|---|---|
| | | Outermost layer | Intermediate layer | | | |
| Invention Example D | 13 | (Ti80—Si20)N | — | 50 m | 0.1 | Good |
| | 14 | (Ti80—Si20)N | — | 50 m | 0.08 | Good |
| | 15 | (Ti80—Si20)N | — | 50 m | 0.09 | Good |
| | 16 | (Ti80—Si20)N | (Ti45—Al50—Si5)N | 50 m | 0.12 | Good |
| | 17 | (Ti80—Si20)N | — | 50 m | 0.08 | Good |
| | 18 | (Al60Cr37Si3)N | (Al70—Cr30)N | 50 m | 0.09 | Good |
| | 19 | (Ti40—Al55—Si5)N | (Ti80—Si20)N | 50 m | 0.08 | Good |
| | 20 | (Al70—Cr30)N | — | 50 m | 0.09 | Good |
| | 21 | (Al70—Cr30)O | (Al70—Cr30)O | 50 m | 0.1 | Good |
| | 22 | (Cr92—Si3—B5)N | — | 50 m | 0.1 | Good |
| | 23 | (Ti40—Al60)N | — | 50 m | 0.1 | Good |
| | 24 | (Ti30—Al70)N | (Ti40—Al55—Si5)N | 50 m | 0.1 | Good |
| Comparative Example D | 3 | (Ti80—Si20)N | — | 30 m | — | Chipping |
| Conventional Example D | 5 | (Ti80—Si20)N | — | 15 m | — | Fracture |
| | 6 | (Ti80—Si20)N | — | 30 m | — | Fracture |
| | 7 | (Ti80—Si20)N | — | 20 m | — | Fracture |

Note:
"npce" represents "nicked peripheral cutting edge."

In the cases of Invention Examples D13 to D17, stable cutting was performed with reduced chattering vibration, and wear width fell within a normal range even after 50 m cutting. Particularly, in the cases of Invention Examples D13 to D15 and D17, similar to the case of Example D1, wear width was as small as 0.10 mm or less after 50 m cutting. However, comparison between the results of Example D1 and Example D2—in which the test was performed under the same conditions—indicated that, in many cases, the wear width of nicked peripheral cutting edge is slightly larger than that of wavy peripheral cutting edge; i.e., wavy peripheral cutting edge is superior to nicked peripheral cutting edge in terms of cutting of a workpiece such as die steel for hot working.

In the cases of Comparative Example D3 and Conventional Example D7, the amount of deviation from the reference phase was large (i.e., 6%), and thus a large cutting load was applied to a nicked peripheral cutting edge with large phase deviation amount, resulting in occurrence of chipping upon 30 m cutting (Comparative Example D3) and fracture upon 20 m cutting (Conventional Example D7). In the case of Conventional Example D5, nick pitches were provided at equal intervals, and thus chattering vibration was increased, and fracture occurred upon 15 m cutting, leading to the end of the service life. In the case of Conventional Example D6 (i.e., product with unequally-separated angles), chipping occurred upon 30 m cutting in a nicked peripheral cutting edge with a groove of small separation angle.

In the cases of Invention Examples D18 to D24, in which the phase deviation amount was adjusted to 2% to 3%, and end mills with various types of coat, no problems occurred until 50 m cutting, and wear width was as small as 0.10 mm or less, which was comparable to that in the case of end mills having wavy peripheral cutting edges.

Example D3

In Example D3, the end mill of the present invention was employed for further high-speed cutting, and the service life of the end mill was compared with that of the end mill tested in Example D1.

In Example D3, an end mill of Invention Example D25 was produced in the same manner as in Invention Example D2 (Example D1); an end mill of Invention Example D26 was produced in the same manner as in Invention. Example D3 (Example D1); an end mill of Invention Example D27 was produced in the same manner as in Invention Example D4 (Example D1); an end mill of Invention Example D28 was produced in the same manner as in Invention Example D6 (Example D1); an end mill of Invention Example D29 was produced in the same manner as in Invention Example D8 (Example D1); an end mill of Invention Example D30 was produced in the same manner as in Invention Example D10 (Example D1); and an end mill of Invention Example D31 was produced in the same manner as in Invention Example D12 (Example D1). The end mills of Example D3 were subjected to the same type of coat as in the corresponding end mills of Example D1.

Each of the end mills was subjected to a cutting test employing a workpiece (die steel SKD61 for hot working having a hardness of HRC 40). For the test, cutting was carried out under the following conditions: rotational speed: 9,000 rotations/min (cutting speed: 226 m/min) (i.e., 1.5 times that in Example D1), feed rate: 2,160 mm/min (0.06 mm of feed per cutting edge), amount of cutting in axial direction: 4 mm, and amount of cutting in radial direction: 4 mm. For evaluation of the end mill, 50 m cutting was performed in a manner similar to that in Example D1. The results are shown in Table D3.

TABLE D3

| Sample No. | | Phase deviation amount (mm) | | | Phase deviation amount (%) | Type of surface treatment Innermost layer |
|---|---|---|---|---|---|---|
| | | Second wavy peripheral cutting edge | Third wavy peripheral cutting edge | Fourth wavy peripheral cutting edge | | |
| Invention Example D | 25 | 0.02 | 0 | 0.02 | 2% | (Ti45—Al55)N |
| | 26 | 0.02 | 0.03 | 0.02 | 3% | (Ti45—Al55)N |
| | 27 | 0.05 | 0.03 | 0.04 | 5% | (Ti45—Al55)N |
| | 28 | 0.02 | 0 | 0.02 | 2% | (Ti45—Al55)N |
| | 29 | 0.02 | 0 | 0.02 | 2% | (Ti45—Al55)N |
| | 30 | 0.02 | 0 | 0 | 2% | (Ti40—Al55—Si5)N |
| | 31 | 0.02 | 0 | 0 | 2% | (Ti70—Al30)N |

| Sample No. | | Type of surface treatment | | Wear | | Evaluation |
|---|---|---|---|---|---|---|
| | | Outermost layer | Intermediate layer | Cutting length | width (mm) | |
| Invention Example D | 25 | (Ti80—Si20)N | — | 50 m | 0.1 | Good |
| | 26 | (Ti80—Si20)N | — | 50 m | 0.1 | Good |
| | 27 | (Ti80—Si20)N | (Ti45—Al50—Si5)N | 50 m | 0.14 | Good |
| | 28 | (Al60Cr37Si3)N | (Al70—Cr30)N | 50 m | 0.12 | Good |
| | 29 | (Al70—Cr30)N | — | 50 m | 0.1 | Good |
| | 30 | (Cr92—Si3—B5)N | — | 50 m | 0.12 | Good |
| | 31 | (Ti30—Al70)N | (Ti40—Al55—Si5)N | 50 m | 0.11 | Good |

As a result, in the cases of Invention Examples D25 to D31, stable cutting was performed, and wear width fell within a normal range even after 50 m cutting; i.e., the same cutting length as in the case of Example D1 was achieved even through high-speed cutting. Particularly, when the amount of deviation from the reference phase fell within a preferred range (i.e., 2% to 3%), wear width was smaller than that in the case of Invention Example D27 (phase deviation amount is 5% as an upper limit of the present invention).

Example D4

In Example D4, a cutting test (groove cutting) was carried out for evaluating chip removal performance. An end mill of Invention Example D32 was produced in the same manner as in Invention Example D1 (Example D1); an end mill of Conventional Example D8 was produced in the same manner as in Conventional Example D1 (Example D1); and an end mill of Conventional Example D9 (i.e., cutting edge with unequally-separated angles) was produced in the same manner as in Conventional Example D2 (Example D1). Each of the end mills was tested in terms of feed rate limit by using structural steel as a workpiece.

Cutting conditions were as follows: rotational speed: 8,000 rotations/min (cutting speed: 200 m/min), feed rate: 2,000 mm/min (0.06 mm of feed per cutting edge), and amount of cutting in axial direction: 8 mm. For evaluation of each end mill, feed rate was increased by 400 mm/min every 1 m cutting, and the feed rate at which breakage occurred was recorded. When no problems occurred after machining, rating "O" was assigned, whereas when breakage occurred or when fracture or chipping occurred after 1 m cutting at any feed rate, rating "X" was assigned. A sample which attained a feed rate of 3,200 mm/min or higher was evaluated as "good." The results are shown in Table D4.

TABLE D4

| Sample No. | | Separation of cutting edges | Feed rate (mm/min) | | | | Evaluation |
|---|---|---|---|---|---|---|---|
| | | | 2000 | 2400 | 2800 | 3200 | |
| Invention Example D | 32 | Equal separation | O | O | O | O | Good |
| Conventional Example D | 8 | Equal separation | O | O | O | X | Fracture |
| | 9 | Unequal separation | O | O | X | | Breakage |

As a result, in the case of Conventional Example D9 (i.e., product with unequally-separated angles), when feed rate is increased for groove cutting, chips become large. When such large chips are jammed in a small edge groove, breakage or fracture occurs in the edge. In the case of Invention Example D32, cutting was performed until feed rate reached 3,200 mm/min without causing any problem. In contrast, in the case of Conventional Example D8, vibration was increased, and fracture occurred when feed rate reached 3,200 mm/min. In the case of Conventional Example D9 (i.e., product with unequally-separated angles), breakage occurred when feed rate reached 2,800 mm/min. Through observation of the tool thereafter, welding of chips was found in edge grooves having small separation angle, and breakage was found to occur as a result of jamming of chips in edge grooves.

Example D5

In Example D5, peripheral cutting edges having different forms (i.e., wavy peripheral cutting edge and nicked peripheral cutting edge) were compared with each other by carrying out a cutting test employing an easy-to-weld workpiece (stainless steel SUS304). As shown in the above-described Examples, when the phase deviation amount was about 20, satisfactory results were obtained in both the cases of wavy peripheral cutting edge and nicked peripheral cutting edge. Therefore, an end mill of Invention Example D33 was produced in the same manner as in Invention Example D2 (Example D1), and an end mill of Invention Example D34 was produced in the same manner as in Invention Example D14 (Example D2). Each of the end mills was subjected to a cutting test.

For service life testing, cutting was carried out under the following conditions: rotational speed: 5,000 rotations/min (cutting speed: 125 m/min), feed rate: 1,200 mm/min (0.06 mm of feed per cutting edge), amount of cutting in axial direction: 4 mm, and amount of cutting in radial direction: 1 mm. For evaluation of each end mill, peripheral cutting edges thereof were observed every 5 m cutting. When neither fracture nor chipping occurred in an end mill until 30 m cutting, the end mill was evaluated as "good," and the wear width of the end mill was measured. The results are shown in Table D5.

Similar to the case of Example C1, a concave pocket (50 mm in width, 50 mm in length, 24 mm in depth) was formed in a carbon steel workpiece through the cutting method of the present invention using the carbide end mill of the present invention and the conventional cutting method for comparison of these methods. In the cutting method of the present invention, similar to the case of Example C1, the concave pocket was formed by a process including a step of oblique cutting until a depth of 8 mm, and a subsequent step of lateral-feed machining until a width of 50 mm and a length of 50 mm, which process was performed thrice until a depth of 24 mm. In contrast, in the convention method, firstly, a hole having a depth of 24 mm was formed in the center of the workpiece by means of a drill, and subsequently, the aforementioned width and length were achieved through cutting by means of the conventional end mill.

TABLE D5

| Sample No. | | Peripheral cutting edge shape | Phase deviation amount (mm) | | | Phase deviation amount (%) | Cutting length | Wear width | Evaluation |
|---|---|---|---|---|---|---|---|---|---|
| | | | Second wavy (nicked) peripheral cutting edge | Third wavy (nicked) peripheral cutting edge | Fourth wavy (nicked) peripheral cutting edge | | | | |
| Invention Example D | 33 | Wavy peripheral cutting edge | 0.02 | 0 | 0.02 | 2% | 30 m | 0.14 mm | Good |
| | 34 | Nicked peripheral cutting edge | 0.02 | 0 | 0.02 | 2% | 30 m | 0.13 mm | Good |

As a result, in the cases of Invention Examples D33 and D34, wear width fell within a normal range even after 30 m cutting, which indicates that an easy-to-weld workpiece (e.g., stainless steel) can be cut by means of each of the end mills. However, the wear width of nicked peripheral cutting edges in Invention Example D34 was found to be 0.13 mm, which is slightly smaller than that of wavy peripheral cutting edges in Invention Example D33 (i.e., 0.14 mm). These data show that nicked peripheral cutting edge is superior to wavy peripheral cutting edge in terms of cutting of an easy-to-weld workpiece such as stainless steel.

These data indicate that the hard coated end mill of the present invention having wavy peripheral cutting edges is suitable for machining of a hard-to-weld workpiece such as structural steel, structural alloy steel, die steel for cold or hot working, whereas the hard coated end mill of the present invention having nicked peripheral cutting edges is suitable for machining of an easy-to-weld workpiece such as stainless steel, titanium alloy, or super-heat-resistant alloy.

Example E1

In Example E1, concave pockets were formed through carving by the cutting method of the present invention and a conventional cutting method for comparison of machining time (including setup time) between these methods. The cutting method of the present invention was carried out by means of an end mill which was produced in the same manner as in Invention Example A1. The conventional cutting method was carried out by means of an end mill which was produced in the same manner as in Conventional Example C1, except that the cutting edge length was adjusted to 25 mm.

In the cutting method of the present invention employing the end mill of the present invention, two types of cutting (i.e., lateral-feed cutting and oblique cutting) were continuously performed. Cutting was carried out under the following conditions: rotational speed: 6,000 rotations/min (cutting speed: 150 m/min), feed rate: 1,920 mm/min (0.08 mm of feed per cutting edge), amount of cutting in axial direction: 8 mm, amount of cutting in radial direction: 4 mm, feed rate upon oblique cutting: 1,200 mm/min, and tilt angle: 20°.

In the convention method, the acceptable maximum tilt angle of the end mill during oblique cutting is about 5°, and a long period of time is required for machining. Therefore, in the conventional method, a hole was formed in advance by means of a drill, and then cutting was performed by the end mill for formation of the concave pocket. In the cutting method employing the conventional end mill, cutting was carried out under the following conditions: rotational speed: 4,000 rotations/min (cutting speed: 100 m/min), feed rate: 1,280 mm/min (0.08 mm of feed per cutting edge), amount of cutting in axial direction: 8 mm, and amount of cutting in radial direction: 1 mm.

For evaluation of the method of the present invention and the conventional method, the time required in each step for forming a concave pocket through carving was measured. When the total time of steps in the cutting method was 10 minutes or shorter, the method was evaluated as "good." The evaluation results are shown in Table E1.

TABLE E1

| | Drill | | Tool exchange | End mill | | Total time |
|---|---|---|---|---|---|---|
| | Setup | Machining | | Setup | Machining | |
| Method of the present invention | — | — | — | 5 minutes | 2 minutes | 7 minutes |
| Conventional method | 5 minutes | 3 minutes | 1 minute | 5 minutes | 6 minutes | 20 minutes |

As a result, in the case of the cutting method of the present invention, a single tool realized both high-performance oblique cutting (tilt angle: 20°) and high-performance lateral-feed cutting, and thus the total time required for completion of machining was shorter than 10 minutes (i.e., seven minutes), which is about ⅓ that in the case of the conventional method.

In contrast, in the conventional method, a hole was formed in advance by means of a drill, and then cutting was performed by the conventional end mill for formation of the concave pocket, which is due to the fact that the possible tilt angle of the end mill during oblique cutting is at most about 5°. Since high-speed cutting conditions were failed to be achieved by the conventional end mill, the conventional method required a total time of 20 minutes (including the times of setup and machining upon drilling, and the time of machining by means of the conventional end mill).

INDUSTRIAL APPLICABILITY

According to the carbide end mill of the present invention having a novel peripheral cutting edge shape and the cutting method employing the end mill, in the field of machining (e.g., die machining or part machining), high-performance machining (i.e., about 1.5 times or more that in conventional cases) can be achieved in rough machining of a workpiece such as structural steel, structural alloy steel, die steel for cold or hot working, stainless steel, titanium alloy, or super-heat-resistant alloy.

In the field of machining, there has been a keen demand for high-performance machining (including longitudinal-feed cutting, lateral-feed cutting, and oblique cutting) of tempered steel or quenched steel (about HRC 40 or more) for formation of a complicated shape by means of a single end mill. The present invention can provide a carbide end mill which meets such commercial demands for the first time.

DESCRIPTION OF REFERENCE NUMERALS

1 peripheral cutting edges
2 tool end side
3 shank side
4 waveform pitch
5 wave height
6 crest portion
7 trough portion
8 nick pitch
9 depth
10 reference peripheral cutting edge
11 second wavy peripheral cutting edge
12 third wavy peripheral cutting edge
13 fourth wavy peripheral cutting edge
14 reference phase
15 deviation amount
16 flute
17 second nicked peripheral cutting edge
18 third nicked peripheral cutting edge
19 fourth nicked peripheral cutting edge
20 intersection
31 hard coat
34 nick
35 tool-end-side rounded portion
36 tool-shank-side rounded portion
37 bottom portion
38 bottom end
39 nick groove
40 straight portion
41 convex curve portion
42 concave circular portion
43 edge portion
51 first gash surface
52 second gash surface
53 third gash surface
54 crossing portion between the first gash surface and the second gash surface
55 first gash angle
56 crossing portion between the first gash surface and the third gash surface
57 second gash angle
58 length of a connection portion
59 cutting edge portion
60 tool-holding portion
61 outermost layer
62 innermost layer
63 coat having the same composition as the innermost layer
64 coat having the same composition as the outermost layer
65 intermediate layer
66 base carbide
D tool diameter
R1 curvature radius of a tool-end-side rounded portion
R2 curvature radius of a tool-shank-side rounded portion
R3 curvature radius of concave arc portion
θ helix angle

The invention claimed is:

1. A carbide end mill which includes a plurality of wavy peripheral cutting edges each having alternate crest portions and trough portions, or a plurality of peripheral cutting edges each having a plurality of nicks for breaking chips, wherein, when a certain peripheral cutting edge is considered a reference peripheral cutting edge having reference phases, wherein the distance of the reference phase is an amount corresponding to a value obtained by dividing the pitch of the nicks or waveform of the reference peripheral cutting edge by the number of the cutting edges; and the phase of at least one of the remaining peripheral cutting edges is deviated in the direction of a tool axis from the corresponding reference phase by an amount of 5% or less, excluding 0%, of the pitch, wherein, the carbide end mill includes the plurality of peripheral cutting edges, end cutting edges, and gashes each composed of a plurality of gash surfaces; the plurality of gash surfaces include a first gash surface serving as a cutting face of the corresponding end cutting edge, a second gash surface provided on the side toward the rotational center of the tool axis of the end mill, and a third gash surface provided on the peripheral side of the end mill; a first gash angle of 15° to 35° is formed between a crossing portion between the first gash surface and the second gash surface, and a plane perpendicularly intersecting the tool axis; a second gash angle of 40° to 60° is formed between a crossing portion between the first gash surface and the third gash surface, and the plane perpendicularly intersecting the tool axis; and the length of a connection portion between the second gash surface and the third gash surface is not less than 5% the tool diameter as measured from the tool rotation axis and less than 20% the tool diameter.

2. A carbide end mill which includes a plurality of wavy peripheral cutting edges each having alternate crest portions and trough portions, or a plurality of peripheral cutting edges each having a plurality of nicks for breaking chips, wherein the carbide end mill includes the plurality of peripheral cutting edges, end cutting edges, and gashes each composed of a plurality of gash surfaces; the plurality of gash surfaces include a first gash surface serving as a cutting face of the corresponding end cutting edge, a second gash surface provided on the side toward the rotational center of the tool axis of the end mill, and a third gash surface provided on the peripheral side of the end mill; a first gash angle of 15° to 35° is formed between a crossing portion between the first gash surface and the second gash surface, and a plane perpendicularly intersecting the tool axis; a second gash angle of 40° to 60° is formed between a crossing portion between the first gash surface and the third gash surface, and the plane perpendicularly intersecting the tool axis; and the length of a connection portion between the second gash surface and the third gash surface is not less than 5% the tool diameter as measured from the tool rotation axis and less than 20% the tool diameter.

* * * * *